US012459992B2

(12) United States Patent
Bedrosian et al.

(10) Patent No.: US 12,459,992 B2
(45) Date of Patent: Nov. 4, 2025

(54) METHODS FOR TREATMENT OF REFRACTORY GENERALIZED MYASTHENIA GRAVIS

(71) Applicant: ALEXION PHARMACEUTICALS, INC., Boston, MA (US)

(72) Inventors: Camille Bedrosian, Woodbridge, CT (US); Fanny O'Brien, Norwell, MA (US); Jing Jing Wang, Woodbridge, CT (US)

(73) Assignee: Alexion Pharmaceuticals, Inc., Boston, MA (US)

(*) Notice: Subject to any disclaimer, the term of this patent is extended or adjusted under 35 U.S.C. 154(b) by 1063 days.

(21) Appl. No.: 17/150,005

(22) Filed: Jan. 15, 2021

(65) Prior Publication Data

US 2021/0246196 A1 Aug. 12, 2021

Related U.S. Application Data

(63) Continuation of application No. 15/595,890, filed on May 15, 2017, now abandoned.

(60) Provisional application No. 62/500,643, filed on May 3, 2017, provisional application No. 62/489,240, filed on Apr. 24, 2017, provisional application No. 62/346,168, filed on Jun. 6, 2016, provisional application No. 62/342,321, filed on May 27, 2016.

(51) Int. Cl.
  *C07K 16/18* (2006.01)
  *A61K 39/00* (2006.01)
  *A61M 1/34* (2006.01)

(52) U.S. Cl.
  CPC .......... *C07K 16/18* (2013.01); *A61M 1/3496* (2013.01); *A61K 2039/505* (2013.01); *A61K 2039/54* (2013.01); *A61K 2039/545* (2013.01); *A61K 2039/55* (2013.01); *C07K 2317/24* (2013.01)

(58) Field of Classification Search
  None
  See application file for complete search history.

(56) References Cited

U.S. PATENT DOCUMENTS

| | | |
|---|---|---|
| 3,710,795 A | 1/1973 | Higuchi et al. |
| 4,485,045 A | 11/1984 | Regen |
| 4,544,545 A | 10/1985 | Ryan et al. |
| 4,816,567 A | 3/1989 | Cabilly et al. |
| 4,863,457 A | 9/1989 | Lee |
| 4,868,116 A | 9/1989 | Morgan et al. |
| 4,980,286 A | 12/1990 | Morgan et al. |
| 5,013,556 A | 5/1991 | Woodle et al. |
| 5,308,341 A | 5/1994 | Chanoch |
| 5,443,505 A | 8/1995 | Wong et al. |
| 5,447,145 A | 9/1995 | Cappello et al. |
| 5,501,856 A | 3/1996 | Ohtori et al. |
| 5,624,821 A | 4/1997 | Winter et al. |
| 5,648,260 A | 7/1997 | Winter et al. |
| 5,773,019 A | 6/1998 | Ashton et al. |
| 5,997,848 A | 12/1999 | Patton et al. |
| 6,001,329 A | 12/1999 | Buchsbaum et al. |
| 6,001,386 A | 12/1999 | Ashton et al. |
| 6,005,079 A | 12/1999 | Casterman et al. |
| 6,019,968 A | 2/2000 | Platz et al. |
| 6,095,141 A | 8/2000 | Armer et al. |
| 6,146,361 A | 11/2000 | DiBiasi et al. |
| 6,170,717 B1 | 1/2001 | Di Giovanni et al. |
| 6,192,891 B1 | 2/2001 | Gravel et al. |
| 6,194,551 B1 | 2/2001 | Idusogie et al. |
| 6,200,296 B1 | 3/2001 | Dibiasi et al. |
| 6,277,099 B1 | 8/2001 | Strowe et al. |
| 6,277,375 B1 | 8/2001 | Ward |
| 6,300,064 B1 | 10/2001 | Knappik et al. |
| 6,302,855 B1 | 10/2001 | Lav et al. |
| 6,355,245 B1 | 3/2002 | Evans et al. |
| 6,737,056 B1 | 5/2004 | Presta |
| 6,933,368 B2 | 8/2005 | Co et al. |
| 7,112,341 B1 | 9/2006 | Nagarajan et al. |
| 7,371,826 B2 | 5/2008 | Presta |
| 7,390,786 B2 | 6/2008 | Warne et al. |
| 7,556,615 B2 | 7/2009 | Pettis et al. |
| 7,612,181 B2 | 11/2009 | Wu et al. |
| 7,670,600 B2 | 3/2010 | Dall'Acqua et al. |
| 7,704,497 B2 | 4/2010 | Dall'Acqua et al. |
| 8,088,376 B2 | 1/2012 | Chamberlain et al. |
| 8,241,628 B2 | 8/2012 | Diefenbach-Streiber et al. |
| 8,323,962 B2 | 12/2012 | Dall'Acqua et al. |
| 8,367,805 B2 | 2/2013 | Chamberlain et al. |
| 8,802,820 B2 | 8/2014 | Chamberlain et al. |
| 8,883,158 B2 | 11/2014 | Diefenbach-Streiber et al. |

(Continued)

FOREIGN PATENT DOCUMENTS

| | | |
|---|---|---|
| AU | 2018201961 A1 | 4/2018 |
| CN | 106459189 A | 2/2017 |

(Continued)

OTHER PUBLICATIONS

NCT01997229 (Year: 2013).*
"Eculizumab (Soliris) for Refractory Myasthenia Gravis", NIHR HSRIC ID: 6090, Mar. 2016 (Mar. 2016), pp. 1-7, XP009516969.
"Highlights of Prescribing Information Soliris. Soliris (eculizumab)", , Sep. 1, 2011 (Sep. 1, 2011), pp. 1-24, XP055684451, Retrieved from the Internet: URL:https://www.accessdata.fda.gov/drugsatfda_docs/label/2011/125166s172lbl.pdf.
"History of Changes for Study: NCT01997229: Safety and efficacy of Eculizumab in Refractory Generalized Myasthenia Gravis," ClinicalTrials.gov. Earliest record date: Nov. 22, 2013, accessed Jan. 29, 2019 (7 pages).
Barohn et al., "Reliability testing of the quantitative myasthenia gravis score." Ann. N.Y. Acad. Sci. 841: 769-72 (May 1998).

(Continued)

*Primary Examiner* — Phuong Huynh
(74) *Attorney, Agent, or Firm* — Clark & Elbing LLP

(57) ABSTRACT

The disclosure provides methods of treating myasthenia gravis (MG) in a subject in need thereof by administering to the subject a substance that specifically binds complement component 5 (C5). In certain embodiments, the substance that specifically binds C5 is a binding protein, such as an anti-C5 antibody.

15 Claims, 23 Drawing Sheets

Specification includes a Sequence Listing.

(56) References Cited

U.S. PATENT DOCUMENTS

| | | | |
|---|---|---|---|
| 8,961,981 B2 | 2/2015 | Kaminski et al. | |
| 9,079,949 B1 * | 7/2015 | Andrien, Jr. | A61P 1/04 |
| 9,107,861 B1 | 8/2015 | Andrien, Jr. et al. | |
| 9,181,349 B2 | 11/2015 | Baurin et al. | |
| 9,206,251 B2 | 12/2015 | Andrien, Jr. et al. | |
| 9,371,377 B2 | 6/2016 | Andrien, Jr. et al. | |
| 9,409,980 B1 * | 8/2016 | Zhou | A61P 7/00 |
| 9,415,102 B2 * | 8/2016 | Zhou | A61K 47/22 |
| 9,447,176 B2 | 9/2016 | Rother et al. | |
| 9,663,574 B2 | 5/2017 | Andrien, Jr. et al. | |
| 9,765,135 B2 | 9/2017 | Ruike et al. | |
| 9,771,418 B2 | 9/2017 | Rother et al. | |
| 9,803,007 B1 | 10/2017 | Andrien, Jr. et al. | |
| 9,921,341 B2 | 3/2018 | Laredo et al. | |
| 10,227,400 B2 | 3/2019 | Andrien, Jr. et al. | |
| 10,584,164 B2 | 3/2020 | Andrien, Jr. et al. | |
| 10,633,434 B2 | 4/2020 | Hu et al. | |
| 11,434,280 B2 | 9/2022 | Andrien, Jr. et al. | |
| 11,807,678 B2 * | 11/2023 | Rother | A61P 37/02 |
| 12,128,101 B2 | 10/2024 | Payton et al. | |
| 2002/0026176 A1 | 2/2002 | Varner et al. | |
| 2004/0115194 A1 | 6/2004 | Wang | |
| 2005/0271660 A1 | 12/2005 | Wang | |
| 2006/0141456 A1 | 6/2006 | Edwards et al. | |
| 2007/0172483 A1 | 7/2007 | Schwaeble et al. | |
| 2007/0235029 A1 | 10/2007 | Zhu et al. | |
| 2008/0202513 A1 | 8/2008 | Birchall et al. | |
| 2008/0241223 A1 | 10/2008 | Nivaggioli et al. | |
| 2009/0110679 A1 | 4/2009 | Li et al. | |
| 2009/0220508 A1 | 9/2009 | Bell et al. | |
| 2010/0098730 A1 | 4/2010 | Lowman et al. | |
| 2011/0111406 A1 | 5/2011 | Igawa et al. | |
| 2012/0225056 A1 | 9/2012 | Rother et al. | |
| 2012/0230982 A1 | 9/2012 | Zhou et al. | |
| 2015/0299305 A1 | 10/2015 | Andrien, Jr. et al. | |
| 2016/0108115 A1 | 4/2016 | Andrien, Jr. et al. | |
| 2016/0251433 A1 | 9/2016 | Andrien, Jr. et al. | |
| 2016/0319004 A1 | 11/2016 | Rother et al. | |
| 2016/0355579 A1 | 12/2016 | Rother et al. | |
| 2016/0355580 A1 | 12/2016 | Rother et al. | |
| 2017/0015740 A1 | 1/2017 | Rother et al. | |
| 2017/0298123 A1 | 10/2017 | Andrien, Jr. et al. | |
| 2017/0355757 A1 | 12/2017 | Hu et al. | |
| 2017/0369562 A1 | 12/2017 | Rother et al. | |
| 2018/0009885 A1 | 1/2018 | Andrien, Jr. et al. | |
| 2018/0311299 A1 | 11/2018 | Griffin et al. | |
| 2018/0311345 A1 | 11/2018 | Pober et al. | |
| 2019/0023775 A1 | 1/2019 | Bachman et al. | |
| 2019/0263897 A1 | 8/2019 | Andrien, Jr. et al. | |
| 2019/0276524 A1 | 9/2019 | Griffin et al. | |
| 2019/0367599 A1 | 12/2019 | Shinomiya et al. | |
| 2020/0071391 A1 | 3/2020 | Rother | |
| 2020/0140531 A1 | 5/2020 | Rother et al. | |
| 2020/0157200 A1 | 5/2020 | Andrien, Jr. et al. | |
| 2020/0254092 A1 | 8/2020 | Payton et al. | |
| 2020/0331993 A1 | 10/2020 | Fujita et al. | |
| 2021/0000927 A1 | 1/2021 | Ricardo et al. | |
| 2021/0122806 A1 | 4/2021 | Malanson et al. | |
| 2021/0187054 A1 | 6/2021 | Griffin et al. | |
| 2021/0214425 A1 | 7/2021 | Payton et al. | |
| 2021/0332147 A1 | 10/2021 | Payton et al. | |
| 2022/0235121 A1 | 7/2022 | Payton et al. | |
| 2023/0002482 A1 | 1/2023 | Philominathan et al. | |
| 2023/0106734 A1 | 4/2023 | Ortiz et al. | |
| 2023/0235035 A1 | 7/2023 | Payton et al. | |
| 2024/0141024 A1 | 5/2024 | Andrien, Jr. et al. | |

FOREIGN PATENT DOCUMENTS

| | | |
|---|---|---|
| EP | 0430539 A2 | 6/1991 |
| EP | 488401 A1 | 6/1992 |
| EP | 2006381 A1 | 12/2008 |
| EP | 1610820 B1 | 9/2010 |
| EP | 2275443 A1 | 1/2011 |
| EP | 3095795 A1 | 11/2016 |
| JP | 2010215674 A | 9/2010 |
| JP | 2010529999 A | 9/2010 |
| JP | 2012-508262 A | 4/2012 |
| JP | 2013526861 A | 6/2013 |
| JP | 2015536930 A | 12/2015 |
| JP | 2017095440 A | 6/2017 |
| JP | 2018506320 A | 3/2018 |
| JP | 2019-517473 A | 6/2019 |
| WO | WO-8902468 A1 | 3/1989 |
| WO | WO-8905345 A1 | 6/1989 |
| WO | WO-8907136 A2 | 8/1989 |
| WO | WO-9207573 A1 | 5/1992 |
| WO | WO-9402559 A1 | 2/1994 |
| WO | WO-9404678 A1 | 3/1994 |
| WO | WO-9428027 A1 | 12/1994 |
| WO | WO-9734631 A1 | 9/1997 |
| WO | WO-9823289 A1 | 6/1998 |
| WO | WO-9847531 A2 | 10/1998 |
| WO | WO-9919343 A1 | 4/1999 |
| WO | WO-0061178 A1 | 10/2000 |
| WO | WO-0069887 A2 | 11/2000 |
| WO | WO-0178693 A2 | 10/2001 |
| WO | WO-2002013859 A1 | 2/2002 |
| WO | WO-2003074679 A2 | 9/2003 |
| WO | WO-03105757 A2 | 12/2003 |
| WO | WO-2004024156 A1 | 3/2004 |
| WO | WO-2004026380 A2 | 4/2004 |
| WO | WO-2004029207 A2 | 4/2004 |
| WO | WO-2004060407 A1 | 7/2004 |
| WO | WO-2004073551 A2 | 9/2004 |
| WO | WO-2004091658 A1 | 10/2004 |
| WO | WO-2005011735 A1 | 2/2005 |
| WO | WO-2005040217 A2 | 5/2005 |
| WO | WO-2005077981 A2 | 8/2005 |
| WO | WO-2005092925 A2 | 10/2005 |
| WO | WO-06031994 A2 | 3/2006 |
| WO | WO-2006053301 A2 | 5/2006 |
| WO | WO-2006094234 A1 | 9/2006 |
| WO | WO-2006105338 A2 | 10/2006 |
| WO | WO-2006122257 A2 | 11/2006 |
| WO | WO-2007041635 A2 | 4/2007 |
| WO | WO-2007103134 A2 | 9/2007 |
| WO | WO-2007106585 A1 | 9/2007 |
| WO | WO-2007114319 A1 | 10/2007 |
| WO | WO-08043822 A2 | 4/2008 |
| WO | WO-2008048545 A2 | 4/2008 |
| WO | WO-2008092117 A2 | 7/2008 |
| WO | WO-2008157356 A2 | 12/2008 |
| WO | WO-2009041643 A1 | 4/2009 |
| WO | WO-2009058492 A2 | 5/2009 |
| WO | WO-2009086320 A1 | 7/2009 |
| WO | WO-2009125825 A1 | 10/2009 |
| WO | WO-2010127069 A1 | 11/2010 |
| WO | WO-2010151526 A1 | 12/2010 |
| WO | WO-2011104381 A2 | 9/2011 |
| WO | WO-2011111007 A2 | 9/2011 |
| WO | WO-2011122011 A2 | 10/2011 |
| WO | WO-2011/137362 A1 | 11/2011 |
| WO | WO-2011137395 A1 | 11/2011 |
| WO | WO-2012073992 A1 | 6/2012 |
| WO | WO-2012133782 A1 | 10/2012 |
| WO | WO-2013046704 A2 | 4/2013 |
| WO | WO-2013047748 A1 | 4/2013 |
| WO | WO-2013165690 A1 | 11/2013 |
| WO | WO-2014068021 A1 | 5/2014 |
| WO | WO-2014/160129 A2 | 10/2014 |
| WO | WO-2015021166 A2 | 2/2015 |
| WO | WO-2015/134894 A1 | 9/2015 |
| WO | WO-2016098356 A1 | 6/2016 |
| WO | WO-2016106291 A1 | 6/2016 |
| WO | WO-2016160756 A2 | 10/2016 |
| WO | WO-2016209956 A1 | 12/2016 |
| WO | WO-2017044811 A1 | 3/2017 |
| WO | WO-2017051273 A1 | 3/2017 |
| WO | WO-2017123636 A1 | 7/2017 |
| WO | WO-2017218515 A1 | 12/2017 |
| WO | WO-2018/044858 A2 | 3/2018 |
| WO | WO-2018109588 A2 | 6/2018 |
| WO | WO-2019023564 A1 | 1/2019 |

(56) References Cited

FOREIGN PATENT DOCUMENTS

| | | |
|---|---|---|
| WO | WO-2019084438 A1 | 5/2019 |
| WO | WO-2019231983 A1 | 12/2019 |
| WO | WO-2019236345 A1 | 12/2019 |
| WO | WO-2020006266 A1 | 1/2020 |
| WO | WO-2020092549 A1 | 5/2020 |
| WO | WO-2020154626 A1 | 7/2020 |
| WO | WO-2020168079 A1 | 8/2020 |
| WO | WO-2021091937 A1 | 5/2021 |
| WO | WO-2022087339 A1 | 4/2022 |
| WO | WO-2023287991 A1 | 1/2023 |

OTHER PUBLICATIONS

Benatar et al., "Recommendations for myasthenia gravis clinical trials," Muscle Nerve 45(6):909-17 (Jun. 2012).
Burns et al., "The MG Composite: A valid and reliable outcome measure for myasthenia gravis," Neurology 74(18): 1434-40 (May 2010).
Burns et al., "The MG-QOL15 for following the health-related quality of life of patients with myasthenia gravis," Muscle Nerve 43(1): 14-8 (Jan. 2011).
Burns, "History of outcome measures for myasthenia gravis," Muscle Nerve. 42(1):5-13 (Jul. 2010).
Cella, "Measuring Quality of Life in Neurological Disorders; Final Report of the Neuro-QOL Study Sep. 2010." pp. 1-85, (2010).
Communication enclosing the Extended European Search Report for European Patent Application No. 21159097.1, dated Oct. 14, 2021 (11 pages).
Conti-Fine et al., "Myasthenia gravis: past, present, and future," J. Clin. Invest. 116(11 ): 2843-54 (Nov. 2006).
Dalakas, "Intravenous immunoglobulin in autoimmune neuromuscular diseases," JAMA 291(19):2367-75 (May 2004).
Engel et al., "Immune complexes (IgG and C3) at the motor end-plate in myasthenia gravis: ultrastructural and light microscopic localization and electrophysiological correlations," Mayo Clin. Proc. 52(5): 267-80 (May 1977).
European Medicines Agency, Committee for Medicinal Products for Human Use (Chmp); Chmp extension of indication variation assessment report—Soliris, eculizumab; dated Aug. 1, 2017, pp. 1-109.
European Medicines Agency, Scientific Discussion—Soliris, Inn: Eculizumab. 2007 (retrieved on Oct. 2, 2017); pp. 1-41.
Gatault et al., "Therapeutic Drug Monitoring of Eculizumab: Rationale for an Individualized Dosing Schedule." mAbs 7(6):1205-11 (Sep. 2015).
Guptill et al: "Current Treatment, Emerging Translational Therapies, and New Therapeutic Targets for Autoimmune Myasthenia Gravis", Neurotherapeutics, vol. 13, No. 1, Oct. 28, 2015 (Oct. 28, 2015), pp. 118-131, XP036010988, ISSN: 1933-7213, DOI: 10.1007/513311-015-0398-Y.
Howard et al., "A randomized, double-blind, placebo-controlled phase II study of eculizumab in patients with refractory generalized myasthenia gravis," Muscle Nerve 48(1):76-84 (Jul. 2013; Epub Apr. 30, 2013).
Howard et al., "Dual Responder Analyses of Both Muscle Strength and Activities of Daily Living, Eculizumab Versus Placebo, in Refractory Generalized Myasthenia Gravis (gMG) Patients: Results from the REGAIN Study" Abstract, Poster and Presentation from the 69th Annual Meeting of the American Academy of Neurology (AAN), Apr. 22, 2017, pp. 1-5.
Howard et al., "Eculizumab Results in Improvement in Activities of Daily Living and Muscle Strength in Refractory Generalized Myasthenia Gravis Patients Compared with Placebo" Abstract and Presentation from The New York Academy of Sciences (NYAS) 13th International Conference on Myasthenia Gravis and Related Disorders, May 15, 2017, pp. 1-12.
Howard et al., "REGAIN: A Phase 3 Randomized, Double-Blind, Placebo-Controlled, Multi-Center Study to Evaluate the Safety and Efficacy of Eculizumab in Subjects with Refractory Generalized Myasthenia Gravis (gMG)" Abstract and Presentation from the American Associate of Neuromuscular & Electrodiagnostic Medicine (AANEM), Sep. 14, 2016, pp. 1-19.
Howard et al., "REGAIN: A Randomized, Double-Blind, Placebo-Controlled Multi-Center Phase 3 Study of the Safety and Efficacy of Eculizumab in Subjects with Refractory Generalized Myasthenia Gravis" Abstract and Presentation from the International Congress on Neuromuscular Diseases, Jul. 5, 2016, pp. 1-16.
Howard et al: "QMG and MG-AOL correlations: Study of eculizumab treatment of myasthenia gravis: Short Reports", Muscle Nerve, vol. 56, No. 2, Dec. 23, 2016 (Dec. 23, 2016), pp. 328-330, XP055683461, ISSN: 0148-639X, DOI: 10.1002/mus.25529.
Howard et al: "Safety and efficacy of eculizumab in anti-acetylcholine receptor antibody-positive refractory generalised myasthenia gravis (REGAIN): a phase 3, randomised, double-blind, placebo-controlled, multicentre study", Lancet Neurology, vol. 16, No. 12, Nov. 14, 2017 (Nov. 14, 2017), pp. 976-986, XP085267220, ISSN: 1474-4422, DOI: 10.1016/S1474-4422(17)30369-1.
Howard, "Clinical Overview of MG," Myasthenia Gravis Foundation of America, Inc., pp. 1-7 (Jun. 2015).
Kelly et al., "Modification of the Eculizumab Dose to Successfully Manage Intravascular Breakthrough Hemolysis in Patients with Paroxysmal Nocturnal Hemoglobinuria," Blood. 112(11):1180-1181 (Nov. 2008).
Kim et al., "Treatment of myasthenia gravis based on its immunopathogenesis," J. Clin. Neurol. 7(4): 173-83 (Dec. 2011; Epub Dec. 29, 2011).
Lai et al., "Quality-of-Life Measures in Children with Neurological Conditions: Pediatric Neuro-QOL." Neurorehabilitation and Neural Repair. 26(1):1-19 (Jul. 2011).
Lathia et al. "Population Pharmacokinetic and Pharmacodynamic Analysis of Eculizumab to Support Phase III Dosing Regimen in Patients with Refractory Generalized Myasthenia Gravis" presented at the American Society for Clinical Pharmacology and Therapeutics annual Meeting, Atlanta, GA, (Mar. 2015) (1 page).
Mantegazza et al., "Animal models of myasthenia gravis: utility and limitations", International Journal of General Medicine, Mar. 4, 2016, pp. 53-64.
Muppidi et al., "MG-ADL: still a relevant outcome measure," Muscle Nerve 44(5): 727-31 (Nov. 2011).
Muppidi, "The myasthenia gravis—specific activities of daily living profile." Ann. N.Y. Acad. Sci. 1274:114-19 (Dec. 2012).
Nastuk et al., "Changes in serum complement activity in patients with myasthenia gravis," Proc. Soc. Exp. Biol. Med. 105: 177-84 (Oct. 1960).
NCT00670774, STEGALL, "Dosing Regimen of Eculizumab Added to Conventional Treatment in Positive Cross Match Living Donor Kidney Transplant." ClinicalTrials.gov last updated Jun. 8, 2015 (retrieved on Oct. 2, 2017); pp. 1-6.
Nilsson et al., "Columbia-Suicide Severity Rating Scale Scoring and Data Analysis Guide," pp. 1-13, (Feb. 2013).
Peng et al., "Role of C5 in the development of airway inflammation, airway hyperresponsiveness, and ongoing airway response," J. Clin. Invest. 115(6):1590-600 (Jun. 2005; Epub May 12, 2005).
Phillips, "The epidemiology of myasthenia gravis," Semin. Neurol. 24(1): 17-20 (Mar. 2004).
Posner et al., "The Columbia-Suidice Severity Rating Scale: initial validity and internal consistency findings from three multisite studies with adolescents and adults," Am. J. Psychiatry 168(12): 1266-77 (2011).
Sahashi et al., "Ultrastructural localization of immune complexes (IgG and C3) at the end-plate in experimental autoimmune myasthenia gravis." J. Neuropathol. Exp. Neurol. 37(2): 212-23 (Mar.-Apr. 1978).
Sanders & Evoli, "Immunosuppressive Therapies in Myasthenia Gravis." Autoimmunity. 43(5-6):428-35 (Aug. 2010).
Sieb, "Myasthenia gravis: an update for the clinician" Clin Exp Immunol. 175(3):408-18 (Mar. 2014).
Soltys et al., "Extraocular Muscle Susceptibility to Myasthenia Gravis Unique Immunological Environment?" available in PMC Jun. 1, 2009, published in final edited form as: Ann N Y Acad Sci. 1132:220-224 (2008).

(56) References Cited

OTHER PUBLICATIONS

Suh et al., "Clinical Characteristics of Refractory Myasthenia Gravis Patients, " Yale Journal of Biology and Medicine 86 (2013), pp. 255-260.
Supplementary European search report for European application EP3463461 dated Apr. 20, 2020.
Szende & Williams, "Measuring Self-Reported Population Health: An International Perspective based on EQ-5D," pp. 1-115 (2004).
Tapia, Graduate Thesis: "Development and Validation of a New Measure of Impairment in Myasthenia Gravis: The Myasthenia Gravis Impairment Index." University of Toronto, pp. 1-89, 2015.
The International Search Report for International Application No. PCT/US2017/032767; mailed Oct. 19, 2017, pp. 1-8.
Tuzun et al., "Unraveling myasthenia gravis immunopathogenesis using animal models", Drug Discovery Today: Disease Models, Department of Microbiology and Immunology, vol. 3 No. 1, pp. 15-20 (2006).
Vakeva et al., "Myocardial infarction and apoptosis after myocardial ischemia and reperfusion: role of the terminal complement components and inhibition by anti-C5 therapy, " Circulation 97(22): 2259-67 (Jun. 1998).
Vidarsson et al., "IgG subclasses and allotypes: from structure to effector functions," Frontiers in Immunology, vol. 5 Article 520, published Oct. 20, 2014, pp. 1-17.
Vincent & Drachman, "Myasthenia gravis," Adv. Neurol. 88:159-88 (2002).
Wang et al, "A Randomized, Double-Blind, Placebo-Controlled, Phase 3, Multi-Center Study to Evaluate the Safety and Efficacy of Eculizumab in Subjects with Refractory Generalized Myasthenia Gravis: REGAIN" Poster from The Muscle Study Group Society Scientific Meeting, Sep. 19, 2015, one page.
Wang et al., "Complement inhibition with an anti-C5 monoclonal antibody prevents hyperacute rejection in a xenograft heart transplantation model," Transplantation 68(11): 1643-51 (Dec. 1999).
Winter et al., "Health-Related Quality of Life in ALS, Myasthenia Gravis and Facioscapulohumeral Muscular Hystrophy." Journal of Neurology. 257(9):1473-1481 (Apr. 2010).
Wurzner et al., "Inhibition of terminal complement complex formation and cell lysis by monoclonal antibodies." Complement. Inflamm. 8(5-6):328-40 (1991).
Zhou et al. "Anti-C5 antibody treatment ameliorates weakness in experimentally acquired myasthenia gravis" J Immunol. 179(12):8562-7 (Dec. 2007).
Notice of Reasons for Rejection for Japanese Patent Application No. 2022-100008, mailed May 16, 2023 (10 pages).
Sawai et al., "Eculizumab treatment of atypical hemolytic uremic syndrome," Nihon Jinzo Gakkai Shi. 56(7):1090-1096 (Jan. 2014) (8 Pages).
Mihu et al., "HELLP syndrome - a multisystemic disorder," J Gastrointestin Liver Dis 16(4): 419- 424 (2007).
Moongkarndi et al., "Immunological and functional properties of two monoclonal antibodies against human C5." Immunobiol 165:323, 1983. (APP).
Moongkarndi et al., "Monoclonal antibodies against the fifth component of human complement" Immunobiol 162:397, 1982. (APP).
Morell et al., "Metabolic properties of IgG subclasses in man," J Clin Invest 49(4): 673-680 (1970).
Mueller et al., "Humanized porcine VCAM-specific monoclonal antibodies with chimeric IgG2/G4 constant regions block human leukocyte binding to porcine endothelial cells," Mol Immunol 34(6): 441-452 (1997).
Muller-Eberhard, "Molecular organization and function of the complement system," Ann Rev Biochem 57: 321-347 (1988).
Mullett et al., "Surface plasmon resonance-based immunoassays," Methods 22: 77-91 (2000).
Mulligan et al., "Selection for animal cells that express the Escherichia coli gene coding for xanthine-guanine phosphoribosyltransferase," Proc Natl Acad Sci USA 78: 2072-2076 (1981).
Mullinax et al., "Expression of a heterodimeric Fab antibody protein in one cloning step," Biotechniques 12(6): 864-869 (1992) (6 pages).
Muyldermans et al., "Recognition of antigens by single-domain antibody fragments: the superfluous luxury of paired domains," Trends Biochem Sci 26: 230-235 (2001).
Newkirk et al., "Differential clearance of glycoforms of IgG in normal and autoimmune-prone mice," Clin Exp Immunol 106(2): 259-264 (1996).
Noris et al., "STEC-HUS, atypical HUS and TTP are all diseases of complement activation," Nat. Rev. Nephrol. 8(11):622-33 (2012).
Nuttall et al., "Immunoglobulin VH domains and beyond: design and selection of single-domain binding and targeting reagents," Curr Pharm Biolech 1: 253-263 (2000).
Park et al., "Attenuation of endothelium-dependent dilation of pig pulmonary arterioles after cardiopulmonary bypass is prevented by monoclonal antibody to complement C5a," Anesth Analg 99(1): 42-48 (1999).
Pavisic et al., "Recombinant human granulocyte colony stimulating factor pre-screening and screening of stabilizing carbohydrates and polyols," Int J Pharm 387(1-2):110-119 (2010).
Petkova et al., "Enhanced half-life of genetically engineered human IgG1 antibodies in a humanized FcRn mouse model: potential application in humorally mediated autoimmune disease," Int Immunol 18(12): 1759-69 (2006).
Poljak, "Production and structure of diabodies," Structure 2(12): 1121-1123 (1994).
Pollock et al., "Transgenic milk as a method for the production of recombinant antibodies," J Immunol Methods. 231(1-2):147-57 (1999).
Qiao et al., "Dependence of antibody-mediated presentation of antigen on FcRn," Proc Natl Acad Sci U S A 105(27):9337-42 (2008).
Rabinovici et al., "Role of complement in endotoxin/platelet-activating factor-induced lung injury," J Immunol 149(5):1744-1750 (1992).
Raju, "Glycosylation Variations with Expression Systems and Their Impact on Biological Activity of Therapeutic Immunoglobulins," BioProcess International 1(4): 44-53 (2003).
Ranta et al., "Transscleral drug delivery to the posterior eye: prospects of pharmacokinetic modeling," Adv Drug Deliv Rev. 58(11):1164-81 (2006).
Rawal et al., "Formation of high-affinity C5 convertases of the alternative pathway of complement," J Immunol. 166(4): 2635-2642 (2001).
Rich et al., "Advances in surface plasmon resonance biosensor analysis," Curr Opin Biotechnol 11: 54-61 (2000).
Riechmann et al., "Single domain antibodies: comparison of camel VH and camelised human VH domains," J Immunol Meth 231: 25-38 (1999).
Riechmann et al., "Reshaping human antibodies for therapy," Nature. 332(6162):323-7 (1988).
Rinder et al., "Blockade of C5a and C5b-9 generation inhibits leukocyte and platelet activation during extracorporeal circulation," J Clin Invest 96: 1564-1572 (1995).
Roberts et al., "Chemistry for peptide and protein PEGylation," Advanced Drug Delivery Reviews 54: 459-476 (2002).
Rogers et al., "Localization of iodine-125-mIP-Des-Met14-bombesin (7-13)NH2 in ovarian carcinoma induced to express the gastrin releasing peptide receptor by adenoviral vector-mediated gene transfer," J Nucl Med 38: 1221-1229 (1997).
Rondon and Marasco, "Intracellular antibodies (intrabodies) for gene therapy of infectious diseases," Annual Review of Microbiology 51: 257-283 (1997).
Roopenian et al., "Human FcRn transgenic mice for pharmacokinetic evaluation of therapeutic antibodies," Methods Mol Biol 602: 93-104 (2010).
Roopenian et al., "FcRn: the neonatal Fc receptor comes of age," Nat Rev Immunol. 7(9):715-25 (2007).
Rosenfeld et al., "In vivo transfer of the human cystic fibrosis transmembrane conductance regulator gene to the airway epithelium," Cell 68: 143-155 (1992).

(56) References Cited

OTHER PUBLICATIONS

Rother et al., "Discovery and development of the complement inhibitor eculizumab for the treatment of paroxysmal nocturnal hemoglobinuria," Nat Biotechnol. 25 (11): 1256-1264 (including p. 1488 Supp) (2007) (10 pages).
Saland, "Liver-kidney transplantation to cure atypical HUS: still an option post-eculizumab?," Pediatr Nephrol. 29(3):329-32 (2014) (Epub. Dec. 22, 2013).
Salvadori et al., "Update on hemolytic uremic syndrome: Diagnostic and therapeutic recommendations," World J Nephrol., 2(3): 56-76 (2013).
Samulski et al., "Helper-free stocks of recombinant adeno-associated viruses: normal integration does not require viral gene expression," J Virol 63: 3822-3828 (1989).
Sarkar et al., "Rational cytokine design for increased lifetime and enhanced potency using pH-activated histidine switching," Nat Biotechnol. 20(9):908-913 (2002).
Sarver et al., Transformation and replication in mouse cells of a bovine papillomavirus--pML2 plasmid vector that can be rescued in bacteria, Proc Natl Acad Sci USA 79(23):7147-51 (1982).
Sawai et al., "Direct production of the Fab fragment derived from the sperm immobilizing antibody using polymerase chain reaction and cDNA expression vectors," Am J Repr Immunol 34: 26-34 (1995).
Schmid et al., "Requirement for C5a in Lung Vascular Injury Following Thermal Trauma to Rat Skin," Schock 8(2): 119-124 (1997).
Schoonbroodt et al., "Oligonucleotide-assisted cleavage and ligation: a novel directional DNA cloning technology to capture cDNAs. Application in the construction of a human immune antibody phage-display library," Nucleic Acids Res 33(9): e81 (2005).
Schreiber et al., "Initiation of the alternative pathway of complement: recognition of activators by bound C3b and assembly of the entire pathway from six isolated proteins," Proc Natl Acad Sci USA 75: 3948-3952 (1978).
Scully et al., "Systemic Involvement at Entry into the Global Atypical Hemolytic Uremic Syndrome (aHUS) Registry," Blood. 128(22):3729 (Dec. 2, 2016) (6 pages).
Sharma et al., "The formulation and delivery of monoclonal antibodies," Therapeutic Monoclonal Antibodies, Chapter 30: 675-711 (2009).
Sheerin et al., "A national specialized service in England for atypical haemolytic uraemic syndrome-the first year's experience," QJM. 109(1):27-33 (Jan. 2016) (7 pages).
Sheridan et al., "Design and preclinical characterization of ALXN1210: A novel anti-C5 antibody with extended duration of action," PLOS One. 13(4):e0195909 (2018) (15 pages).
Sheridan et al., "Design and preclinical characterization of ALXN1210: A next generation anti-C5 monoclonal antibody with improved pharmacokinetics and duration of action," Abstract 63. Immunobiology. 221(10):1158 (2016).
Second Written Opinion of the International Preliminary Examining Authority for International Patent Application No. PCT/US2015/019225, mailed Feb. 5, 2016 (10 pages).
Shields et al., "High resolution mapping of the binding site on human IgG1 for Fc gamma RI, Fc gamma RII, Fc gamma RIII, and FcRn and design of IgG1 variants with improved binding to the Fc gamma R," J Biol Chem. 276(9):6591-604 (2001).
Shields et al., "Lack of fucose on human IgG1 N-linked oligosaccharide improves binding to human Fcgamma RIII and antibody-dependent cellular toxicity," J Biol Chem. 277(30):26733-40 (2002).
Shire et al., "High-concentration antibody formulations," Formulation and Process Development Strategies for Manufacturing Biopharmaceuticals, Chapter 15: 349-381 (2010) (33 pages).
Shopes, "A genetically engineered human IgG mutant with enhanced cytolytic activity," J Immunol. 148(9):2918-22 (1992).
Shu et al., "Secretion of a single-gene-encoded immunoglobulin from myeloma cells," Proc Natl Acad Sci USA 90(17):7995-9 (1993).
Sissons et al., "Antibody-independent activation of the alternative complement pathway by measles virus-infected cells," Proc Natl Acad Sci USA 77(1):559-62 (1980).
Skerra et al., "Assembly of a functional immunoglobulin Fv fragment in Escherichia coli," Science. 240(4855): 1038-41 (1988).
Southern et al., "Transformation of mammalian cells to antibiotic resistance with a bacterial gene under control of the SV40 early region promoter," J Mol Appl Genet. 1(4):327-41 (1982).
Staelens et al., "Humanization by variable domain resurfacing and grafting on a human IgG4, using a new approach for determination of non-human like surface accessible framework residues based on homology modelling of variable domains," Mol Immunol. 43(8): 1243-57 (2006).
Tabrizi et al., "Elimination mechanisms of therapeutic monoclonal antibodies," Drug Discov Today. 11(1-2):81-8 (2006).
Thomas et al., "Inhibition of complement activity by humanized anti-C5 antibody and single-chain Fv," Mol Immunol. 33(17-18): 1389-401 (1996).
Todorovska et al., "Design and application of diabodies, triabodies and tetrabodies for cancer targeting," J Immunol Methods. 248(1):47-66 (2001).
Tofukuji et al., "Anti-C5a monoclonal antibody reduces cardiopulmonary bypass and cardioplegia- induced coronary endothelial dysfunction," 116(6):1060-1068 (1998).
Tsai, "A mechanistic approach to the diagnosis and management of atypical hemolytic uremic syndrome," Transfus Med Rev. 28(4):187-97 (2014) (Abstract only).
Van Beusechem et al., "Long-term expression of human adenosine deaminase in rhesus monkeys transplanted with retrovirus-infected bone-marrow cells," Proc Natl Acad Sci USA 89:7640-7644 (1992).
Van Gurp et al., "Phase 1 dose-escalation study of CP-690 550 in stable renal allograft recipients: preliminary findings of safety, tolerability, effects on lymphocyte subsets and pharmacokinetics," Am J Transplant. 8(8):1711-8 (2008).
Van Kuik-Romeijn et al., "Expression of a functional mouse-human chimeric anti-CD19 antibody in the milk of transgenic mice," Transgenic Res. 9(2): 155-159 (2000).
Verhoeyen et al., "Reshaping human antibodies: grafting an antilysozyme activity," Science 239(4847): 1534-1536 (1988).
Wang et al., "Amelioration of lupus-like autoimmune disease in NZB/WF1 mice after treatment with a blocking monoclonal antibody specific for complement component C5," Proc Natl Acad Sci USA 93(16):8563-8 (1996).
Wang et al., "Anti-C5 monoclonal antibody therapy prevents collagen-induced arthritis and ameliorates established disease," Proc Natl Acad Sci USA 92(19):8955-9 (1995).
Waters et al., "aHUS caused by complement dysregulation: new therapies on the horizon," Pediatr Nephrol. 26(1):41-57 (2011).
Weisman et al., "Soluble human complement receptor type 1: in vivo inhibitor of complement suppressing post-ischemic myocardial inflammation and necrosis," Science. 249(4965): 146-51 (1990).
Wetsel et al., "Deficiency of the murine fifth complement component (C5). A 2-base pair gene deletion in a 5'-exon," J Biol Chem. 265(5):2435-40 (1990).
Wigler et al., "Transformation of mammalian cells with genes from procaryotes and eucaryotes," Cell. 16:777-785 (1979).
Wilson et al., "Retrovirus-mediated transduction of adult hepatocytes," Proc Natl Acad Sci USA 85:3014-3018 (1988).
Wright et al., "Antibody variable region glycosylation: position effects on antigen binding and carbohydrate structure," Embo J. 10(10):2717-23 (1991).
Xu et al., "In vitro characterization of five humanized OKT3 effector function variant antibodies," Cell Immunol. 200(1): 16-26 (2000).
Yüksel et al., "First-Line, Early and Long-Term Eculizumab Therapy in Atypical Hemolytic Uremic Syndrome: A Case Series in Pediatric Patients," Paediatr Drugs. 18(6):413-420 (2016).
Zalevsky et al., "Enhanced antibody half-life improves in vivo activity," Nat Biotechnol. 28(2):157-9 (2010) (6 pages).
Zuber et al., "New insights into postrenal transplant hemolytic uremic syndrome," Nat Rev Nephrol. 7(1):23-35 (2011).
Ambati et al., "Transscleral drug delivery to the retina and choroid," Prog Retin Eye Res. 21(2):145-51 (2002).

(56) References Cited

OTHER PUBLICATIONS

Amsterdam et al., "Limitation of reperfusion injury by a monoclonal antibody to C5a during myocardial infarction in pigs," Am J Physiol. 268(1 Pt 2): H448-57 (1995).
Appel et al., "Membranoproliferative glomerulonephritis type II (dense deposit disease): an update," J Am Soc Nephrol. 16(5):1392-403 (2005).
Armentano et al., "Expression of human factor IX in rabbit hepatocytes by retrovirus-mediated gene transfer: potential for gene therapy of hemophilia B," Proc Natl Acad Sci USA 87(16):6141-6145 (1990).
Baldridge et al., "Monophosphoryl lipid A (MPL) formulations for the next generation of vaccines," Methods. 19:103-7 (1999).
Barocas et al., "Sustained transscleral drug delivery," Expert Opin Drug Deliv. 5(1):1-10 (2008).
Baudino et al., "Crucial role of aspartic acid at position 265 in the CH2 domain for murine IgG2a and IgG2b Fc-associated effector functions," J Immunol. 181(9):6664-9 (2008).
Berge et al., "Pharmaceutical salts," J Pharm Sci. 66:1-19 (1977).
Berkner, "Development of adenovirus vectors for the expression of heterologous genes," Biotechniques. 6(7):616-29 (1988).
Better et al., "Escherichia coli secretion of an active chimeric antibody fragment," Science 240(4855): 1041-1043 (1988).
Bieg et al., "GAD65 and insulin B chain peptide (9-23) are not primary autoantigens in the type 1 diabetes syndrome of the BB rat," Autoimmunity 31:15-24 (1999).
Bless et al., "Roles for C-X-C chemokines and C5a in lung injury after hindlimb ischemia-reperfusion," Am J Physiol 276(1): L57-L63 (1999).
Brodsky, "Complement in hemolytic anemia," Blood. 126(22):2459-65 (2015).
Burmeister et al., "Crystal structure of the complex of rat neonatal Fc receptor with Fc," Nature. 372(6504):379-83 (1994).
Burton et al., "Human antibody effector function," Adv Immunol. 51:1-84 (1992).
Campistol et al.., "An update for atypical haemolytic uraemic syndrome: diagnosis and treatment. A consensus document," Nefrologia. 33(1):27-45 (2013).
Canfield et al., "The binding affinity of human IgG for its high affinity Fc receptor is determined by multiple amino acids in the CH2 domain and is modulated by the hinge region," J Exp Med. 173(6):1483-91 (1991).
Caron et al., "Engineered humanized dimeric forms of IgG are more effective antibodies," J Exp Med. 176(4):1191-5 (1992).
Chaparro-Riggers et al., "Increasing serum half-life and extending cholesterol lowering in vivo by engineering antibody with pH-sensitive binding to PCSK9," J Biol Chem. 287(14):11090-7 (2012).
Chothia et al., "Conformations of immunoglobulin hypervariable regions," Nature. 342(6252):877-83 (1989).
Chowdhury et al., "Long-term improvement of hypercholesterolemia after ex vivo gene therapy in LDLR-deficient rabbits," Science. 254(5039):1802-5 (1991).
Christmann et al., "Eculizumab as first-line therapy for atypical hemolytic uremic syndrome," Pediatrics. 133(6):e1759-63 (2014).
Co et al., "Genetically engineered deglycosylation of the variable domain increases the affinity of an anti-CD33 monoclonal antibody," Mol Immunol. 30(15):1361-7 (1993).
Cooper et al., "The reaction mechanism of human C5 in immune hemolysis," J Exp Med. 132(4): 775-93 (1970).
Crocker et al., "Arthritis, deformities, and runting in C5-deficient mice injected with human rheumatoid arthritis synovium," J Clin Pathol. 27(2):122-4 (1974).
Dai et al., "Gene therapy via primary myoblasts: long-term expression of factor IX protein following transplantation in vivo," Proc Natl Acad Sci USA. 89(22): 10892-5 (1992).
Dall'Acqua et al., "Properties of human IgG1s engineered for enhanced binding to the neonatal Fc receptor (FcRn)," J Biol Chem. 281(33):23514-24 (2006).
Dall'Acqua et al., "Modulation of the Effector Functions of a Human IgG1 through Engineering of Its Hinge Region," J Immunol. 177(2):1129-1138 (2006).

Danos et al., "Safe and efficient generation of recombinant retroviruses with amphotropic and ecotropic host ranges," Proc Natl Acad Sci USA. 85(17):6460-4 (1988).
Datta-Mannan et al., "Monoclonal antibody clearance. Impact of modulating the interaction of IgG with the neonatal Fc receptor," J Biol Chem. 282(3):1709-17 (2007).
Daugherty et al., "Formulation and delivery issues for monoclonal antibody therapeutics," Current Trends in Monoclonal Antibody Development and Manufacture, Chapter 8:103-129 (2010).
Deans et al., "Expression of an immunoglobulin heavy chain gene transfected into lymphocytes," Proc Natl Acad Sci U S A. 81(5): 1292-6 (1984).
Dong et al., "Some new aspects in biosensors," J Biotechnol. 82(4):303-23 (2002).
Duncan et al., "The binding site for C1q on IgG," Nature. 332(6166):738-40 (1988).
Eglitis et al., "Gene expression in mice after high efficiency retroviral-mediated gene transfer," Science. 230(4732):1395-8 (1985).
Eppstein et al., "Biological activity of liposome-encapsulated murine interferon gamma is mediated by a cell membrane receptor," Proc Natl Acad Sci USA. 82(11):3688-9 (1985).
Evans et al., "In vitro and in vivo inhibition of complement activity by a single-chain Fv fragment recognizing human C5," Mol Immunol. 32(16): 1183-95 (1995).
Extended European Search Report for European Patent Application No. 16177656.2 dated Aug. 8, 2016 (7 pages).
Fakhouri et al., "Terminal Complement Inhibitor Eculizumab in Adult Patients With Atypical Hemolytic Uremic Syndrome: A Single-Arm, Open-Label Trial," Am J Kidney Dis. 68(1):84-93 (2016).
Fearon et al., "Properdin: binding to C3b and stabilization of the C3b-dependent C3 convertase," J Exp Med. 142(4):856-63 (1975).
Ferry et al., "Retroviral-mediated gene transfer into hepatocytes in vivo," Proc Natl Acad Sci USA. 88(19):8377-81 (1991).
Fivash et al., "BIAcore for macromolecular interaction," Curr Opin Biotechnol. 9(1):97-101 (1998).
Flotte et al., "Gene expression from adeno-associated virus vectors in airway epithelial cells," Am J Respir Cell Mol Biol. 7(3):349-56 (1992).
Ghetie et al., "Increasing the serum persistence of an IgG fragment by random mutagenesis," Nat Biotechnol. 15(7):637-40 (1997).
Gulsen et al., "Ophthalmic drug delivery through contact lenses," Invest Ophthalmol Vis Sci. 5(7):2342-7 (2004).
Gupta et al., "Adjuvants for human vaccines--current status, problems and future prospects," Vaccine. 13(14):1263-76 (1995).
Hanauske et al., "Phase 1b Dose Escalation Study of Erlotinib in Combination with Infusional 5- Fluorouracil, Leucovorin, and Oxaliplatin in Patients with Advanced Solid Tumors," Clin Cancer Res. 13(2):523-531 (2007).
Heinen et al., "Monitoring and modeling treatment of atypical hemolytic uremic syndrome," Mol Immunol. 54:84-8 (2013).
Hetherington et al., "Phase I dose escalation study to evaluate the safety and pharmacokinetic profile of tefibazumab in subjects with end-stage renal disease requiring hemodialysis," Antimicrob Agents Chemother. 50(10):3499-500 (2006).
Hezareh et al., "Effector function activities of a panel of mutants of a broadly neutralizing antibody against human immunodeficiency virus type 1," J Virol. 75(24): 12161-8 (2001).
Hillmen et al., "Effect of eculizumab on hemolysis and transfusion requirements in patients with paroxysmal nocturnal hemoglobinuria," N Engl J Med. 350(6):552-9 (2004).
Hillmen et al., "Long-term safety and efficacy of sustained eculizumab treatment in patients with paroxysmal nocturnal haemoglobinuria," Br J Haematol. 162(1):62-73 (2013).
Hinton et al., "Engineered human IgG antibodies with longer serum half-lives in primates," J Biol Chem. 279(8):6213-6 (2004).
Hinton et al., "An engineered human IgG1 antibody with longer serum half-life," J Immunol. 176(1):346-56 (2006).
Hirt-Minkowski et al., "Atypical hemolytic uremic syndrome: update on the complement system and what is new," Nephron Clin Pract. 114(4):c219-35 (2010).

(56) References Cited

OTHER PUBLICATIONS

Holers et al., "The alternative pathway of complement in disease: opportunities for therapeutic targeting," Mol Immunol. 41(2-3):147-52 (2004).
Holers, "The spectrum of complement alternative pathway-mediated diseases," Immunol Rev. 223:300-16 (2008).
Homeister et al., "Soluble complement receptor type 1 prevents human complement-mediated damage of the rabbit isolated heart," J Immunol. 150(3):1055-64 (1993).
Hou et al., "Expression of active thrombopoietin and identification of its key residues responsible for receptor binding," Cytokine. 10(5):319-30 (1998).
Houdebine, "Antibody manufacture in transgenic animals and comparisons with other systems," Curr Opin Biotechnol. 13(6):625-9 (2002).
Huber et al., "Retroviral-mediated gene therapy for the treatment of hepatocellular carcinoma: an innovative approach for cancer therapy," Proc Natl Acad Sci U S A. 88(18):8039-43 (1991).
Hudson et al., "High avidity scFv multimers; diabodies and triabodies," J Immunol Methods. 231(1-2): 177-89 (1999).
Huston et al., "Protein engineering of single-chain Fv analogs and fusion proteins," Methods Enzymol. 203:46-88 (1991).
Hwang et al., "Hepatic uptake and degradation of unilamellar sphingomyelin/cholesterol liposomes: a kinetic study," Proc Natl Acad Sci USA. 77(7):4030-4 (1980).
Hwu et al., "Functional and molecular characterization of tumor-infiltrating lymphocytes transduced with tumor necrosis factor-alpha cDNA for the gene therapy of cancer in humans," J Immunol. 150(9):4104-15 (1993).
Igawa et al., "Antibody recycling by engineered pH-dependent antigen binding improves the duration of antigen neutralization," Nat Biotechnol. 28(11): 1203-7 (2010).
Isaacs et al., "Therapy with monoclonal antibodies. II. The contribution of Fc gamma receptor binding and the influence of C(H)1 and C(H)3 domains on in vivo effector function," J Immunol. 161(8):3862-9 (1998).
International Preliminary Report on Patentability for International Patent Application No. PCT/US2018/044071, issued Jan. 28, 2020 (8 pages).
International Search Report and Written Opinion for International Patent Application No. PCT/US2015/019225 mailed May 18, 2015 (12 pages).
International Search Report and Written Opinion for International Patent Application No. PCT/US2018/044071 mailed Oct. 2, 2018 (12 pages).
Isenman et al., "The interaction of C5 with C3b in free solution: a sufficient condition for cleavage by a fluid phase C3/C5 convertase," J Immunol. 124(1):326-31 (1980) (Abstract only).
Ishii-Watabe et al., "Molecular Design of Therapeutic Antibodies," Pharmaceutics 74(1):4-11 (2014) (16 pages).
Israel et al., "Increased clearance of IgG in mice that lack beta 2-microglobulin: possible protective role of FcRn," Immunology. 89(4):573-8 (1996).
Ito et al., "The His-probe method: effects of histidine residues introduced into the complementarity- determining regions of antibodies on antigen-antibody interactions at different pH values," FEBS Lett. 309(1):85-8 (1992).
Johne et al., "Epitope mapping and binding kinetics of monoclonal antibodies studied by real time biospecific interaction analysis using surface plasmon resonance," J Immunol Methods. 160(2):191-8 (1993).
Johnson et al., "3-O-Desacyl monophosphoryl lipid A derivatives: synthesis and immunostimulant activities," J Med Chem. 42(22):4640-9 (1999).
Jones et al., "Replacing the complementarity-determining regions in a human antibody with those from a mouse," Nature. 321(6069):522-5 (1986).
Jonsson et al., "Introducing a biosensor based technology for real-time biospecific interaction analysis," Ann Biol Clin (Paris). 51(1): 19-26 (1993).
Jonsson et al., "Real-time biospecific interaction analysis using surface plasmon resonance and a sensor chip technology," Biotechniques. 11(5):620-7 (1991).
Junghans et al., "The protection receptor for IgG catabolismis the beta2-microglobulin-containing neonatal intestinal transport receptor," Proc Natl Acad Sci U S A. 93(11):5512-6 (1996).
Jungi et al., "Delayed hypersensitivity reactions to Listeria monocytogenes in rats decomplemented with cobra factor and in C5-deficient mice," Immunology. 43(2):271-9 (1981).
Kaszubska et al., "Expression, purification, and characterization of human recombinant thrombopoietin in Chinese hamster ovary cells," Protein Expr Purif. 18(2):213-20 (2000).
Kay et al., "Hepatic gene therapy: persistent expression of human alpha 1-antitrypsin in mice after direct gene delivery in vivo," Hum Gene Ther. 3(6):641-7 (1992).
Kim et al., "Transport barriers in transscleral drug delivery for retinal diseases," Ophthalmic Res. 39(5):244-54 (2007).
Kinstler et al., "Mono-N-terminal poly(ethylene glycol)-protein conjugates," Adv Drug Deliv Rev. 54(4):477-85 (2002).
Klein et al., "Expression of biological effector functions by immunoglobulin G molecules lacking the hinge region," Proc Natl Acad Sci U S A. 78(1):524-8 (1981).
Kroshus et al., "Complement inhibition with an anti-C5 monoclonal antibody prevents acute cardiac tissue injury in an ex vivo model of pig-to-human xenotransplantation," Transplantation. 60(11):1194-202 (1995).
Lee et al., "High-affinity human antibodies from phage-displayed synthetic Fab libraries with a single framework scaffold," J Mol Biol. 340(5):1073-93 (2004).
Lee et al., "Prolonged circulating lives of single-chain Fv proteins conjugated with polyethylene glycol: a comparison of conjugation chemistries and compounds," Bioconjug Chem. 10(6):973-81 (1999).
Legendre et al., "Terminal complement inhibitor eculizumab in atypical hemolytic-uremic syndrome," N Engl J Med. 368(23):2169-81 (2013).
Levy et al., "Restoration of haemolytic complement activity in C5-deficient mice by gene complementation in hybrid cells," Nat New Biol. 229(2):51-2 (1971).
Licht et al., "The global aHUS registry: methodology and initial patient characteristics," BMC Nephrol. 10:16:207 (2015) (8 pages).
Lodmell et al., "DNA vaccination of mice against rabies virus: effects of the route of vaccination and the adjuvant monophosphoryl lipid A (MPL)," Vaccine. 18(11-12):1059-66 (2000).
Loirat et al., "Plasmatherapy in atypical hemolytic uremic syndrome," Semin Thromb Hemost. 36(6):673-81 (2010).
Loirat et al., "An international consensus approach to the management of atypical hemolytic uremic syndrome in children," Pediatr Nephrol. 31(1): 15-39 (Jan. 2016).
Loirat et al., "Atypical hemolytic uremic syndrome," Orphanet J Rare Dis. 6:60 (2011) (30 pages).
Lusky et al., "Inhibition of SV40 replication in simian cells by specific pBR322 DNA sequences," Nature. 293(5827):79-81 (1981).
Malina et al., "Peripheral gangrene in children with atypical hemolytic uremic syndrome," Pediatrics. 131(1):e331-5 (2013).
McLaughlin et al., "Adeno-associated virus general transduction vectors: Analysis of proviral structures," J Virol. 62:1963-1973 (1988).
Medicus et al., "Alternative pathway of complement: recruitment of precursor properdin by the labile C3/C5 convertase and the potentiation of the pathway," J Exp Med. 144(4): 1076-93 (1976).
Anonymous: "BLA 125166/172 Soliris Risk Evaluation and Mitigation Strategy (Rems)", Alexion Pharmaceuticals Oct. 1, 2014 (Oct. 1, 2014), pp. 5-48, XP055358379, Retrieved from the Internet: URL:https://www.fda.gov/downloads/Drugs/DrugSafety/PostmarketDrugSafetyInformationforPatie ntsandProviders/UCM217725.pdf [retrieved on Mar. 23, 2017].
Sahelijo et al., "First in Human Single-Ascending Dose Study: Safety, Biomarker, Pharmacokinetics and Exposure-Response Relationships of ALXN1210, a Humanized Monoclonal Antibody to C5, with Marked Half-Life Extension and Potential for Significantly Longer Dosing Intervals," Blood. 126(23): 4777 (2015) (2 pages).
Lee et al., Abstract 2428: "Immediate, Complete, and Sustained Inhibition of C5 with ALXN1210 Reduces Complement-Mediated

(56) References Cited

OTHER PUBLICATIONS

Hemolysis in Patients with Paroxysmal Nocturnal Hemoglobinuria (PNH): Interim Analysis of a Dose-Escalation Study," ASH 58th annual meeting Dec. 3-6, 2016 Retrieved from the Internet: https://ash.confex.com/ash/2016/webprogram/Paper90053.html [retrieved on 2017-03-23].
Wong et al., "Anticomplement C5 therapy with eculizumab for the treatment of paroxysmal nocturnal hemoglobinuria and atypical hemolytic uremic syndrome," Transl Res. 165(2):306-20 (2015).
International Preliminary Report on Patentability for International Patent Application No. PCT/US2017/013021 issued Jul. 17, 2018 (8 pages).
International Search Report and Written Opinion of the International Searching Authority for International Patent Application No. PCT/US2017/013021 mailed Apr. 19, 2017 (13 pages).
Cooper et al., "Role of heavy chain constant domains in antibody-antigen interaction. Apparent specificity differences among streptococcal IgG antibodies expressing identical variable domains," J Immunol. 150(6): 2231-42 (1993) (Abstract only).
Liang et al., "Dramatic activation of an antibody by a single amino acid change in framework," Sci Rep. 11(1):22365 (2021) (9 pages).
Anonymous, "Highlights of Prescribing Information—ULTOMIRIS (ravulizumab-cwvz) injection, for intravenous use Initial U.S. Approval: 2018", (Oct. 1, 2019), URL: Ultomiris (ravulizumab-cwvz) injection, for intravenous use Initial U.S. Approval: 2018.
Anonymous, "Recipe: Sodium phosphate", doi: 10.1101/PDB. REC8303, Issn 1559-6095, pp. 1-3, Cold Spring Harbor Protocols, URL: http://cshprotocols.cshlp.org/content/2006/1/pdb.rec8303.full?text_only=true, (20150320) (1 page).
Janda et al., "Ig Constant Region Effects on Variable Region Structure and Function," Front Microbiol. 7:22 (Feb. 2016) (10 pages).
Jorgensen et al., "Recent trends in stabilising peptides and proteins in pharmaceutical formulation—considerations in the choice of excipients," Expert Opin Drug Deliv. 6(11):1219-30 (2009).
Licht et al., "Efficacy and safety of eculizumab in atypical hemolytic uremic syndrome from 2-year extensions of phase 2 studies," Kidney Int. 87(5):1061-73 (2015).
International Preliminary Report on Patentability for International Patent Application No. PCT/US2019/039557 issued Dec. 29, 2020 (8 pages).
International Search Report and Written Opinion of the International Searching Authority for International Patent Application No. PCT/US2019/039557 issued Dec. 29, 2020 (12 pages).
International Preliminary Report on Patentability for International Patent Application No. PCT/US2020/058779 issued May 10, 2022 (12 pages).
International Search Report and Written Opinion of the International Searching Authority for International Patent Application No. PCT/US2020/058779 mailed Feb. 18, 2021 (16 pages).
Liu et al., "Recovery and purification process development for monoclonal antibody production," MAbs. 2(5):480-99 (2010).
Wang et al., "Antibody structure, instability, and formulation," J Pharm Sci. 96(1): 1-26 (2007).
Wang, "Instability, stabilization, and formulation of liquid protein pharmaceuticals," Int J Pharm. 185(2):129-88 (1999).
NCT03056040 "Alxn 1210 versus eculizumab in adult participants with paroxysmal nocturnal hemolglobinuria (PNH) currently treated with eculizumab" Alexion Pharmaceuticals, Inc., first posted Feb. 16, 2017 (Year: 2017) (14 pages).
NCT02946463 "ALXN1210 (Ravulizumab) versus eculizumab in complement inhibitor treatment- naive adult participants with paroxysmal nocturnal hemoglobinuria (PNH)" Alexion Pharmaceuticals, Inc. First posted Oct. 27, 2016. (Year: 2016) (13 pages).
Hanafy et al., "Characteristics and outcomes of patients with sickle cell disease admitted to pediatric intensive care: A retrospective review," J Appl Hematology 11(2):68-73 (2020).
Roth et al., "The complement C5 inhibitor crovalimab in paroxysmal nocturnal hemoglobinuria," Blood. 135(12):912-920 (2020).
Sostelly et al., "Characterizing C5 Inhibition with the SMART-Ig Anti-hC5 Antibody Crovalimab in PNH Patients Using Free Available Paratopes," Blood. 134(Supplement_1):1227 (2019) (6 pages).
Al-Ani et al., "Eculizumab in the management of paroxysmal nocturnal hemoglobinuria: patient selection and special considerations," Ther Clin Risk Manag. 12:1161-70 (Aug. 2016).
Curran et al., "Paroxysmal nocturnal hemoglobinuria in pediatric patients," Pediatr Blood Cancer. 59(3):525-9 (2012).
Greenbaum et al., "Eculizumab is a safe and effective treatment in pediatric patients with atypical hemolytic uremic syndrome," Kidney Int. 89(3):701-11 (Mar. 2016).
History of Changes for Study: NCT03131219 Study of ALXN1210 in Children and Adolescents With Atypical Hemolytic Uremic Syndrome (aHUS), Nov. 16, 2022, 4 pages.
Tanaka et al., "The long-acting C5 inhibitor, ravulizumab, is efficacious and safe in pediatric patients with atypical hemolytic uremic syndrome previously treated with eculizumab," Pediatr Nephrol. 36(4):889-898 (2021).
International Preliminary Report on Patentability for International Patent Application No. PCT/US2021/056153 issued Apr. 13, 2023 (8 pages).
International Search Report and Written Opinion of the International Searching Authority for International Patent Application No. PCT/US2021/056153 mailed Feb. 2, 2022 (12 pages).
Ito et al., "Efficacy and safety of eculizumab in childhood atypical hemolytic uremic syndrome in Japan," Clin Exp Nephrol. 20(2):265-72 (Apr. 2016) (Abstract only).
International Search Report and Written Opinion of the International Searching Authority for International Patent Application No. PCT/US2021/040802 mailed Oct. 18, 2021 (9 pages).
NCT02946463 "ALXN1210 versus eculizumab in complement inhibitor treatment-naive adult participants with paroxysmal nocturnal hemoglobinuria (PNH)" ClinicalTrials.gov, [online], Jul. 28, 2017, [retrieved on Jul. 21, 2022], 7 pages https://clinicaltrials.gov/ct2/history/NCT02946463?V_9 View#StudyPage Top>.
History of Change for Study: NCT02949128: Single Arm Study of ALXN 1210 in Complement Inhibitor Treatment-Naive Adult and Adolescent Patients with Atypical Hemolytic Uremic Syndrome (aHUS); Study NCT02949128, Submitted Date: Oct. 27, 2016 (v1). (Year: 2016) (12 pages).
Ward et al., "Complement-derived leukotactic factors in inflammatory synovial fluids of humans," J Clin Invest. 50(3):606-16 (1971).
International Preliminary Report on Patentability for International Patent Application No. PCT/US2019/034293 issued Dec. 1, 2020 (9 pages).
International Preliminary Report on Patentability for International Patent Application No. PCT/US2019/034297 issued Dec. 8, 2020 (10 pages).
International Search Report and Written Opinion of the International Searching Authority for International Patent Application No. PCT/US2019/034293 mailed Aug. 21, 2019 (14 pages).
International Search Report and Written Opinion of the International Searching Authority for International Patent Application No. PCT/US2019/034297 mailed Sep. 25, 2019 (13 pages).
Reiss et al., "Efficacy and safety of eculizumab in children and adolescents with paroxysmal nocturnal hemoglobinuria," Pediatr Blood Cancer. 61(9):1544-50 (2014).
Roeth et al., "Optimization of Dose Regimen for ALXN1210, a Novel Complement C5 Inhibitor, in Patients with Paroxysmal Nocturnal Hemoglobinuria (PNH): Results of 2 Phase 1/2 Studies," Blood. 130(Supplement 1):3482 (Dec. 2017) (8 pages).
Anonymous: "Assessment report Soliris/Eculizumab, "pp. 1-28, Mar. 21, 2013, Retrieved from the Internet: URL: https://www.ema.europa.eu/en/documents/variation-report/soliris-h-c-791-ii- 0050-epar-assessment-report-variation_en.pdf [retrieved on Aug. 7, 2019].
Anonymous: "Study of ALXN1210 in Complement Inhibitor Treatment-Naïve Adult and Adolescent Participants With Atypical Hemolytic Uremic Syndrome (aHUS)," (2016) XP055619305, Retrieved from the Internet: https://clinicaltrials.gov/ct2/show/NCTO2949128?term=alxn1210&rank=8 [retrieved on Sep. 6, 2019] (49 pages).
Anonymous: "Study of Ravulizumab in Children and Adolescents With Atypical Hemolytic Uremic Syndrome (aHUS)", Apr. 27, 2017 (Apr. 27, 2017), pp. 1-6, XP055619309, Retrieved from the

(56) References Cited

OTHER PUBLICATIONS

Internet: URL:https://clinicaltrials.gov/ct2/show/NCT03131219?term=alxn1210&rank=5 [retrieved on Sep. 6, 2019].

Anonymous: "Alexion Receives FDA Approval for ULTOMIRIS (ravulizumab-cwvz) for Atypical Hemolytic Uremic Syndrome (aHUS)," Oct. 18, 2019 (3 pages).

Anonymous: "Ravulizumab for atypical haemolytic uraemic syndrome in adults and children—first line," Aug. 1, 2018, pp. 1-10.

International Preliminary Report on Patentability for International Patent Application No. PCT/US2020/014998 issued Jul. 27, 2021 (9 pages).

International Search Report and Written Opinion of the International Searching Authority for International Patent Application No. PCT/US2020/014998 mailed Jun. 22, 2020 (13 pages).

Rondeau et al., "The long-acting C5 inhibitor, Ravulizumab, is effective and safe in adult patients with atypical hemolytic uremic syndrome naïve to complement inhibitor treatment," Kidney Int. 97(6): 1287-1296 (2020).

International Preliminary Report on Patentability for International Patent Application No. PCT/US2018/057760 issued Apr. 28, 2020 (9 pages).

International Search Report and Written Opinion of the International Searching Authority for International Patent Application No. PCT/US2018/057760 mailed Mar. 21, 2019 (13 pages).

Lee et al., "Results from a Phase 3, Multicenter, Noninferiority Study of Ravulizumab (ALXN1210) Versus Eculizumab In Adult Patients with Paroxysmal Nocturnal Hemoglobinuria (PNH) Naive To Complement Inhibitors," (2018), XP055550310, Retrieved from the Internet: URL:hllps://learningcenter.ehaweb.org/eha/2018/,tockholm/218885/jong.wook.lee.results.from .a.phase.3 .multicenter. noninferiority .study .of.html?f=media= 1 [retrieved on Jan. 31, 2019] the whole document.

Lee et al., "Ravulizumab (ALXN1210) vs eculizumab in adult patients with PNH naive to complement inhibitors: the 301 study," Blood. 133(6):530-539 (2019).

Roth et al., "Ravulizumab (ALXN1210) in patients with paroxysmal nocturnal hemoglobinuria: results of 2 phase 1b/2 studies," Blood Adv. 2(17):2176-2185 (2018).

Chonat et al., "Pharmacokinetics, pharmacodynamics, efficacy, and safety of ravulizumab in pediatric paroxysmal nocturnal hemoglobinuria," Blood Adv. 8(11):2813-2824 (2024).

Anonymous: "Study of ALXN1210 in Children and Adolescents With Atypical Hemolytic Uremic Syndrome {aHUS}", Apr. 27, 2017 (Apr. 27, 2017), pp. 1-9, XP055619309, Retrieved from the Internet: URL:https://clinicaltrials.gov/ct2/show/NCT03131219?term=alxn1210&rank=5 [retrieved on Sep. 6, 2019].

History of Change for Study: NCT02949128: Single Arm Study of ALXN 1210 in Complement Inhibitor Treatment-Naive Adult and Adolescent Patients with Atypical Hemolytic Uremic Syndrome (aHUS); Nov. 17, 2022 (49 pages).

NCT02946463 ALXN1210 Versus Eculizumab in Complement Inhibitor Treatment-Native Adult Patients With Paroxysmal Nocturnal Hemoglobinuria (PNH), ClinicalTrials.gov, [online], Jul. 28, 2017, [retrieved on Jul. 21, 2022], 7 pages.

Alexion Pharmaceuticals Incorporated: "A Phase 3, Randomized, Double-Blind, Placebo- Controlled, Multicenter Study to Evaluate the Safety and Efficacy of Ravulizumab in Complement- Inhibitor-Naive Adult Patients With Generalized Myasthenia Gravis (2018-003243-39)", EU Clinical Trials Register, Oct. 8, 2019 (Oct. 8, 2019), pp. 1-5, Retrieved from the Internet: <URL:https://www.clinicaltrialsregister.eu/ctr-search/trial/2018-003243-39/GB> [retrieved on Oct. 25, 2022].

Albazli et al., "Complement Inhibitor Therapy for Myasthenia Gravis," Front Immunol. 11:917 (2020) (11 pages).

Dalakas, "Progress in the therapy of myasthenia gravis: getting closer to effective targeted immunotherapies," Curr Opin Neurol. 33(5):545-552 (2020).

Mantegazza et al., "Complement Inhibition for the Treatment of Myasthenia Gravis," Immunotargets Ther. 9:317-331 (2020).

Vu et al., "Efficacy and Safety of Ravulizumab, a Long-acting Terminal Complement Inhibitor, in Adults with Anti-Acetylcholine Receptor Antibody-Positive Generalized Myasthenia Gravis: Results from the Phase 3 Champion Mg Study (PI-1. Virtual)," Neurology. vol. 98, No. 18 Supp, May 3, 2022 (May 3, 2022), pp. 1-10.

Howard et al., "Long-term Efficacy and Safety of Ravulizumab, a Long-acting Terminal Complement Inhibitor, in Adults with Anti-Acetylcholine Receptor Antibody-Positive Generalized Myasthenia Gravis: Results from the Phase 3 Champion Mg Open-label Extension (S25.005)," Neurology, vol. 98, No. 18 Supp, May 3, 2022 (May 3, 2022), pp. 1-9.

Vu et al., "Pharmacokinetics and Pharmacodynamics of Ravulizumab in Adults with Generalized Myasthenia Gravis: Results from the Phase 3 Champion Mg Study (P3-1. 002)," Neurology. vol. 98, No. 18 Supp, May 3, 2022 (May 3, 2022), 8 pages.

Mane-Damas et al., "Novel treatment strategies for acetylcholine receptor antibody-positive myasthenia gravis and related disorders," Autoimmun. Rev. 21(7):103104 (2022) (19 pages).

International Preliminary Report on Patentability for International Patent Application No. PCT/US2020/018113 issued Aug. 10, 2021 (6 pages).

International Search Report and Written Opinion of the International Searching Authority for International Patent Application No. PCT/US2020/018113 mailed May 27, 2020 (10 pages).

International Preliminary Report on Patentability for International Patent Application No. PCT/US2022/037147 issued Jan. 16, 2024 (9 pages).

International Search Report and Written Opinion of the International Searching Authority for International Patent Application No. PCT/US2022/037147 mailed Nov. 4, 2022 (15 pages).

Mulydermans, "Single domain camel antibodies: current status," Rev Mol Biotechnol. 74(4):277-302 (Jun. 2001).

Tsai et al., "Use of eculizumab in the treatment of a case of refractory, ADAMTS13-deficient thrombotic thrombocytopenia purpura: additional data and clinical follow-up," Br J Haematol. 162(4):558-9 (Aug. 2013) (3 pages).

* cited by examiner

EUROQOL (EQ-5D) HEALTH QUESTIONAIRE

By placing a checkmark in one box in each group below, please indicate which statements best describe your own health state today.

Mobility

I have no problems in walking about ☐

I have some problems in walking about ☐

I am confined to bed ☐

Self-Care

I have no problems with self-care ☐

I have some problems washing or dressing myself ☐

I am unable to wash or dress myself ☐

Usual Activities (e.g. work, study, housework, family or leisure activities)

I have no problems with performing my usual activities ☐

I have some problems with performing my usual activities ☐

I am unable to perform my usual activities ☐

Pain/Discomfort

I have no pain or discomfort ☐

I have moderate pain or discomfort ☐

I have extreme pain or discomfort ☐

Anxiety/Depression

I am not anxious or depressed ☐

I am moderately anxious or depressed ☐

I am extremely anxious or depressed ☐

Fig. 2A

To help people say how good or bad a health state is, we have drawn a scale (rather like a thermometer) on which the best state you can imagine is marked 100 and the worst state you can imagine is marked 0.

We would like you to indicate on this scale how good or bad your own health is today, in your opinion.

Please do this by drawing a line from the box below to whichever point on the scale indicates how good or bad your health state is today.

Your own health state today

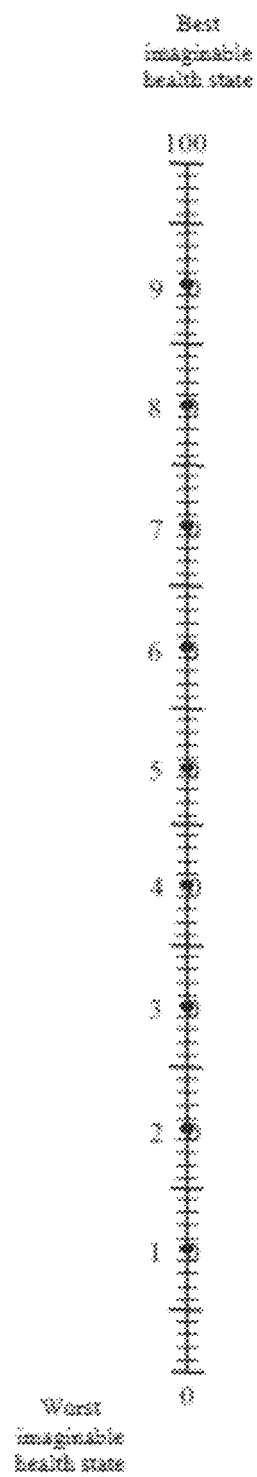

QUANTITATIVE MYASTHENIA GRAVIS TESTING FORM

Patient Name: _____ Patient #: _____ Date: _____
MR#: _____ DOB: _____ Sex: ____ Ht.(in): ____ Wt.(kg): ____
Evaluator: _____ Handedness: _____ Leggedness: _____ Time of Exam: ____
Anticholinesterase Medication: _____
Comments: _____

| TEST ITEMS WEAKNESS | NONE | MILD | MODERATE | SEVERE | SCORE |
|---|---|---|---|---|---|
| GRADE | 0 | 1 | 2 | 3 | |
| Double vision (lateral gaze) Sec. | 60 | 11-59 | 1-10 | Spontaneous | |
| Ptosis (upward gaze) Sec. | 60 | 11-59 | 1-10 | Spontaneous | |
| Facial Muscles | Normal lid closure | Complete, weak, some resistance | Complete, without resistance | Incomplete | |
| Swallowing 4 oz. Water (1/2 cup) | Normal | Minimal coughing or throat clearing | Severe coughing Choking or nasal regurgitation | Cannot swallow (test not attempted) | |
| Speech following counting aloud from 1-50 (onset of dysarthria) | None at #50 | Dysarthria at #30-49 | Dysarthria at #10-29 | Dysarthria at #9 | |
| Right arm outstretched (90°, sitting) Sec. | 240 | 90-239 | 10-89 | 0-9 | |
| Left arm outstretched (90°, sitting) Sec. | 240 | 90-239 | 10-89 | 0-9 | |
| Forced vital capacity | ≥80% | 65-79% | 50-64% | <50% | |
| Rt hand grip: male (Kg) : female | ≥45 / ≥30 | 15-44 / 10-29 | 5-14 / 5-9 | 0-4 / 0-4 | |
| Left hand grip: male (Kg) : female | ≥35 / ≥25 | 15-34 / 10-24 | 5-14 / 5-9 | 0-4 / 0-4 | |
| Head, lifted (45°, supine) Sec. | 120 | 30-119 | 1-29 | 0 | |
| Right leg outstretched (45-50°, supine) Sec. | 100 | 31-99 | 1-30 | 0 | |
| Left leg outstretched (45-50°, supine) Sec. | 100 | 31-99 | 1-30 | 0 | |

TOTAL MG SCORE: _____

Figure 22

Please respond to each question or statement by marking one box per row.

| | In the past 7 days... | Never | Rarely | Sometimes | Often | Always |
|---|---|---|---|---|---|---|
| NQFTG13 | I felt exhausted | □ 1 | □ 2 | □ 3 | □ 4 | □ 5 |
| NQFTG11 | I felt that I had no energy | □ 1 | □ 2 | □ 3 | □ 4 | □ 5 |
| NQFTG15 | I felt fatigued | □ 1 | □ 2 | □ 3 | □ 4 | □ 5 |
| NQFTG06 | I was too tired to do my household chores | □ 1 | □ 2 | □ 3 | □ 4 | □ 5 |
| NQFTG07 | I was too tired to leave the house | □ 1 | □ 2 | □ 3 | □ 4 | □ 5 |
| NQFTG10 | I was frustrated by being too tired to do the things I wanted to do | □ 1 | □ 2 | □ 3 | □ 4 | □ 5 |
| NQFTG14 | I felt tired | □ 1 | □ 2 | □ 3 | □ 4 | □ 5 |
| NQFTG02 | I had to limit my social activity because I was tired | □ 1 | □ 2 | □ 3 | □ 4 | □ 5 |
| NQFTG01 | I needed help doing my usual activities because of my fatigue | □ 1 | □ 2 | □ 3 | □ 4 | □ 5 |
| NQFTG03 | I needed to sleep during the day | □ 1 | □ 2 | □ 3 | □ 4 | □ 5 |
| NQFTG04 | I had trouble starting things because I was too tired | □ 1 | □ 2 | □ 3 | □ 4 | □ 5 |
| NQFTG05 | I had trouble finishing things because I was too tired | □ 1 | □ 2 | □ 3 | □ 4 | □ 5 |
| NQFTG08 | I was too tired to take a short walk | □ 1 | □ 2 | □ 3 | □ 4 | □ 5 |
| NQFTG09 | I was too tired to eat | □ 1 | □ 2 | □ 3 | □ 4 | □ 5 |
| NQFTG12 | I was so tired that I needed to rest during the day | □ 1 | □ 2 | □ 3 | □ 4 | □ 5 |
| NQFTG16 | I felt weak all over | □ 1 | □ 2 | □ 3 | □ 4 | □ 5 |
| NQFTG17 | I needed help doing my usual activities because of weakness | □ 1 | □ 2 | □ 3 | □ 4 | □ 5 |
| NQFTG18 | I had to limit my social activity because I was physically weak | □ 1 | □ 2 | □ 3 | □ 4 | □ 5 |
| NQFTG20 | I had to force myself to get up and do things because I was physically too weak | □ 1 | □ 2 | □ 3 | □ 4 | □ 5 |

METHODS FOR TREATMENT OF REFRACTORY GENERALIZED MYASTHENIA GRAVIS

RELATED APPLICATIONS

This application is a continuation of U.S. patent application Ser. No. 15/595,890, filed May 15, 2017, now abandoned, which claims priority to U.S. Provisional Patent Application Nos. 62/500,643, filed May 3, 2017; 62/489,240, filed Apr. 24, 2017; 62/346,168, filed Jun. 6, 2016; and 62/342,321, filed May 27, 2016, the entire disclosures of which are hereby incorporated herein by reference in their entirety.

BACKGROUND

Myasthenia Gravis (MG) is a rare, debilitating, acquired autoimmune neurologic disorder of the neuromuscular junction (NMJ) caused by the failure of neuromuscular transmission, which results from the binding of auto-antibodies (Abs) to proteins involved in signaling at the NMJ. These proteins include the nicotine acetylcholine receptors (AChRs) or, less frequently, a muscle-specific tyrosine kinase (MuSK) involved in AChR clustering.

MG has a prevalence of 14-20 per 100,000 in the U.S., affecting roughly 60,000 Americans. It affects males and females in equal ratio, although the incidence in females peaks in the 3rd decade as compared to males in whom the peak age at onset is in the 6th or 7th decade. Mortality from MG is approximately 4%, mostly due to respiratory failure.

Myasthenia gravis is clinically characterized by weakness and fatigability of voluntary skeletal muscles. MG may initially present with ocular muscle weakness affecting eye and eyelid movement, referred to as ocular MG (oMG). Ten percent of subjects have disease limited to ocular muscles. Ninety percent of subjects have generalized MG, with muscle weakness involving neck, head, spine, bulbar, respiratory, or limb muscles. Bulbar weakness refers to muscles controlled by nerves originating from the bulb-like part of the brainstem and manifests as difficulty in talking, chewing, swallowing, and control of the head. MG may cause life-threatening respiratory failure, referred to as myasthenic crisis. About 15% to 20% of subjects will experience a myasthenic crisis during the course of their disease, 75% within 2 years of diagnosis, requiring hospitalization and ventilatory support.

While there is no cure for MG, there are a variety of therapies that reduce muscle weakness and improve neuromuscular function. Current available treatments for myasthenia gravis aim to modulate neuromuscular transmission, inhibit the production or effects of pathogenic antibodies, or inhibit inflammatory cytokines. There is currently no specific treatment that targets the underlying pathophysiology of NMJ injury specifically: anti-AChR antibody-AChR interactions resulting in complement activation via the classical pathway and inflammation, with the resultant destruction of the NMJ. There is no specific treatment that corrects the autoimmune defect in MG. With immunosuppressive therapies (ISTs) the current standard of care, which usually combines cholinesterase inhibitors, corticosteroids and immunosuppressive drugs (most commonly azathioprine [AZA], cyclosporin, and mycophenolate mofetil [MMF]), the majority of subjects with MG have their disease reasonably well controlled. However, there is a cohort of refractory subjects who do not respond adequately to ISTs, or cannot tolerate ISTs, and those who require repeated treatments with plasma exchange (PE) and/or intravenous immunoglobulin (IVIg) to maintain clinical stability. For these subjects, an alternative therapy is needed.

SUMMARY

This disclosure provides methods of treating refractory generalized myasthenia gravis in a patient in need thereof comprising administering a therapeutically effective amount of an anti-complement component 5 (C5) antibody or an antigen binding fragment thereof to the patient, wherein the patient is administered the anti-C5 antibody or antigen binding fragment thereof for at least 26 weeks.

In certain embodiments, this disclosure provides a method of treating refractory generalized myasthenia gravis in a patient in need thereof comprising administering a therapeutically effective amount of an anti-C5 antibody or an antigen binding fragment thereof to the patient, wherein the anti-C5 antibody, or an antigen binding fragment thereof is eculizumab or an eculizumab variant and wherein the patient is administered eculizumab or eculizumab variant for at least 26 weeks.

In another embodiment, this disclosure provides a method comprising administering a therapeutically effective amount of eculizumab to a patient, wherein the patient is positive for auto-antibodies binding to nicotinic acetylcholine receptor (anti-AChR) and shows marked generalized weakness or bulbar signs and symptoms of myasthenia gravis while receiving therapy for myasthenia gravis including anticholinesterase inhibitor therapy and immunosuppressant therapy (IST) and requires chronic plasma exchange or chronic IVIg to maintain clinical stability; and wherein the patient is administered eculizumab for at least 26 weeks.

In one embodiment, this disclosure provides a method of treating refractory generalized myasthenia gravis in a patient in need thereof comprising administering eculizumab to the patient, wherein the patient is positive for auto-antibodies binding to nicotinic acetylcholine receptor (anti-AChR) and shows marked generalized weakness or bulbar signs and symptoms of myasthenia gravis while receiving therapy for myasthenia gravis including anticholinesterase inhibitor therapy and immunosuppressant therapy (IST) and had previously failed treatment with at least two immunosuppressive agents or failed treatment with at least one immunosuppressive agent and required chronic plasma exchange or IVIg, and had an MG-ADL total score≥6 at study entry; wherein eculizumab is administered using a phased dosing schedule with an induction phase comprising administering a 900 mg induction dose of eculizumab on day 1, administering 900 mg doses of eculizumab on days 7, 14, and 21, and administering 1200 mg as a fifth induction dose on day 28, wherein the patient is administered eculizumab for at least 26 weeks; wherein the 28 day induction phase of eculizumab treatment is followed by a maintenance phase comprising administering 1200 mg of eculizumab 14 days after the fifth induction dose and administering 1200 mg of eculizumab every 14±2 days thereafter, and wherein the patient has a clinically meaningful improvement (reduction) in two measurements of generalized myasthenia gravis severity selected from the group consisting of MG-ADL, QMG, and MGC.

In a particular embodiment, this disclosure provides a method of treating refractory generalized myasthenia gravis in a patient in need thereof comprising administering eculizumab to the patient, wherein the patient is positive for auto-antibodies binding to nicotinic acetylcholine receptor (anti-AChR) and shows marked generalized weakness or bulbar signs and symptoms of myasthenia gravis while receiving therapy for myasthenia gravis including anticholinesterase inhibitor therapy and immunosuppressant therapy (IST) or requires chronic plasma exchange or chronic IVIg to maintain clinical stability; wherein eculizumab is administered using a phased dosing schedule with an induction phase comprising administering a 900 mg induction dose of eculizumab on day 1, administering 900 mg doses of eculizumab on days 7, 14, and 21, and administering 1200 mg of eculizumab as a fifth induction dose on day 28, and wherein the patient is administered eculizumab for at least 26 weeks.

In a further embodiment, this disclosure provides a method wherein the 28 day induction phase of eculizumab treatment is followed by a maintenance phase comprising administering 1200 mg of eculizumab 14 days after the fifth induction dose and 1200 mg of eculizumab every 14±2 days thereafter.

In certain embodiments, this disclosure provides a method wherein the dosing regimen further comprises a third phase and wherein the third phase comprises performing plasmapheresis on the patient and administering eculizumab at a dose of between 300 and 1200 mg to the patient within 4 hours of completion of plasmapheresis. In other embodiments, the third phase comprises performing plasmapheresis on the patient and administering eculizumab at a dose of between 600 and 900 mg to the patient within 90 minutes of completion of plasmapheresis. In yet other embodiments, the third phase comprises performing plasmapheresis on the patient and administering eculizumab at a dose of 600 mg to the patient within 1 hour of completion of plasmapheresis.

In one embodiment, the patient being treated by the methods provided herein experiences a clinically meaningful improvement (reduction) in Myasthenia Gravis Activities of Daily Living (MG-ADL) score after 26 weeks of treatment. In a particular embodiment, the clinically meaningful improvement the patient experiences is at least a 3 point reduction in the patient's MG-ADL score after 26 weeks of treatment. In another embodiment, the clinically meaningful improvement the patient experiences is at least a 4 point reduction in the patient's MG-ADL score after 26 weeks of treatment.

In another embodiment, the patient being treated by the methods provided herein experiences a clinically meaningful improvement (reduction) in quantitative Myasthenia Gravis score (QMG) after 26 weeks of treatment. In a particular embodiment, the clinically meaningful improvement the patient experiences is at least a 4 point reduction in the patient's QMG score after 26 weeks of treatment. In another embodiment, the clinically meaningful improvement the patient experiences is a 5 point reduction in the patient's QMG score after 26 weeks of treatment.

In another embodiment, the patient being treated by the methods provided herein experiences a clinically meaningful improvement (reduction) in Myasthenia Gravis Composite (MGC) score after 26 weeks of treatment. In a particular embodiment, the clinically meaningful improvement the patient experiences is at least a 6 point reduction in the patient's MGC score after 26 weeks of treatment. In another embodiment, the clinically meaningful improvement the patient experiences is at least a 10 point reduction in the patient's MGC score after 26 weeks of treatment.

In another embodiment, the patient being treated by the methods provided herein experiences a clinically meaningful improvement (reduction) in quality of life as measured by the Myasthenia Gravis Quality of Life (MG-QOL-15) score after 26 weeks of treatment. In a particular embodiment, the clinically meaningful improvement the patient experiences is at least a 6 point reduction in the patient's MG-QOL-15 score after 26 weeks of treatment. In another embodiment, the clinically meaningful improvement the patient experiences is at least an 11 point reduction in the patient's MG-QOL-15 score after 26 weeks of treatment.

In another embodiment, the patient being treated by the methods provided herein experiences a clinically meaningful improvement (reduction) in neuro-fatigue as measured by the Neuro-QOL Fatigue score after 26 weeks of treatment. In a particular embodiment, the clinically meaningful improvement the patient experiences is at least an 8 point reduction in the patient's Neuro-QOL score after 26 weeks of treatment. In another embodiment, the clinically meaningful improvement the patient experiences is at least a 16 point reduction in the patient's Neuro-QOL score after 26 weeks of treatment.

In a certain embodiment, the patient being treated by the methods provided herein experiences a clinically meaningful improvement (increase) in health status as measured by the EQ-SD health status score after 26 weeks of treatment.

In a particular embodiment, this disclosure provides a method of treating refractory generalized myasthenia gravis in a patient in need thereof comprising administering eculizumab to the patient, wherein the patient is positive for auto-antibodies binding to nicotinic acetylcholine receptor (anti-AChR) and shows marked generalized weakness or bulbar signs and symptoms of myasthenia gravis while receiving therapy for my asthenia gravis including anticholinesterase inhibitor therapy and immunosuppressant therapy (IST) or requires chronic plasma exchange or chronic IVIg to maintain clinical stability; wherein eculizumab is administered using a phased dosing schedule comprising administering a 900 mg induction dose of eculizumab on day 1, administering 900 mg doses of eculizumab on days 7, 14, and 21, and administering 1200 mg of eculizumab as a fifth dose on day 28, wherein the patient is administered eculizumab for at least 26 weeks; wherein the 28 day induction phase of eculizumab treatment is followed by a maintenance phase comprising administering 1200 mg of eculizumab 14 days after the fifth induction dose and administering 1200 mg of eculizumab every 14±2 days thereafter, and wherein the patient has a clinically meaningful improvement (reduction) in at least one measurement of generalized myasthenia gravis severity selected from the group consisting of MG-ADL, QMG, MGC, MG-QOL, and Neuro-QOL.

In another embodiment, this disclosure provides a method of treating refractory generalized myasthenia gravis in a patient in need thereof comprising administering eculizumab to the patient, wherein the patient is positive for auto-antibodies binding to nicotinic acetylcholine receptor (anti-AChR) and shows marked generalized weakness or bulbar signs and symptoms of myasthenia gravis while receiving therapy for myasthenia gravis including anticholinesterase inhibitor therapy and immunosuppressant therapy (IST) and requires chronic plasma exchange or chronic IVIg to maintain clinical stability; wherein eculizumab is administered using a phased dosing schedule comprising administering a 900 mg induction dose on day 1, administering 900 mg doses of eculizumab on days 7, 14, and 21, and administering 1200 mg of eculizumab as a fifth dose on day 28, wherein the patient is administered eculizumab for at least 26 weeks; wherein the 28 induction phase of eculizumab treatment is followed by a maintenance phase comprising administering 1200 mg of eculizumab 14 days after the fifth induction dose and administering 1200 mg of eculizumab every 14±2 days thereafter, and wherein the patient has a clinically meaningful improvement (reduction) in two measurements of generalized myasthenia gravis severity selected from the group consisting of MG-ADL, QMG, MGC, MG-QOL, and Neuro-QOL.

In another embodiment, this disclosure provides a method of treating refractory generalized myasthenia gravis in a patient in need thereof comprising administering eculizumab to the patient, wherein the patient is positive for auto-antibodies binding to nicotinic acetylcholine receptor (anti-AChR) and shows marked generalized weakness or bulbar signs and symptoms of myasthenia gravis while receiving therapy for myasthenia gravis including anticholinesterase inhibitor therapy and immunosuppressant therapy (IST) or requires chronic plasma exchange or chronic IVIg to maintain clinical stability; wherein eculizumab is administered using a phased dosing schedule comprising administering a 900 mg induction dose on day 1, administering 900 mg doses of eculizumab on days 7, 14, and 21, and administering 1200 mg as a fifth dose on day 28, wherein the patient is administered eculizumab for at least 26 weeks; wherein the 28 day induction phase of eculizumab treatment is followed by a maintenance phase comprising administering 1200 mg of eculizumab 14 days after the fifth induction dose and administering 1200 mg of eculizumab every 14±2 days thereafter, and wherein the patient has a clinically meaningful improvement (reduction) in three measurements of generalized myasthenia gravis severity selected from the group consisting of MG-ADL, QMG, MGC, MG-QOL, and Neuro-QOL. In certain embodiments, the patient has a clinically meaningful improvement (reduction) in four measurements of generalized myasthenia gravis severity selected from the group consisting of MG-ADL, QMG, MGC, MG-QOL, and Neuro-QOL. In another embodiment, the patient has a clinically meaningful improvement (reduction) in five measurements of generalized myasthenia gravis severity, wherein the five measurements of generalized myasthenia gravis severity are MG-ADL, QMG, MGC, MG-QOL, and Neuro-QOL.

In another embodiment, this disclosure provides a method of treating refractory generalized myasthenia gravis in a patient in need thereof comprising administering eculizumab to the patient, wherein the patient is positive for auto-antibodies binding to nicotinic acetylcholine receptor (anti-AChR) and shows marked generalized weakness or bulbar signs and symptoms of myasthenia gravis while therapy for myasthenia gravis including anticholinesterase inhibitor therapy and immunosuppressant therapy (IST) or requires chronic plasma exchange or chronic IVIg to maintain clinical stability; wherein eculizumab is administered using a phased dosing schedule comprising administering a 900 mg induction dose on day 1, administering 900 mg doses of eculizumab on days 7, 14, and 21, and administering 1200 mg as a fifth dose on day 28, wherein the patient is administered eculizumab for at least 26 weeks; wherein the 28 day induction phase of eculizumab treatment is followed by a maintenance phase comprising administering 1200 mg of eculizumab 14 days after the fifth induction dose and administering 1200 mg every 14±2 days thereafter, and wherein the patient has a clinically meaningful improvement (reduction) in five measurements of generalized myasthenia gravis severity, wherein the five measurements of generalized myasthenia gravis severity are a reduction in MG-ADL of at least 3 points, a reduction in QMG of at least 4 points, a reduction in MGC of at least 6 points, a reduction in MG-QOL of at least 6 points, and a reduction in Neuro-QOL of at least 8 points. In certain embodiments, the patient has a clinically meaningful improvement (reduction) in five measurements of generalized myasthenia gravis severity, wherein the five measurements of generalized myasthenia gravis severity are a reduction in MG-ADL of at least 4 points, a reduction in QMG of at least 5 points, a reduction in MGC of at least 10 points, a reduction in MG-QOL of at least 11 points, and a reduction in Neuro-QOL of at least 16 points.

In a further embodiment, this disclosure provides a method of treating refractory generalized myasthenia gravis in a patient in need thereof comprising administering eculizumab by intravenous infusion. In another embodiment, eculizumab is administered subcutaneously. In another embodiment, the eculizumab comprises a heavy chain amino acid sequence according to SEQ ID NO: 10 and a light chain amino acid sequence according to SEQ ID NO: 11. In yet another embodiment, the eculizumab is an eculizumab variant comprising a heavy chain amino acid sequence according to SEQ ID NO: 14 and a light chain amino acid sequence according to SEQ ID NO: 11. In certain embodiments, the eculizumab is an eculizumab variant comprising a heavy chain variable region amino acid sequence according to SEQ ID NO: 12 and a light chain amino acid sequence according to SEQ ID NO: 11.

In yet another embodiment, this disclosure provides a method of treating refractory generalized myasthenia gravis in a patient in need thereof comprising administering an anti-C5 antibody, or antigen binding fragment thereof, wherein the antibody is an anti-C5 antibody or an antigen binding fragment thereof comprising a heavy chain variable region amino acid sequence according to SEQ ID NO: 27 and a light chain variable region amino acid sequence according to SEQ ID NO: 28. In yet another embodiment, the antibody is an anti-C5 antibody or an antigen binding fragment thereof comprising a heavy chain variable region amino acid sequence according to SEQ ID NO: 35 and a light chain variable region amino acid sequence according to SEQ ID NO: 36. In yet another embodiment, the antibody is an anti-C5 antibody or antigen binding fragment thereof comprising a heavy chain variable region amino acid sequence according to SEQ ID NO: 37 and a light chain variable region amino acid sequence according to SEQ ID NO: 38.

In one embodiment, this disclosure provides a method of treating refractory generalized myasthenia gravis in a patient in need thereof comprising administering an anti-C5 antibody or antigen binding fragment thereof, wherein the patient has failed treatment over one year or more with two or more ISTs in sequence or in combination.

In one embodiment, this disclosure provides a method of treating refractory generalized myasthenia gravis in a patient in need thereof comprising administering an anti-C5 antibody or antigen binding fragment thereof, wherein the patient has failed at least one IST and requires chronic plasma exchange or IVIg to control symptoms of myasthenia gravis.

In one embodiment, this disclosure provides a method of treating refractory generalized myasthenia gravis in a patient in need thereof comprising administering a therapeutically effective amount of eculizumab is maintained at a concentration of between 50-100 μg/mL in the patient's serum.

In one embodiment, this disclosure provides a method of treating refractory generalized myasthenia gravis in a patient in need thereof comprising administering a therapeutically effective amount of eculizumab, wherein the patient experiences a discontinuation in the administration of one or more IST following at least 26 weeks of treatment.

In one embodiment, this disclosure provides a method of treating refractory generalized myasthenia gravis in a patient in need thereof comprising administering a therapeutically effective amount of eculizumab, wherein the patient experiences a reduction in IST dosing following at least 26 weeks of treatment.

BRIEF DESCRIPTION OF THE DRAWINGS

FIGS. 2A and 2B are a schematic of the EUROQOL (EQ-SD) survey of health status questionnaire used in the clinical trial disclosed herein.

FIG. 21 is an exemplary testing form for determining the Quantitative MG score for disease severity.

FIG. 22 is an exemplary response form for determining the Neuro-Quality of Life (QOL) Fatigue score.

DETAILED DESCRIPTION

Figure 1:
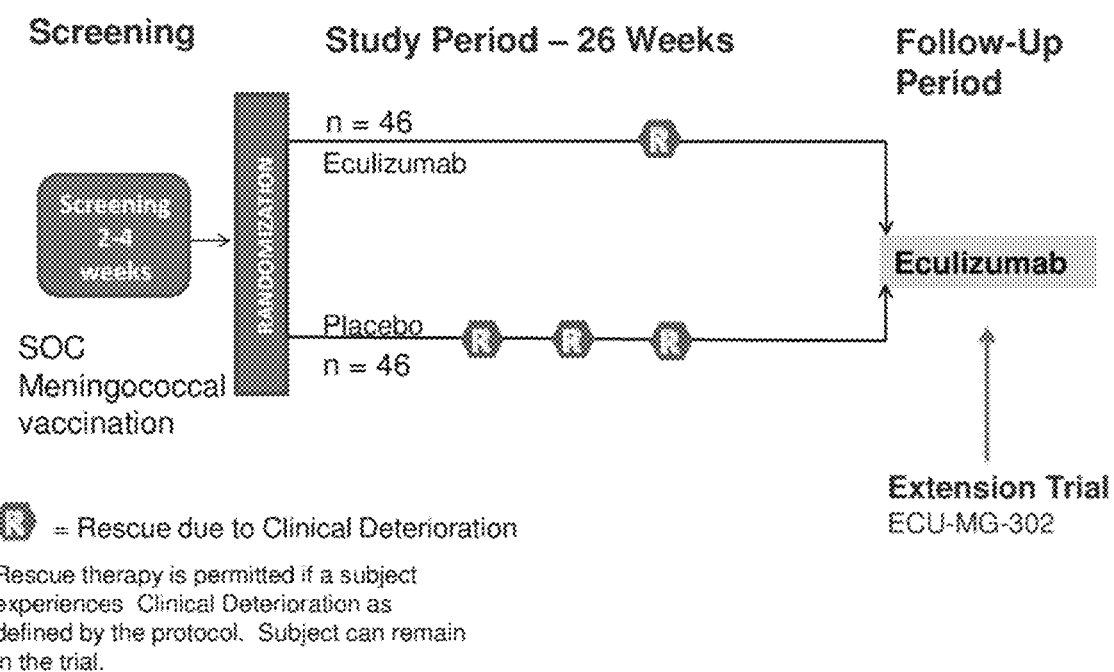
FIG. 1 is a schematic of the overall design of the clinical trial disclosed herein.

The disclosure provides methods of treating myasthenia gravis (MG) in subjects or patients in need thereof by administering an antibody that specifically binds complement component 5 (C5). In certain embodiments, the antibody that specifically binds C5 reduces the rate at which C5 is cleaved, in vivo, into C5a and C5b. In other embodiments, the antibody that specifically binds C5, binds to one or both of the C5a and/or C5b fragments. In any of these embodiments, the antibody that specifically binds C5 blocks the complement cascade at C5, thereby reducing the release of proinflammatory mediators such as C5a and the formation of a C5b-9 Membrane Attack Complex (MAC).

In certain embodiments, the antibody that specifically binds C5 is eculizumab. In more specific embodiments, eculizumab is an antibody or a fragment thereof.

Eculizumab (h5G1.1-mAb) is a humanized monoclonal antibody (mAb) that was derived from the murine anti-human C5 antibody m5G1.1. Eculizumab specifically binds the terminal complement protein C5, thereby inhibiting its cleavage to C5a and C5b during complement activation. This strategic blockade of the complement cascade at C5 prevents the release of proinflammatory mediators and the formation of the Membrane Attack Complex or cytolytic pore, while preserving the early components of complement activation that are essential for the opsonization of microorganisms and clearance of immune complexes.

C5 binding proteins are described in U.S. Pat. No. 6,355,245, which is hereby incorporated herein by reference in its entirety. In certain embodiments, the anti-C5 antibody is a monoclonal antibody having a hybrid IgG2/4 isotype. In other embodiments, the anti-C5 antibodies are effective in reducing the cell-lysing ability of complement present in human blood. This property of the antibodies can be determined by methods well known in the art such as, for example, by the chicken erythrocyte hemolysis method described in U.S. Pat. No. 6,355,245.

In certain embodiments, anti-C5 antibodies bind to C5 or fragments thereof, e.g., C5a or C5b. In other embodiments, the anti-C5 antibodies recognize and bind epitopes on either the alpha chain or the beta chain of purified human complement component C5 and are capable of blocking the conversion of C5 into C5a and C5b by C5 convertase. See Wurzner et al., *Complement. Inflamm.* 8 (5-6): 328-40 (1991).

In other embodiments, the anti-C5 antibodies recognize and bind epitopes within the alpha chain of purified human complement component C5. In this embodiment, the antibodies are capable of blocking the conversion of C5 into C5a and C5b by C5 convertase. In one example of this embodiment, the antibodies can provide this blockade at substantially the same concentrations needed to block hemolytic activity.

In some embodiments, the antibodies specifically bind to an amino-terminal region within the alpha chain, however, they do not specifically bind to free C5a. In certain embodiments, the C5 antibody is able to substantially inhibit complement hemolytic activity and to substantially inhibit the conversion of C5 to produce C5a. In some embodiments, the C5 antibodies provide these functions when used at a molar ratio of antibody to antigen (C5) of 3:1 or less.

As used herein, the term "antibodies" refers to immunoglobulins produced in vivo, as well as those produced in vitro by a hybridoma, and antigen binding fragments (e.g., Fab' preparations) of such immunoglobulins, as well as to recombinantly expressed antibodies or antigen binding proteins, including immunoglobulins, chimeric immunoglobulins, "humanized" immunoglobulins, antigen binding fragments of such immunoglobulins, single chain antibodies, and other recombinant proteins containing antigen binding domains derived from immunoglobulins such as DVD-Ig and CODV-Ig. See U.S. Pat. Nos. 7,161,181 and 9,181,349. "Specificity" refers to the ability of a binding protein to selectively recognize and bind an antigen at a particular location or structure, known as an epitope, often found on the surface of the antigen.

The term "specifically binds," means that a binding protein or fragment thereof forms a complex with an antigen that is relatively stable under physiologic conditions. Specific binding can be characterized by a dissociation constant of at least about $1\times10^{-6}$ M or smaller. In other embodiments, the dissociation constant is at least about $1\times10^{-7}$ M, $1\times10^{-8}$ M, $1\times10^{-9}$ M, or $1\times10^{-10}$ M. Methods for determining whether two molecules specifically bind are well known in the art and include, for example, equilibrium dialysis, surface plasmon resonance, and the like.

The anti-C5 antibodies described herein bind to complement component C5 (e.g., human C5) and inhibit the cleavage of C5 into fragments C5a and C5b. Anti-C5 antibodies (or VH/VL domains derived therefrom) suitable for use in the invention can be generated using methods known in the art.

An exemplary anti-C5 antibody is eculizumab comprising heavy and light chains having the sequences shown in SEQ ID NOs: 10 and 11, respectively, or antigen binding fragments and variants thereof. Eculizumab (also known as SOLIRIS®) is described in U.S. Pat. No. 6,355,245. Eculizumab is a humanized monoclonal antibody that is a terminal complement inhibitor.

In other embodiments, the antibody comprises the heavy and light chain complementarity determining regions (CDRs) or variable regions of eculizumab. Accordingly, in one embodiment, the antibody comprises the CDR1, CDR2, and CDR3 domains of the VH region of eculizumab having the sequence set forth in SEQ ID NO: 7, and the CDR1, CDR2, and CDR3 domains of the VL region of eculizumab having the sequence set forth in SEQ ID NO: 8. In another embodiment, the antibody comprises heavy chain CDR1, CDR2, and CDR3 domains having the sequences set forth in SEQ ID NOs: 1, 2, and 3, respectively, and light chain CDR1, CDR2, and CDR3 domains having the sequences set forth in SEQ ID NOs: 4, 5, and 6, respectively. In another embodiment, the antibody comprises VH and VL regions having the amino acid sequences set forth in SEQ ID NO: 7 and SEQ ID NO: 8, respectively.

Empirical data indicate that serum eculizumab concentrations greater than 50 μg/mL and closer to at least 100 μg/mL are required to significantly reduce free C5 concentrations. Specifically, free C5 concentration was reduced significantly with increasing concentrations of eculizumab beginning at >50 μg/mL and was at near zero levels with eculizumab concentrations above 100 μg/ml. Thus, in various embodiments, the method comprises administering a therapeutically effective amount of eculizumab to the subject, wherein the therapeutically effective amount of eculizumab is maintained at a concentration of at least 50 μg/mL of eculizumab in serum of the subject. In another embodiment, the method comprises administering a therapeutically effective amount of eculizumab to the subject, wherein the therapeutically effective amount of eculizumab is maintained at a concentration of at least 60 μg/mL of eculizumab in serum of the subject. In one embodiment, the method comprises administering a therapeutically effective amount of eculizumab to the subject, wherein the therapeutically effective amount of eculizumab is maintained at a concentration of at least 70 μg/mL of eculizumab in serum of the subject. In another embodiment, the method comprises administering a therapeutically effective amount of eculizumab to the subject, wherein the therapeutically effective amount of eculizumab is maintained at a concentration of at least 80 μg/mL of eculizumab in serum of the subject. In another embodiment, the method comprises administering a therapeutically effective amount of eculizumab to the subject, wherein the therapeutically effective amount of eculizumab is maintained at a concentration of at least 90 μg/mL of eculizumab in serum of the subject. In another embodiment, the method comprises administering a therapeutically effective amount of eculizumab to the subject, wherein the therapeutically effective amount of eculizumab is maintained at a concentration of at least 100 μg/mL of eculizumab in serum of the subject.

Another exemplary anti-C5 antibody is an eculizumab variant, known as antibody BNJ441, and engineered to have a longer half-life (T½) in humans comprising heavy and light chains having the sequences shown in SEQ ID NOs: 14 and 11, respectively, or antigen binding fragments and variants thereof. BNJ441 (also known as ALXN1210) is described in International Publication No. WO 2015/134894 A1 and U.S. Pat. No. 9,079,949, the teachings or which are hereby incorporated by reference. BNJ441 is a humanized monoclonal antibody that is structurally related to eculizumab (SOLIRIS®). BNJ441 selectively binds to human complement protein C5, inhibiting its cleavage to C5a and C5b during complement activation. This inhibition prevents the release of the proinflammatory mediator C5a and the formation of the cytolytic pore-forming membrane attack complex C5b-9 while preserving the proximal or early components of complement activation (e.g., C3 and C3b) essential for the opsonization of microorganisms and clearance of immune complexes.

In other embodiments, the antibody comprises the heavy and light chain CDRs or variable regions of BNJ441. Accordingly, in one embodiment, the antibody comprises the CDR1, CDR2, and CDR3 domains of the VH region of BNJ441 having the sequence set forth in SEQ ID NO: 12, and the CDR1, CDR2, and CDR3 domains of the VL region of BNJ441 having the sequence set forth in SEQ ID NO: 8. In another embodiment, the antibody comprises heavy chain CDR1, CDR2, and CDR3 domains having the sequences set forth in SEQ ID NOs: 19, 18, and 3, respectively, and light chain CDR1, CDR2, and CDR3 domains having the sequences set forth in SEQ ID NOs: 4, 5, and 6, respectively. In another embodiment, the antibody comprises VH and VL regions having the amino acid sequences set forth in SEQ ID NO: 12 and SEQ ID NO: 8, respectively. In another embodiment, the antibody may comprise the heavy chain constant region of BNJ441 having the amino acid sequence set forth in SEQ ID NO: 13.

In various embodiments, eculizumab is administered in a multiphase dosing regimen. For example, the multiphase dosing regimen comprises a first phase and a second phase in various embodiments. In certain embodiments, the first phase is an induction phase and comprises administration of eculizumab at between 900 mg once a week to the subject for between 1-10 weeks. The induction phase is concluded by administering the first maintenance phase dose of 1200 mg one week after the last 900 mg dose.

In other embodiments, the second phase is a maintenance phase and comprises administration of eculizumab at between 1000 and 1400 mg once every two weeks to the subject for 2 weeks, 4 weeks, 6 weeks, 8 weeks, 12, weeks, 26 weeks, or as long as myasthenia gravis persists. In other embodiments, the maintenance phase comprises administration of eculizumab at between 1000 and 1400 mg once every two weeks to the subject for 2 months, 4 months, 6 months, 8 months, 12 months, 2 years, three years, 4 years, 5 years, or for the remaining lifetime of the patient. In other embodiments, the maintenance phase comprises administration of eculizumab at about 1200 mg twice a month (biweekly) once the induction phase is complete.

In another embodiment, the method comprises administering a therapeutically effective amount of eculizumab or an eculizumab variant to the subject, wherein the therapeutically effective amount of eculizumab or eculizumab variant is maintained at a concentration of between 50-100 µg/mL, between 60-100 µg/mL, between 70-100 µg/mL, between 80-100 µg/mL, or between 90-100 µg/ml of eculizumab in serum of the subject.

Another exemplary anti-C5 antibody is antibody BNJ421 comprising heavy and light chains having the sequences shown in SEQ ID NOs: 20 and 11, respectively, or antigen binding fragments and variants thereof. BNJ421 (also known as ALXN1211) is described in International Publication No. WO 2015/134894 A1 and U.S. Pat. No. 9,079,949, the teachings or which are hereby incorporated by reference.

In other embodiments, the antibody comprises the heavy and light chain CDRs or variable regions of BNJ421. Accordingly, in one embodiment, the antibody comprises the CDR1, CDR2, and CDR3 domains of the VH region of BNJ421 having the sequence set forth in SEQ ID NO: 12, and the CDR1, CDR2, and CDR3 domains of the VL region of BNJ421 having the sequence set forth in SEQ ID NO: 8. In another embodiment, the antibody comprises heavy chain CDR1, CDR2, and CDR3 domains having the sequences set forth in SEQ ID NOs: 19, 18, and 3, respectively, and light chain CDR1, CDR2, and CDR3 domains having the sequences set forth in SEQ ID NOs: 4, 5, and 6, respectively. In another embodiment, the antibody comprises VH and VL regions having the amino acid sequences set forth in SEQ ID NO: 12 and SEQ ID NO: 8, respectively. In another embodiment, the antibody may comprise the heavy chain constant region of BNJ421 having the amino acid sequence set forth in SEQ ID NO: 9.

Another exemplary anti-C5 antibody is the 7086 antibody described in U.S. Pat. Nos. 8,241,628 and 8,883,158. In one embodiment, the antibody may comprise the heavy and light chain CDRs or variable regions of the 7086 antibody. See U.S. Pat. Nos. 8,241,628 and 8,883,158. In another embodiment, the antibody, or a fragment thereof, may comprise heavy chain CDR1, CDR2, and CDR3 domains having the sequences set forth in SEQ ID NOs: 21, 22, and 23, respectively, and light chain CDR1, CDR2, and CDR3 domains having the sequences set forth in SEQ ID NOs: 24, 25, and 26, respectively. In another embodiment, the antibody or fragment thereof may comprise the VH region of the 7086 antibody having the sequence set forth in SEQ ID NO: 27, and the VL region of the 7086 antibody having the sequence set forth in SEQ ID NO: 28.

Another exemplary anti-C5 antibody is the 8110 antibody also described in U.S. Pat. Nos. 8,241,628 and 8,883,158. In one embodiment, the antibody may comprise the heavy and light chain CDRs or variable regions of the 8110 antibody. The antibody, or fragment thereof may comprise heavy chain CDR1, CDR2, and CDR3 domains having the sequences set forth in SEQ ID NOs: 29, 30, and 31, respectively, and light chain CDR1, CDR2, and CDR3 domains having the sequences set forth in SEQ ID NOs: 32, 33, and 34, respectively. In another embodiment, the antibody may comprise the VH region of the 8110 antibody having the sequence set forth in SEQ ID NO: 35, and the VL region of the 8110 antibody having the sequence set forth in SEQ ID NO: 36.

Another exemplary anti-C5 antibody comprises a heavy chain variable region amino acid sequence according to SEQ ID NO: 37 and a light chain variable region amino acid sequence according to SEQ ID NO: 38.

In various embodiments, eculizumab, an eculizumab variant such as BNJ441, or other anti-C5 antibody is administered to the subject once a month, once every two months, or once every three months depending on the dose. In another embodiment, the eculizumab, eculizumab variant such as BNJ441, or other anti-C5 antibody is administered once every two weeks, once a week, twice a week, or three times a week. In other embodiments, eculizumab, eculizumab variant such as BNJ441, or other anti-C5 antibody is administered once a week, once every two weeks, once every three weeks, once every four weeks, once every five weeks, once every six weeks, or once every eight weeks depending on the needs of the patient. In certain embodiments, eculizumab, eculizumab variant such as BNJ441, or other anti-C5 antibody in administered intravenously (IV) or subcutaneously (SubQ).

Also, provided herein are pharmaceutical compositions comprising an anti-C5 antibody or antigen binding fragment thereof with a pharmaceutically acceptable excipient for treating MG. In one embodiment, the composition comprises an antibody comprising the CDR1, CDR2, and CDR3 domains of the VH region of eculizumab having the sequence set forth in SEQ ID NO: 7, and the CDR1, CDR2, and CDR3 domains of the VL region of eculizumab having the sequence set forth in SEQ ID NO: 8. In another embodiment, the antibody comprises heavy chain CDR1, CDR2, and CDR3 domains having the sequences set forth in SEQ ID NOs: 1, 2, and 3, respectively, and light chain CDR1, CDR2, and CDR3 domains having the sequences set forth in SEQ ID NOs: 4, 5, and 6, respectively. In another embodiment, the antibody comprises VH and VL regions having the amino acid sequences set forth in SEQ ID NO: 7 and SEQ ID NO: 8, respectively.

In some embodiment, the antibody comprises the heavy and light chain CDRs or variable regions of BNJ441. In one embodiment, the antibody comprises the CDR1, CDR2, and CDR3 domains of the VH region of BNJ441 having the sequence set forth in SEQ ID NO: 12, and the CDR1, CDR2, and CDR3 domains of the VL region of BNJ441 having the sequence set forth in SEQ ID NO: 8. In another embodiment, the antibody comprises heavy chain CDR1, CDR2, and CDR3 domains having the sequences set forth in SEQ ID NOs: 19, 18, and 3, respectively, and light chain CDR1, CDR2, and CDR3 domains having the sequences set forth in SEQ ID NOs: 4, 5, and 6, respectively. In another embodiment, the antibody comprises VH and VL regions having the amino acid sequences set forth in SEQ ID NO: 12 and SEQ ID NO: 8, respectively.

In some embodiment, the antibody comprises the heavy and light chain CDRs or variable regions of BNJ421. In one embodiment, the antibody comprises the CDR1, CDR2, and CDR3 domains of the VH region of BNJ421 having the sequence set forth in SEQ ID NO: 12, and the CDR1, CDR2, and CDR3 domains of the VL region of BNJ421 having the sequence set forth in SEQ ID NO: 8. In another embodiment, the antibody comprises heavy chain CDR1, CDR2, and CDR3 domains having the sequences set forth in SEQ ID NOs: 19, 18, and 3, respectively, and light chain CDR1, CDR2, and CDR3 domains having the sequences set forth in SEQ ID NOs: 4, 5, and 6, respectively. In another embodiment, the antibody comprises VH and VL regions having the amino acid sequences set forth in SEQ ID NO: 12 and SEQ ID NO: 8, respectively.

1. Methods of Treating Myasthenia Gravis

The disclosure provides methods of treating subjects suffering from myasthenia gravis (MG) by administering an antibody that specifically binds C5. In other embodiments, the subject is a mammalian subject.

As used herein, the term "subject" and "patient" are interchangeable. In certain embodiments, subjects and/or patients are mammals. According to certain embodiments, primates include humans. Thus, in certain embodiments, the subjects or patients suffering from MG described herein are humans.

In certain embodiments, MG includes refractory generalized myasthenia gravis. In some embodiments, refractory generalized myasthenia gravis is characterized as including subjects or patients positive for auto-antibodies binding to nicotinic acetylcholine receptor (anti-AChR) who continue to show marked generalized weakness or bulbar signs and symptoms of myasthenia gravis while receiving current standard of care for myasthenia gravis such as cholinesterase inhibitor therapy and immunosuppressant therapy (IST) or who require chronic plasma exchange or chronic IVIg to maintain clinical stability. In other embodiments, refractory generalized myasthenia gravis is characterized as including subjects or patients who continue to show marked generalized weakness or bulbar signs and symptoms of myasthenia gravis while receiving current standard of care for myasthenia gravis such as cholinesterase inhibitor therapy and immunosuppressant therapy (IST) or who require chronic plasma exchange or chronic IVIg to maintain clinical stability.

In other embodiments, MG includes refractory generalized myasthenia gravis. In some embodiments, refractory generalized myasthenia gravis is characterized as including subjects or patients positive for auto-antibodies binding to nicotinic acetylcholine receptor (anti-AChR) who continue to show marked generalized weakness or bulbar signs and symptoms of myasthenia gravis while receiving cholinesterase inhibitor therapy and immunosuppressant therapy (IST) and who require chronic plasma exchange or chronic IVIg to maintain clinical stability. In other embodiments, refractory generalized myasthenia gravis is characterized as including subjects or patients who continue to show marked generalized weakness or bulbar signs and symptoms of myasthenia gravis while receiving cholinesterase inhibitor therapy and immunosuppressant therapy (IST) and who require chronic plasma exchange or chronic IVIg to maintain clinical stability.

As used herein, the phrase "requires chronic plasma exchange" to maintain clinical stability refers to the use of plasma exchange therapy on a patient on a regular basis for the management of muscle weakness at least every 3 months over the last 12 months.

As used herein, the phrase "requires chronic IVIg" to maintain clinical stability refers to the use of IVIg therapy on a patient on a regular basis for the management of muscle weakness at least every 3 months over the last 12 months.

In certain embodiments, treatment of MG includes the amelioration or improvement of one or more symptoms associated with MG. Symptoms associated with MG include muscle weakness and fatigability. Muscles primarily affected by MG include muscles that control eye and eyelid movement, facial expressions, chewing, talking, swallowing, breathing, neck movements, and limb movements.

In other embodiments, treatment of MG includes the improvement of a clinical marker for MG progression. These markers include MG activity of daily living profile (MG-ADL), quantitative Myasthenia Gravis (QMG) score for disease severity, Myasthenia Gravis composite (MGC), negative inspiratory force (NIF), forced vital capacity, MGFA post-intervention status, and other quality of life measurements. In certain embodiments, MG-ADL is the primary score for measuring improvement of MG.

The MG-ADL is an 8-point questionnaire that focuses on relevant symptoms and functional performance of activities of daily living (ADL) in MG subjects (see Table 1). The 8 items of the MG-ADL were derived from symptom-based components of the original 13-item QMG to assess disability secondary to ocular (2 items), bulbar (3 items), respiratory (1 item), and gross motor or limb (2 items) impairment related to effects from MG. In this functional status instrument, each response is graded 0 (normal) to 3 (most severe). The range of total MG-ADL score is 0-24. A clinically meaningful improvement in a patient's MG-ADL would be a 3 point or greater reduction in score after 26 weeks of treatment.

The current QMG scoring system consists of 13 items: ocular (2 items), facial (1 item), bulbar (2 items), gross motor (6 items), axial (1 item), and respiratory (1 item); each graded 0 to 3, with 3 being the most severe (see FIG. 21, originally Table 2). The range of total QMG score is 0-39. The QMG scoring system is considered to be an objective evaluation of therapy for MG and is based on quantitative testing of sentinel muscle groups. The MGFA task force has recommended that the QMG score be used in prospective studies of therapy for MG. A clinically meaningful improvement in a patient's QMG would be a 5 point or greater reduction in score after 26 weeks of treatment.

TABLE 1

MG ACTIVITY OF DAILY LIVING (MG-ADL) PROFILE

| Items | Grade 0 | Grade 1 | Grade 2 | Grade 3 | Score (0, 1, 2, 3) |
|---|---|---|---|---|---|
| 1. Talking | Normal | Intermittent slurring or nasal speech | Constant slurring or nasal, but can be understood | Difficult to understand speech | |
| 2. Chewing | Normal | Fatigue with solid food | Fatigue with soft food | Gastric Tube | |
| 3. Swallowing | Normal | Rare episode of choking | Frequent choking necessitating changes in diet | Gastric Tube | |
| 4. Breathing | Normal | Shortness of breath with exertion | Shortness of breath at rest | Ventilator dependence | |
| 5. Impairment of ability to brush teeth or comb hair | None | Extra effort, but no rest periods needed | Rest periods needed | Cannot do one of these functions | |
| 6. Impairment of ability to arise from a chair | None | Mild, sometimes uses arms | Moderate, always uses arms | Severe, requires assistance | |
| 7. Double vision | None | Occurs, but not daily | Daily, but not constant | Constant | |
| 8. Eyelid drop | None | Occurs, but not daily | Daily, but not constant | Constant | |

The MGC is a validated assessment tool for measuring clinical status of subjects with MG (16). The MGC assesses 10 important functional areas most frequently affected by MG and the scales are weighted for clinical significance that incorporates subject-reported outcomes. See Table 3. MGC will be administered at Screening, Day 1, Weeks 1-4, 8, 12, 16, 20, and 26 or ET (Visits 1-6, 8, 10, 12, 14, and 17 or ET). A clinically meaningful improvement in a patient's MGC would be a 3 point or greater reduction in score after 26 weeks of treatment.

TABLE 3

MG COMPOSITE SCALE

| | | | | | | | | |
|---|---|---|---|---|---|---|---|---|
| Ptosis, upward gaze (PE) | >45 seconds | 0 | 11-45 seconds | 1 | 1-10 seconds | 2 | Immediate | 3 |
| Double vision on lateral gaze, left or right (PE) | >45 seconds | 0 | 11-45 seconds | 1 | 1-10 seconds | 2 | Immediate | 4 |
| Eye closure (PE) | Normal | 0 | Mild weakness (can be forced open with effort) | 0 | Moderate weakness (can be forced open easily) | 1 | Severe weakness (unable to keep eyes closed) | 2 |
| Talking (Pt) | Normal | 0 | Intermittent slurring or nasal speech | 2 | Constant slurring or nasal but can be understood | 4 | Difficult to understand | 6 |
| Chewing (Pt) | Normal | 0 | Fatigue with solid food | 2 | Fatigue with soft food | 4 | Gastric tube | 6 |
| Swallowing (Pt) | Normal | 0 | Rare trouble or choking | 2 | Frequent trouble (change in diet) | 5 | Gastric tube | 6 |
| Breathing | Normal | 0 | SOB with exertion | 2 | SOB at rest | 4 | Ventilator | 9 |
| Neck Flex/Ext (weakest PE) | Normal | 0 | Mild | 1 | Moderate (~50% weak ±15%) | 3 | Severe | 4 |
| Shoulder Abd (PE) | Normal | 0 | Mild | 2 | Moderate (~50% weak ±15%) | 4 | Severe | 5 |
| Hip flexion | Normal | 0 | Mild | 2 | Moderate (~50% weak ±15%) | 4 | Severe | 5 |
| | | 0 | | 15 | | 33 | | 50 |

The 15-item Myasthenia Gravis Qualify of Life 15 scale (MG-QOL 15) is a health-related quality of life evaluative instrument specific to subjects with MG. See Table 4. MG-QOL15 was designed to provide information about subjects' perception of impairment and disability and the degree to which disease manifestations are tolerated and to be easy to administer and interpret. The range of total scores is from 0 to 60. Higher scores translate into a greater extent of a patient's dissatisfaction with MG related dysfunction. The MG-QOL 15 is completed by the subject. Higher scores indicate greater extent of and dissatisfaction with MG-related dysfunction. A clinically meaningful improvement in a patient's MG-QOL 15 would be a decrease in score after 26 weeks of treatment.

TABLE 4

MYASTHENIA GRAVIS QUALIFY OF LIFE 15 SCALE (MG-QOL 15)

| Statement: How true in the past 4 weeks? | Not at all | A little bit | Some-what | Quite a bit | Very Much |
|---|---|---|---|---|---|
| Frustrated by condition | 0 | 1 | 2 | 3 | 4 |
| Trouble using my eyes | 0 | 1 | 2 | 3 | 4 |
| Trouble eating | 0 | 1 | 2 | 3 | 4 |
| Condition limits social life | 0 | 1 | 2 | 3 | 4 |
| Condition limits hobbies/fun | 0 | 1 | 2 | 3 | 4 |
| Trouble meeting family's needs | 0 | 1 | 2 | 3 | 4 |
| Need to plan around condition | 0 | 1 | 2 | 3 | 4 |
| Occupational skills/job negatively affected | 0 | 1 | 2 | 3 | 4 |
| Difficulty speaking | 0 | 1 | 2 | 3 | 4 |
| Trouble driving | 0 | 1 | 2 | 3 | 4 |
| Depressed about condition | 0 | 1 | 2 | 3 | 4 |
| Trouble walking | 0 | 1 | 2 | 3 | 4 |
| Trouble getting around in public places | 0 | 1 | 2 | 3 | 4 |
| Feel overwhelmed by condition | 0 | 1 | 2 | 3 | 4 |
| Trouble performing personal grooming | 0 | 1 | 2 | 3 | 4 |

The Neuro-QOL Fatigue is a reliable and validated brief 19-item survey of fatigue completed by the subject. Higher scores indicate greater fatigue and greater impact of MG on activities (see FIG. 22, originally Table 5). A clinically meaningful improvement in a patient's Neuro-QQL Fatigue score would be reflected in a decrease in score after 26 weeks of treatment.

The EUROQOL (EQ-SD) is a reliable and validated survey of health status in 5 areas: mobility, self-care, usual activities, pain/discomfort, and anxiety/depression, completed by the subject. Each area has 3 levels: level 1 (no problems), level 2 (some problems), and level 3 (extreme problems) (see FIGS. 2A and 2B). The EQ VAS records the subject's self-rated health on a vertical, 20 cm visual analogue scale where the endpoints are labeled "Best imaginable health state, marked as 100" and "Worst imaginable health state, marked as 0." The EQ-5D is administered at Day 1, Weeks 4, 8, 12, 16, 20, and 26 or ET (Visits 2, 6, 8, 10, 12, 14, and 17 or ET). A clinically meaningful improvement in a patient's EQ-5D would be reflected as an increase in score after 26 weeks of treatment.

Subjects with increasingly severe MG can suffer from potentially fatal respiratory complications including profound respiratory muscle weakness. Respiratory function is monitored closely for evidence of respiratory failure in MG subjects and ventilator support is recommended in the event of consistent declines in serial measurements of Forced Vital Capacity (FVC) or Negative Inspiratory Force (NIF), loss of upper airway integrity (difficulty handling oral secretions, swallowing, or speaking) or in the setting of emerging respiratory failure. FVC as one of the test items in QMG is performed when QMG is performed. NIF was performed using the NIF Meter.

The MG clinical state is assessed using the MGFA Post-Intervention Status. Change in status categories of Improved, Unchanged, Worse, Exacerbation and Died of MG as well as the Minimal Manifestation (MM) can be assessed.

According to certain embodiments, patients administered eculizumab show a reduced MG-ADL. In certain embodiments, the subjects have an initial MG-ADL score of greater than 6 points. In other embodiments, the subjects have an initial MG-ADL score greater than 0, 1, 2, 3, 4, 5, 6, 7, 8, 9, 10, 11, 12, 13, 14, 15, 16, 17, 18, 19, 20, 21, 22, or 23 points. In certain embodiments, after a course of treatment with eculizumab, the MG-ADL score of the subject has been reduced to less than 6 points. In other embodiments, the MG-ADL score has been reduced at least 1 point, at least 2 points, at least 3 points, at least 4 points, at least 5 points, at least 6 points, at least 7 points, at least 8 points, at least 9 points, at least 10 points, at least 11 points, at least 12 points, at least 13 points, at least 14 points, at least 15 points, at least 16 points, at least 17 points, at least 18 points, at least 19 points, at least 20 points, at least 21 points, at least 22 points, at least 23 points, or at least 24 points after treatment with eculizumab. In certain embodiments, the MG-ADL score of the patient is reduced by at least 1 point after a course of treatment with eculizumab. In other embodiments, the MG-ADL of the patient is reduced by 1, 2, 3, 4, 5, 6, 7, 8, 9, 10, 11, 12, 13, 14, 15, 16, 17, 18, 19, 20, 21, 22, 23, or 24 points after a course of treatment with eculizumab.

According to certain embodiments, the course of treatment with eculizumab lasts for 26 weeks. According to other embodiments, the course of treatment lasts for 26-52, 26-78, 26-104, 26-130, 26-156, 26-182, 26-208 weeks, or more. In other embodiments, the course of treatment lasts for greater than 26, 27, 28, 29, 30, 31, 32, 33, 34, 35, 36, 37, 38, 39, 40, 41, 42, 43, 44, 45, 46, 47, 48, 49, 50, 51, 52, 78, 104, 130, 156, or 182 weeks. According to other embodiments, the course of treatment lasts for greater than 1, 2, 3, 4, 5, 10, 15, 20, 25, 30, 35, 40, 45, 50, 55, 60, 65, 70, 75, 80, or more years. In certain embodiments, the course of treatment lasts for the remainder of the subject's life.

According to certain embodiments, during the course of treatment, one or more symptoms or scores associated with MG improves during the course of treatment and is maintained at the improved level throughout treatment. For example, MG-ADL can improve after 26 weeks of treatment with a therapeutic antibody that specifically binds C5 and then remain at the improved level for the duration of the treatment, which is 52 weeks of treatment with a therapeutic antibody that specifically binds C5. One example of a therapeutic antibody that binds C5 is eculizumab.

In certain embodiments, the first sign of improvement occurs by 26 weeks of treatment with a therapeutic antibody that specifically binds C5. According to other embodiments, the first sign of improvement occurs between weeks 1-26, 26-52, 52-78, 78-104, 104-130, 130-156, 156-182, or 182-208 of treatment with a therapeutic antibody that specifically binds C5. In other embodiments, the first sign of improvement occurs at week 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 78, 104, 130, 156, or 182.

According to certain embodiments, the first sign of improvement is maintained for a number of weeks during treatment with a binding protein that specifically binds C5, such as eculizumab or an eculizumab variant such as BNJ441. According to certain embodiments, this number of weeks is at least 26. According to other embodiments, this number of weeks is 1-26, 26-52, 52-78, 78-104, 104-130, 130-156, 156-182, or 182-208. In other embodiments, this number of weeks is at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 78, 104, 130, 156, or 182.

According to certain embodiments, eculizumab or other anti-C5 antibodies such as BNJ441, BNJ421, 7086, and 8110 can be administered to a subject suffering from MG at between 600 and 6000 mg. According to other embodiments, the induction dose of eculizumab or other anti-C5 antibodies such as BNJ441, BNJ421, 7086, and 8110 is between 900 and 1500 mg, 900 and 1200 mg, 900 mg, or 1200 mg. According to other embodiments, the maintenance dose of eculizumab or other anti-C5 antibodies such as BNJ441, BNJ 421, 7086, and 8110 is about 600, 700, 800, 900, 1000, 1100, 1200, 1300, 1400, 1500, 1600, 1700, 1800, 1900, 2000, 2500, 3000, 4000, 5000, or 6000 mg.

These doses can be administered once a month, once every two weeks, once a week, twice a week, or daily. According to certain embodiments, the dose is administered once every two weeks or once a week. According to other embodiments, eculizumab is administered to a subject suffering from MG in a multiphase dosing regimen. According to certain embodiments, the multiphase dosing regimen has 2, 3, 4, 6, 7, 8, 9, 10, or more phases. In certain embodiments, each phase provides a higher dose than the phase before it.

In certain embodiments, the eculizumab multiphase dosing regimen has two phases. The first phase is an induction phase. This phase provides a dose of 600, 900, 1200, 1500, or 1800 mg per week. In certain embodiments, this phase lasts for 2, 3, 4, 5, 6, 7, 8, 9, or 10 weeks. In other embodiments, this phase lasts between 2 and 6 weeks. In other embodiments, the phase lasts for 5 weeks. According to certain embodiments, the dose given any week is higher than the previous week. In other embodiments, the dose remains the same for a number of weeks and is then increased. In some embodiments, the dose remains the same for the first 1, 2, 3, 4, 5, 6, 7, 8, or 9 weeks and is then increased. In other embodiments, the dose remains the same for the first 4 weeks. According to some embodiments, the eculizumab dose is administered at between 600 and 1200 mg, 800 and 1500 mg, 900 and 1200 mg, 900 and 1100 mg, 900 and 1000 mg, 800 and 1000 mg, 800 and 1100 mg, or 800 and 1200 mg for a number of weeks and is then increased. In one embodiment, the eculizumab dose is administered at about 900 mg on day 1 and is followed by doses of 900 mg on day 7, 900 mg on day 14, 900 mg on day 21, and then is increased to 1200 mg for the fifth dose on day 28, and then 1200 mg is administered every 14±2 days thereafter.

In one particular embodiment, the eculizumab induction phase dosing regimen comprises five administered doses on the following schedule:

900 mg on day 1; 900 mg on day 7 (week 1); 900 mg on day 14 (week 2), 900 mg on day 21 (week 3), and 1200 mg on day 28 (week 4), and then 1200 mg is administered every 14±2 days thereafter. The actual days between each dose may vary during the induction by 1 or 2 days to accommodate unexpected events in the patients' schedule.

According to this embodiment, the second phase of eculizumab dosing is the maintenance phase. The maintenance phase of eculizumab dosing can last for between 6 weeks and the life of the subject. According to other embodiments, the maintenance phase lasts for 26-52, 26-78, 26-104, 26-130, 26-156, 26-182, 26-208 weeks, or more. In other embodiments, the maintenance phase lasts for greater than 26, 27, 28, 29, 30, 31, 32, 33, 34, 35, 36, 37, 38, 39, 40, 41, 42, 43, 44, 45, 46, 47, 48, 49, 50, 51, 52, 78, 104, 130, 156, or 182 weeks. According to other embodiments, the maintenance phase lasts for greater than 1, 2, 3, 4, 5, 10, 15, 20, 25, 30, 35, 40, 45, 50, 55, 60, 65, 70, 75, 80 years, or more years. In certain embodiments, the maintenance phase lasts for the remainder of the subject's life.

In certain embodiments, the eculizumab multiphase dosing regimen includes a third phase. This third phase is used when an MG patient must undergo a rescue procedure to maintain clinical stability and includes administering plasma exchange and/or dosing with IVIg. In this phase after plasma is exchanged a dose of eculizumab is administered to replace the drug lost in plasma exchange. According to certain embodiments, this post-rescue eculizumab dose is between 300 and 1200 mg, 400 and 1500 mg, 500 and 1000 mg, 400 and 800 mg, or 500 and 700 mg. According to certain embodiments, this post-rescue eculizumab dose is about 600 mg. In another embodiment, in this post-rescue or third phase a 600 mg eculizumab dose is administered within 1 hour after completion of plasmapheresis. In another embodiment, in the third phase a 600 mg dose is administered within 2 hours after completion of plasmapheresis. In another embodiment, in the third phase a 600 mg dose is administered within 3 hours after completion of plasmapheresis. In another embodiment, in the third phase a 600 mg dose is administered within 4 hours after completion of plasmapheresis. In another embodiment, in the third phase a 600 mg dose is administered within 5 hours after completion of plasmapheresis. In another embodiment, in the third phase a 600 mg dose is administered within 6 hours after completion of plasmapheresis.

2. Pharmaceutical Compositions

Pharmaceutical compositions comprising eculizumab, either alone or in combination with prophylactic agents, therapeutic agents, and/or pharmaceutically acceptable carriers are provided. The pharmaceutical compositions comprising eculizumab provided herein are for use in, but not limited to, diagnosing, detecting, or monitoring a disorder, in preventing, treating, managing, or ameliorating a disorder or one or more symptoms thereof, and/or in research. The formulation of pharmaceutical compositions, either alone or in combination with prophylactic agents, therapeutic agents, and/or pharmaceutically acceptable carriers, is known to one skilled in the art.

An exemplary, non-limiting range for a therapeutically or prophylactically effective amount of eculizumab or other anti-C5 antibodies such as BNJ441, BNJ 421, 7086, and 8110 provided herein is 600-5000 mg, for example, 900-2000 mg. It is to be noted that dosage values may vary with the type and severity of the condition to be alleviated. It is to be further understood that for any particular subject, specific dosage regimens may be adjusted over time according to the individual need and the professional judgment of the person administering or supervising the administration of the compositions, and that dosage ranges set forth herein are exemplary only and are not intended to limit the scope or practice of the claimed methods.

3. Combination Therapy

An anti-C5 antibody provided herein also can also be administered with one or more additional medicaments or therapeutic agents useful in the treatment of MG. For example, the additional agent can be a therapeutic agent art-recognized as being useful to treat myasthenia gravis or condition being treated by the antibody provided herein. The combination can also include more than one additional agent, e.g., two or three additional agents.

The binding agent in various embodiments is administered with an agent that is a protein, a peptide, a carbohydrate, a drug, a small molecule, or a genetic material (e.g., DNA or RNA). In various embodiments, the agent is one or more cholinesterase inhibitors, one or more corticosteroids, and/or one or more immunosuppressive drugs (most commonly azathioprine [AZA], cyclosporin, and/or mycophenolate mofetil [MMF]).

Without limiting the disclosure, a number of embodiments of the disclosure are described below for purpose of illustration.

Item 1: A method of treating refractory generalized myasthenia gravis in a patient in need thereof comprising administering a therapeutically effective amount of an anti-complement component 5 (C5) antibody or antigen binding fragment thereof to the patient, wherein the patient is administered the anti-C5 antibody or antigen binding fragment thereof for at least 26 weeks.

Item 2: A method of treating refractory generalized myasthenia gravis in a patient in need thereof comprising administering a therapeutically effective amount of an anti-C5 antibody or antigen binding fragment thereof to the patient, wherein the anti-C5 antibody or antigen binding fragment thereof is eculizumab or an eculizumab variant, and
  wherein the patient is administered eculizumab or eculizumab variant for at least 26 weeks.

Item 3: The method of either items 1 or 2, wherein the patient is positive for auto-antibodies binding to nicotinic acetylcholine receptor (anti-AChR) and shows marked generalized weakness or bulbar signs and symptoms of myasthenia gravis while receiving therapy for myasthenia gravis including anticholinesterase inhibitor therapy and immunosuppressant therapy (IST) and requires chronic plasma exchange or chronic IVIg to maintain clinical stability, and
  wherein the patient is administered eculizumab for at least 26 weeks.

Item 4: A method of treating refractory generalized myasthenia gravis in a patient in need thereof comprising administering eculizumab to the patient:
  wherein the patient is positive for auto-antibodies binding to nicotinic acetylcholine receptor (anti-AChR) and shows marked generalized weakness or bulbar signs and symptoms of myasthenia gravis while receiving therapy for myasthenia gravis including anticholinesterase inhibitor therapy and immunosuppressant therapy (IST) and requires chronic plasma exchange or chronic IVIg to maintain clinical stability;
  wherein eculizumab is administered using a phased dosing schedule with an induction phase comprising administering a 900 mg induction dose of eculizumab on day 1, administering 900 mg doses of eculizumab on days 7, 14, and 21, and administering 1200 mg of eculizumab as a fifth induction dose on day 28; and
  wherein the patient is administered eculizumab for at least 26 weeks.

Item 5: The method of any one of items 1-4, wherein the 28 day induction phase of eculizumab treatment is followed by a maintenance phase comprising administering 1200 mg of eculizumab 14 days after the fifth induction dose and administering 1200 mg of eculizumab every 14±2 days thereafter.

Item 6: The method of any one of items 1-5, wherein the dosing regimen further comprises a third phase.

Item 7: The method of any one of items 1-6, wherein the third phase comprises performing plasmapheresis on the patient and administering eculizumab at a dose of between 300 mg and 1200 mg to the patient within 4 hours of completion of plasmapheresis.

Item 8: The method of any one of items 1-7, wherein the third phase comprises performing plasmapheresis on the patient and administering eculizumab at a dose of between 600 mg and 900 mg to the patient within 90 minutes of completion of plasmapheresis.

Item 9: The method of any one of items 1-8, wherein the third phase comprises performing plasmapheresis on the patient and administering eculizumab at a dose of 600 mg to the patient within 1 hour of completion of plasmapheresis.

Item 10: The method of any one of items 1-9, wherein the patient experiences a clinically meaningful improvement (reduction) in Myasthenia Gravis Activities of Daily Living (MG-ADL) score after 26 weeks of treatment.

Item 11: The method of any one of items 1-10, wherein the clinically meaningful improvement the patient experiences is at least a 3 point reduction in the patient's MG-ADL score after 26 weeks of treatment.

Item 12: The method of any one of items 1-11, wherein the clinically meaningful improvement the patient experiences is at least a 4 point reduction in the patient's MG-ADL score after 26 weeks of treatment.

Item 13: The method of any one of items 1-12, wherein the patient experiences a clinically meaningful improvement (reduction) in quantitative Myasthenia Gravis score (QMG) after 26 weeks of treatment.

Item 14: The method of any one of items 1-13, wherein the clinically meaningful improvement the patient experiences is at least a 4 point reduction in the patient's QMG score after 26 weeks of treatment.

Item 15: The method of any one of items 1-14, wherein the clinically meaningful improvement the patient experiences is at least a 5 point reduction in the patient's QMG score after 26 weeks of treatment.

Item 16: The method of any one of items 1-15, wherein the patient experiences a clinically meaningful improvement (reduction) in Myasthenia Gravis Composite (MGC) score after 26 weeks of treatment.

Item 17: The method of any one of items 1-16, wherein the clinically meaningful improvement the patient experiences is at least a 6 point reduction in the patient's MGC score after 26 weeks of treatment.

Item 18: The method of any one of items 1-17, wherein the clinically meaningful improvement the patient experiences is at least a 10 point reduction in the patient's MGC score after 26 weeks of treatment.

Item 19: The method of any one of items 1-18, wherein the patient experiences a clinically meaningful improvement in quality of life as measured by Myasthenia Gravis Quality of Life (MG-QOL-15) score after 26 weeks of treatment.

Item 20: The method of any one of items 1-19, wherein the clinically meaningful improvement the patient experiences is at least a 6 point reduction in the patient's MG-QOL-15 score after 26 weeks of treatment.

Item 21: The method of any one of items 1-20, wherein the clinically meaningful improvement the patient experiences is at least an 11 point reduction in the patient's MG-QOL-15 score after 26 weeks of treatment.

Item 22: The method of any one of items 1-21, wherein the patient experiences a clinically meaningful improvement (reduction) in neuro-fatigue as measured by Neuro-QOL Fatigue score after 26 weeks of treatment.

Items 23: The method of any one of items 1-22, wherein the clinically meaningful improvement the patient experiences is at least an 8 point reduction in the patient's Neuro-QOL score after 26 weeks of treatment.

Item 24: The method of any one of items 1-23, wherein the clinically meaningful improvement the patient experiences is at least a 16 point reduction in the patient's Neuro-QOL score after 26 weeks of treatment.

Item 25: The method of any one of items 1-24, wherein the patient experiences a clinically meaningful improvement (increase) in health status as measured by EQ-5D health status score after 26 weeks of treatment.

Item 26: A method of treating refractory generalized myasthenia gravis in a patient in need thereof comprising administering eculizumab to the patient:
  wherein the patient is positive for auto-antibodies binding to nicotinic acetylcholine receptor (anti-AChR) and shows marked generalized weakness or bulbar signs and symptoms of myasthenia gravis while receiving therapy for myasthenia gravis including anticholinesterase inhibitor therapy and immunosuppressant therapy (IST) and requires chronic plasma exchange or chronic IVIg to maintain clinical stability;
  wherein eculizumab is administered using a phased dosing schedule comprising administering a 900 mg induction dose of eculizumab on day 1, administering 900 mg doses of eculizumab on days 7, 14, and 21, and administering 1200 mg as a fifth dose on day 28;
  wherein the patient is administered eculizumab for at least 26 weeks;
  wherein the 28 day induction phase of eculizumab treatment is followed by a maintenance phase comprising administering 1200 mg of eculizumab 14 days after the fifth induction dose and administering 1200 mg of eculizumab every 14±2 days thereafter; and
  wherein the patient has a clinically meaningful improvement (reduction) in at least two measurements of generalized myasthenia gravis severity selected from the group consisting of MG-ADL, QMG, MGC, MG-QOL, and Neuro-QOL.

Item 27: A method of treating refractory generalized myasthenia gravis in a patient in need thereof comprising administering eculizumab to the patient:
  wherein the patient is positive for auto-antibodies binding to nicotinic acetylcholine receptor (anti-AChR) and shows marked generalized weakness or bulbar signs and symptoms of myasthenia gravis while receiving therapy for myasthenia gravis including anticholinesterase inhibitor therapy and immunosuppressant therapy (IST) and requires chronic plasma exchange or chronic IVIg to maintain clinical stability;
  wherein eculizumab is administered using a phased dosing schedule comprising administering a 900 mg induction dose of eculizumab on day 1, administering 900 mg doses of eculizumab on days 7, 14, and 21, and administering 1200 mg of eculizumab as a fifth induction dose on day 28;
wherein the patient is administered eculizumab for at least 26 weeks;
  wherein the 28 day induction phase of eculizumab treatment is followed by a maintenance phase comprising administering 1200 mg of eculizumab 14 days after the fifth induction dose and administering 1200 mg of eculizumab every 14±2 days thereafter; and
  wherein the patient has a clinically meaningful improvement (reduction) in at least three measurements of generalized myasthenia gravis severity selected from the group consisting of MG-ADL, QMG, MGC, MG-QOL, and Neuro-QOL.

Item 28: The method of any one of items 1-27, wherein the patient has a clinically meaningful improvement (reduction) in at least four measurements of generalized myasthenia gravis severity selected from the group consisting of MG-ADL, QMG, MGC, MG-QOL, and Neuro-QOL.

Item 29: The method of any one of items 1-28, wherein the patient has a clinically meaningful improvement (reduction) in five measurements of generalized myasthenia gravis severity, wherein the five measurements of generalized myasthenia gravis severity are MG-ADL, QMG, MGC, MG-QOL, and Neuro-QOL.

Item 30: A method of treating refractory generalized myasthenia gravis in a patient in need thereof comprising administering eculizumab to the patient:
  wherein the patient is positive for auto-antibodies binding to nicotinic acetylcholine receptor (anti-AChR) and shows marked generalized weakness or bulbar signs and symptoms of myasthenia gravis while receiving therapy for myasthenia gravis including anticholinesterase inhibitor therapy and immunosuppressant therapy (IST) and requires chronic plasma exchange or chronic IVIg to maintain clinical stability;
  wherein eculizumab is administered using a phased dosing schedule comprising administering a 900 mg induction dose of eculizumab on day 1, administering 900 mg doses of eculizumab on days 7, 14, and 21, and administering 1200 mg as a fifth induction dose on day 28;
  wherein the patient is administered eculizumab for at least 26 weeks;
  wherein the 28 day induction phase of eculizumab treatment is followed by a maintenance phase comprising administering 1200 mg of eculizumab 14 days after the fifth induction dose and administering 1200 mg of eculizumab every 14±2 days thereafter; and
  wherein the patient has a clinically meaningful improvement (reduction) in five measurements of generalized myasthenia gravis severity, wherein the five measurements of generalized myasthenia gravis severity are a reduction in MG-ADL of at least 3 points, a reduction in QMG of at least 4 points, a reduction in MGC of at least 6 points, a reduction in MG-QOL of at least 6 points, and a reduction in Neuro-QOL of at least 8 points.

Item 31: The method of any one of items 1-30, wherein the patient has a clinically meaningful improvement (reduction) in five measurements of generalized myasthenia gravis severity, wherein the five measurements of generalized myasthenia gravis severity are a reduction in MG-ADL of at least 4 points, a reduction in QMG of at least 5 points, a reduction in MGC of at least 10 points, a reduction in MG-QOL of at least 11 points, and a reduction in Neuro-QOL of at least 16 points.

Item 32: The method of any one of items 1-31, wherein eculizumab is administered by intravenous infusion.

Item 33: The method of any one of items 1-32, wherein eculizumab is administered subcutaneously.

Item 34: The method of any one of items 1-33, wherein the eculizumab comprises a heavy chain amino acid sequence according to SEQ ID NO: 10 and a light chain amino acid sequence according to SEQ ID NO: 11.

Item 35: The method of any one of items 1-34, wherein the eculizumab is an eculizumab variant comprising a heavy chain amino acid sequence according to SEQ ID NO: 14 and a light chain amino acid sequence according to SEQ ID NO: 11.

Item 36: The method of any one of items 1-35, wherein the eculizumab is an eculizumab variant comprising a heavy chain variable region amino acid sequence according to SEQ ID NO: 12 and a light chain amino acid sequence according to SEQ ID NO: 11.

Item 37: The method of any one of items 1-36, wherein the anti-C5 antibody or antigen binding fragment thereof comprises a heavy chain variable region amino acid sequence according to SEQ ID NO: 27 and a light chain variable region amino acid sequence according to SEQ ID NO: 28.

Item 38: The method of any one of items 1-37, wherein the anti-C5 antibody or antigen binding fragment thereof comprises a heavy chain variable region amino acid sequence according to SEQ ID NO: 35 and a light chain variable region amino acid sequence according to SEQ ID NO: 36.

Item 39: The method of any one of items 1-38, wherein the patient has failed treatment over one year or more with two or more ISTs in sequence or in combination.

Item 40: The method of any one of items 1-39, wherein the patient has failed at least one IST and requires chronic plasma exchange or IVIg to control symptoms of myasthenia gravis.

Item 41: A method of treating refractory generalized myasthenia gravis in a patient in need thereof comprising administering eculizumab to the patient:
  wherein the patient is positive for auto-antibodies binding to nicotinic acetylcholine receptor (anti-AChR) and shows marked generalized weakness or bulbar signs and symptoms of myasthenia gravis while receiving therapy for myasthenia gravis including anticholinesterase inhibitor therapy and immunosuppressant therapy (IST) and wherein the patient had previously failed treatment with at least two immunosuppressive agents or failed treatment with at least one immunosuppressive agent and required chronic plasma exchange or IVIg, and had an MG-ADL total score≥6 at study entry;
  wherein eculizumab is administered using a phased dosing schedule with an induction phase comprising administering a 900 mg induction dose of eculizumab on day 1, administering 900 mg doses of eculizumab on days 7, 14, and 21, and administering 1200 mg of eculizumab as a fifth induction dose on day 28;
  wherein the patient is administered eculizumab for at least 26 weeks;
  wherein the 28 day induction phase of eculizumab treatment is followed by a maintenance phase comprising administering 1200 mg of eculizumab 14 days after the fifth induction dose and administering 1200 mg of eculizumab every 14±2 days thereafter; and wherein the patient has a clinically meaningful improvement (reduction) in at least two measurements of generalized myasthenia gravis severity selected from the group consisting of MG-ADL, QMG, and MGC.

Item 42: The method of any one of items 1-41, wherein the therapeutically effective amount of eculizumab or eculizumab variant administered to the patient is maintained at a concentration of between 50-100 µg/mL in the patient's serum.

Item 43: The method of any one of items 1-42, wherein the patient experiences a discontinuation in the administration of one or more IST following at least 26 weeks of treatment.

Item 44: The method of any one of items 1-43, wherein the patient experiences a reduction in IST dosing following at least 26 weeks of treatment.

Item 45: The method of any one of items 1-44, wherein the patient experiences a reduction in one or more IST dosing and a discontinuation in one or more IST following at least 26 of treatment.

EXAMPLES

Example 1: Effectiveness of Eculizimab in Treating Myasthenia Gravis in Human Subjects The primary objective of this trial is to assess the efficacy of eculizumab as compared with placebo in the treatment of refractory gMG based on the improvement in the MG-specific Activities of Daily Living profile (MG-ADL).

The secondary objectives of this trial include the following:
  Characterize the overall safety and tolerability of eculizumab as compared with placebo in gMG subjects
  Assess the efficacy of eculizumab as compared with placebo by additional efficacy measures including:
    Quantitative MG (QMG) Score for Disease Severity
    Myasthenia Gravis Composite (MGC)
    Improvement in primary symptoms that are most clinically meaningful to the subjects
    MG-ADL subcategories for bulbar, respiratory, limb and ocular
  Characterize the effect of eculizumab as compared with placebo on Quality of life measures
  Describe the PK and PD of eculizumab in gMG subjects.

1. Investigational Plan
1.1. Overall Trial Design and Plan

Described herein is a randomized, double-blind, parallel-group, placebo-controlled, multicenter (~100 sites in North America, South America, Europe, Asian Pacific) approximately two year trial to evaluate the safety and efficacy of eculizumab for the treatment in subjects with refractory gMG. Approximately 92 eligible subjects are randomized on Day 1 on a 1:1 ratio to one of two treatment arms (1) eculizumab infusion or (2) placebo infusion. Subjects may continue to receive stable dose/type of immunosuppressive therapy (IST), but no new ISTs and no increase in IST dosage are permitted during the trial. There are 3 periods in this study: Screening Period, Study Period, and Follow-up Period (for subjects who withdraw from this trial or who do not enter the extension trial). See FIG. 1. The overall trial duration for an individual subject is estimated to take up to 38 weeks including enrollment and Follow-up. Subjects may be provided the opportunity to participate in an extension trial (separate protocol) to receive eculizumab after completion of this trial. A schedule of assessments for the screening, study and follow-up period is provided in Table 6.

1.1.1. Screening Period (2-4 Weeks)

At the screening visit, after obtaining the informed consent from the subject, the subject is screened for trial eligibility through medical history review, demographic data, and laboratory assessments. The medical history review includes confirmation of MG diagnosis as defined in the inclusion criteria of this protocol, history of previous treatment/therapies for MG, e.g., thymectomy, IST including corticosteroids, IVIg and plasma exchange, history of MG exacerbation or crisis including the duration of each exacerbation/crisis, the medication taken at the time of each exacerbation/crisis and the treatment for each exacerbation/crisis.

Figure 3:
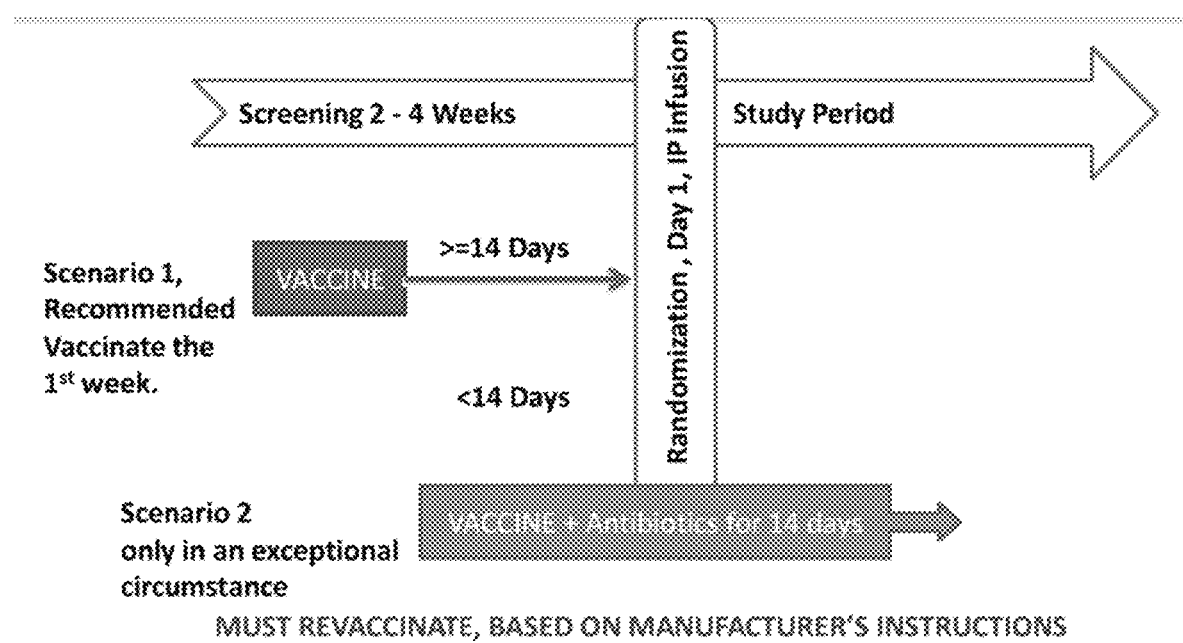
FIG. 3 is a schematic of the *N. meningitidis* vaccination schedule used in the clinical trial disclosed herein.
Figure 4:
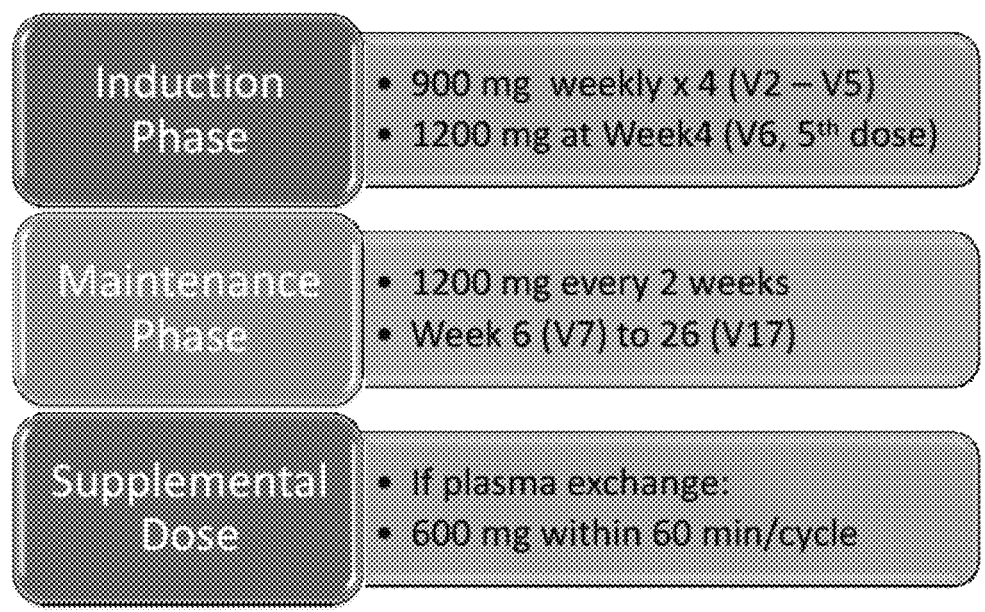
FIG. 4 is a schematic of the dosing schedule used in the clinical trial disclosed herein.
Figure 5:
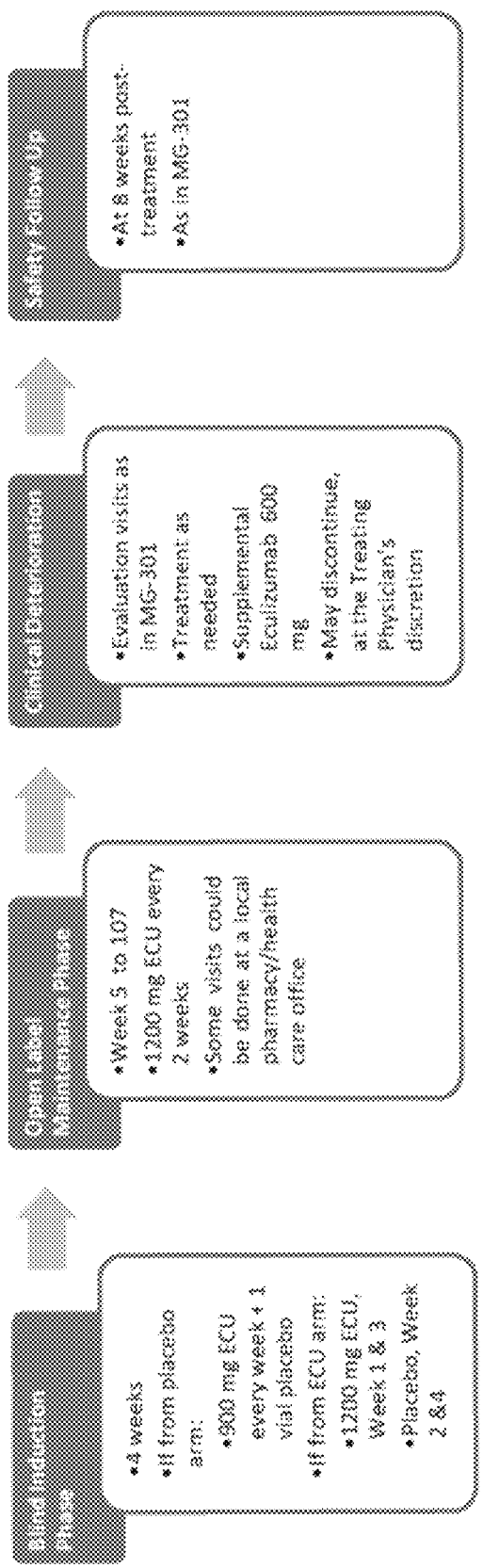
FIG. 5 is a schematic of the dosing, clinical evaluation and safety follow-up schedule, used in the clinical trial disclosed herein.

If all inclusion criteria and none of the exclusion criteria are met, subjects are vaccinated against *N. meningitidis*, if not already vaccinated within the time period of active coverage specified by the vaccine manufacturer or vaccinate according to current medical/country guidelines. Subjects must be vaccinated at least 14 days prior to receiving the first dose of study medication or be vaccinated and receive treatment with appropriate antibiotics until 14 days after the vaccination. See FIG. 3.

Use of cholinesterase inhibitor and supportive IST are allowed during the trial under certain restrictions (see Concomitant Medications, below). The washout period for IVIg is 4 weeks prior to randomization. The washout period for PE is also 4 weeks prior to randomization. If a subject experiences an MG Crisis during the Screening Period, the sponsor must be notified. Following discussion with the sponsor, a decision is made about whether the subject may continue in the trial, be withdrawn and possibly, re-screened at a later date.

TABLE 6

TRIAL DESIGN AND SCHEDULE OF ASSESSMENTS (STUDY PERIOD)

| | Screening | Induction | | | | | | | Maintenance | | | | | | | | | Clinical Deterioration | ++ UNS Visit | Post-Treatment Follow-up |
|---|---|---|---|---|---|---|---|---|---|---|---|---|---|---|---|---|---|---|---|---|
| Trial Visit | 1 | 2 | 3 | 4 | 5 | 6 | 7 | 8 | 9 | 10 | 11 | 12 | 13 | 14 | 15 | 16 | 17/ET* | | | |
| Trial Weeks | 2-4 Weeks | D1 | W1 | W2 | W3 | W4 | W6 | W8 | W10 | W12 | W14 | W16 | W18 | W20 | W22 | W24 | W26 | | | +W8 |
| Informed Consent | X | | | | | | | | | | | | | | | | | | | |
| Medical History | X | | | | | | | | | | | | | | | | | | | |
| MG History [1] | X | | | | | | | | | | | | | | | | | | | |
| MGFA Clinical Classification | X | | | | | | | | | | | | | | | | | | | |
| Weight | X | | | | | | | | | | | | | | | | X | | | |
| Height | X | | | | | | | | | | | | | | | | | | | |
| Vital Signs | X | X | X | X | X | X | X | X | X | X | X | X | X | X | X | X | X | X | | X |
| Physical Exam | X | | | | | | | | | | | | | | | | | | | |
| 12-Lead ECG | X | | | | | | | | | | | | | | | | X | | | |
| Concomitant Medication | X | X | X | X | X | X | X | X | X | X | X | X | X | X | X | X | X | X | | X |
| MG Therapy Status | X | X | | | | | | | | | | | | | | | X | | | |
| Adverse Event | | X | X | X | X | X | X | X | X | X | X | X | X | X | X | X | X | X | | X |
| MG-QOL 15 | X | X | | | X | X | | X | | X | | X | | X | | | X | | | X |
| Neuro-QOL Fatigue | | X | | | X | X | | X | | X | | X | | X | | | X | | | |
| EQ-5D | | X | | | X | X | | X | | X | | X | | X | | | X | | | |
| MG-ADL [2] | X | X | X | X | X | X | X | X | X | X | X | X | X | X | | | X | X | | X |
| QMG [3] | X | X | X | X | X | X | X | X | X | X | X | X | X | X | | | X | X | | X |
| NIF [3] | X | X | X | X | X | X | X | X | X | X | X | X | X | X | | | X | X | | X |
| MGC [3] | X | X | X | X | X | X | X | X | X | X | X | X | X | X | | | X | X | | X |
| MGFA PIS [4] | | | | | | X | | | | X | | | | X | | | X | | | X |
| C-SSRS | | X | | | | | | | | X | | | | | | | X | | | |
| AChR Ab | X | | | | | | | | | X | | | | | | | X | X | | |
| Clinical Lab Tests [5] | X | X | | | X | | X | | | X | | X | | X | | | X | X | | |
| Pregnancy Test [6] | X | X | | | | | | | | | | | | | | | X | | | |
| PK/PD, Free C5 [7] | | B/P | T/P | | T/P | | T/P | | | T/P | | | | T/P | | | T/P | X | | |
| HAHA [7] | | B | | | X | | | | | X | | | | | | | X | X | | |
| Medically Indicated Tests | | | | | | | | | | | | | | | | | | X | | |
| *N. meningitidis* Vaccination [8] | X | | | | | | | | | | | | | | | | | | | |
| Patient Safety Information Card | | X | X | X | X | X | X | X | X | X | X | X | X | X | X | X | X | | | |
| Randomization [9] | | X | | | | | | | | | | | | | | | | | | |
| IP Infusion [10] | | X | X | X | X | X | X | X | X | X | X | X | X | X | X | X | X | X [10] | | |

Abbreviations:

AChR Ab = Acetylcholine receptor antibody; B = Baseline sample; C5 = Complement protein 5; C-SSRS = Columbia-Suicide Severity Rating Scale; ECG = Electrocardiogram; ICU = Intensive Care Unit; HAHA = human anti-human antibody; ; IP = investigational product; MG = Myasthenia Gravis; MGC = MG Composite Score; MG-ADL = MG Activity of Daily Living (MG-ADL) Profile; MGFA = Myasthenia Gravis Foundation of America; MGFA PIS = MGFA Post-Intervention Status; NIF = negative inspiratory force; P = peak sample; PK/PD = Pharmacokinetics/Pharmacodynamics QMG = Quantitative MG (QMG) Score for Disease Severity; QOL = Quality of Life; T = trough sample 1.1.2. Randomization All subjects who are vaccinated, and continue to meet the MG-ADL entry criteria, i.e., MG-ADL total score≥6 at Randomization (Day 1), and have been cleared for randomization by their respective Principal Investigator (PI), will be randomized on Day 1 on a 1:1 basis to the Eculizumab Arm or the Placebo Arm. The randomization stratification is based on the assessment of clinical classification by the Myasthenia Gravis Foundation of America (MGFA) (see Table 7) performed at the Screening Visit according to the following 4 groupings:

a. MGFA Class IIa and IIIa
b. MGFA Class IVa
c. MGFA Class IIb and IIIb, and
d. MGFA Class IVb 1.1.3. Study Period (26 Weeks)

Subjects receive IP, either eculizumab or placebo, according to the randomization and the regimen described in the Investigational Product and Administration, described below. The treatment duration for each subject is 26-weeks. Subjects must be informed of potential signs and symptoms of MG crisis and instructed to contact the Investigator as soon as possible at onset of symptom. Every effort is made for the subject reporting Clinical Deterioration to be evaluated as soon as possible and within 48 hours of notification of the Investigator of the symptom onset. At the evaluation visit, the Investigator or his/her designee performs the assessments as specified by this protocol. The Investigator determines whether or not the subject meets the definition of Clinical Deterioration as defined by this protocol and treats the subject accordingly.

TABLE 7

MGFA CLINICAL CLASSIFICATION

| Class | Clinical signs |
|---|---|
| I | Any ocular muscle weakness. May have weakness of eye closure. All other muscle strength is normal. |
| II | Mild weakness affecting other than ocular muscles. May also have ocular muscle weakness of any severity. |
| IIa | Predominantly affecting limb or axial muscles or both. May also have lesser involvement of oropharyngeal muscles. |
| IIb | Predominantly affecting oropharyngeal or respiratory muscles or both. May also have lesser or equal involvement of limb or axial muscles or both. |
| III | Moderate weakness affecting other than ocular muscles. May also have ocular muscle weakness of any severity. |
| IIIa | Predominantly affecting limb or axial muscles or both. May also have lesser involvement of oropharyngeal muscles. |
| IIIb | Predominantly affecting oropharyngeal or respiratory muscles or both. May also have lesser or equal involvement of limb or axial muscles or both. |
| IV | Severe weakness affecting other than ocular muscles. May also have ocular muscle weakness of any severity. |
| IVa | Predominantly affecting limb and/or axial muscles. May also have lesser involvement of oropharyngeal muscles. |
| IVb | Predominantly affecting oropharyngeal or respiratory muscles or both. May also have lesser or equal involvement of limb or axial muscles or both. |
| V | Defined by intubation, with or without mechanical ventilation, except when employed during routine postoperative management The use of a feeding tube without intubation places the patient in class IVb. |

After completing the 26-week Study Period, subjects may be provided an opportunity to enter an extension trial (separate protocol) to receive open-label eculizumab. The visit interval between this trial and the extension trial is 2 weeks from the last of IP administration (Visit 17) so there is no interruption in IP dosing. Subjects entering the extension trial undergo a blinded eculizumab induction phase similar to the induction in this trial in order to maintain the blinded treatment assignment of this trial. If a subject withdraws from this trial at any time after receiving any amount of IP or does not wish to enter the extension trial after completion of this trial, the subject is required to complete the Follow-up Visit for safety measures.

1.1.4. Follow-Up Period (8 Weeks Post-Treatment)

If a subject withdraws or is discontinued from this trial at any time after receiving any amount of IP or does not wish to enter the extension trial after completion of this trial, the subject will be required to complete the Follow-up Visit for safety measures 8 weeks after the last IP dose administration. If a subject is discontinued due to an AE, the event will be followed until it is resolved or in the opinion of the PI is medically stable.

1.2. Standard Protocol Definitions

Abbreviations and definitions for the study and follow-up period are provided in Table 8.

TABLE 8

LIST OF ABBREVIATIONS AND DEFINITIONS OF TERMS

| Abbreviation or Specialist Term | Explanation |
|---|---|
| Ab | Antibody |
| AChR | Acetylcholine receptor |
| AE | Adverse event |
| aHUS | Atypical hemolytic uremic syndrome |
| ANCOVA | Analysis of covariance |
| AZA | Azathioprine |
| BP | Blood Pressure |
| C5 | Complement protein 5 |
| CMAX | Maximal concentration |
| CMIN | Minimal concentration |
| eCRF | Electronic Case Report Form |
| C-SSRS | Columbia-Suicide Severity Rating Scale |
| ECG | Electrocardiogram |
| EDC | Electronic Data Capture |
| EIU | Exposure in-utero |
| EOI | Event of Interest |
| EOS | End of Study |
| EQ-5D | EuroQoL |
| ET | Early Termination |
| EU | European Union |
| FAS | Full Analysis Set |
| FVC | Forced Vital Capacity |
| GCP | Good Clinical Practices |
| gMG | Generalized Myasthenia Gravis |
| HAHA | Human Anti-human Antibody |
| HCG | human chorionic gonadotropin |
| HR | Heart Rate |
| IB | Investigator Brochure |
| ICF | Informed Consent Form |
| ICH | International Conference on Harmonization |
| ICU | Intensive Care Unit |
| IEC | Independent Ethics Committee |
| IVIg | Intravenous Immunoglobulin G |
| IP | Investigational Product |
| IRB | Institutional Review Board |
| IST | Immunosuppressant Therapy |
| IV | Intravenous |
| IVIg | Intravenous immunoglobulin |
| IXRS | Interactive voice or web response system |
| mAb | Monoclonal Antibody |
| MedDRA | Medical Dictionary for Regulatory Activities |
| MG | Myasthenia Gravis |
| MG-ADL | MG activity of daily living profile |
| MGC | Myasthenia Gravis Composite |
| MGFA | Myasthenia Gravis Foundation of America |
| MM | Minimal manifestation |
| MMF | Mycophenolate Mofetil |
| MMT | Manual Muscle Test |
| MTX | Methotrexate |

TABLE 8-continued

LIST OF ABBREVIATIONS AND DEFINITIONS OF TERMS

| Abbreviation or Specialist Term | Explanation |
|---|---|
| MuSK | Muscle-specific tyrosine kinase |
| NIF | Negative inspiratory force |
| NMJ | Neuromuscular junction |
| oMG | Ocular Myasthenia Gravis |
| PD | Pharmacodynamics |
| PE | Plasmapheresis or Plasma Exchange |
| PI | Principal Investigator |
| PIS | Post-Intervention Status |
| PK | Pharmacokinetics |
| PNH | Paroxysmal Nocturnal Hemoglobinuria |
| PP | Per-Protocol Population |
| QOL | Quality Of Life |
| QMG | Quantitative Myasthenia Gravis |
| RR | Respiration Rate |
| RSI | Reference Safety Informatoion |
| SAE | Serious Adverse Event |
| SAP | Statistical Analysis Plan |
| SFEMG | single-fiber electromyography |
| SOC | System Organ Class |
| TEAE | Treatment Emergent Adverse Events |
| TESAE | Treatment Emergent SAE |
| US | United States |
| VAS | Visual Analog Scale |
| WHODrug | World Health Organization Drug Dictionary |

1.2.1. Clinical Deterioration

For this protocol, Clinical Deterioration is defined as follows:

Subjects who experience an MG Crisis, which is defined as weakness from MG that is severe enough to necessitate intubation or to delay extubation following surgery. The respiratory failure is due to weakness of respiratory muscles. Severe bulbar (oropharyngeal) muscle weakness often accompanies the respiratory muscle weakness, or may be the predominant feature in some subjects; or, Significant symptomatic worsening to a score of 3 or a 2-point worsening on any one of the individual MG-ADL items other than double vision or eyelid droop; or, Subjects for whom the treating physician believes that the subject's health is in jeopardy if rescue therapy is not given (e.g., emergency situations).

1.2.2. Clinical Evaluation

The Clinical Evaluators are study staff that have been trained and certified in administering the MG-ADL, QMG and MGC. The Clinical Evaluator may be a neurologist, physical therapist or other study team member delegated by the PI. Clinical Evaluator training and certification for this protocol will take place either at the Investigator's meeting or via the sponsor's designated on-line training portal.1.2.3. Responsibilities for MG Assessments Responsibilities for MG assessments are listed in Table 9. Throughout the trial, MG assessments should be performed at approximately the same time of day by a properly trained evaluator, preferably the same evaluator.

TABLE 9

MG ASSESSMENTS (RESPONSIBILITIES)

| Assessment | Evaluator |
|---|---|
| MG-ADL | Clinical Evaluator |
| QMG including FVC | Clinical Evaluator |
| NIF | Clinical Evaluator |
| MGC | Clinical Evaluator |

TABLE 9-continued

MG ASSESSMENTS (RESPONSIBILITIES)

| Assessment | Evaluator |
|---|---|
| MGC (MMT Components) | PI or Neurologist |
| MGFA-PIS | PI or Neurologist |
| MGFA Classification | PI or Neurologist |

Abbreviations: FVC = forced vital capacity; MG-ADL = Myasthenia Gravis Activity of Daily Living Profile; MGC = Myasthenia Gravis Composite; MGFA = Myasthenia Gravis Foundation of America; MGFA-PIS = Myasthenia Gravis Foundation of America Post Intervention Status; MMT = manual muscle test; NIF = negative inspiratory force; PI = Principal Investigator; QMG = Quantitative MG 1.4. Trial Visit Procedures 1.4.1. Screening Visit (Days −28 to −14 prior to Baseline [Visit 2/Day 1])

After obtaining a signed informed consent form, the following tests and evaluations are performed within 2-4 weeks prior to randomization at the Baseline Visit (Visit 2/Day 1) to determine subject eligibility for participation in this trial:

Review inclusion and exclusion criteria; Register the subject in the IXRS system to get the subject identification number in the study and trigger drug shipment if necessary; Record medical history and demographics; Record MGFA Clinical Classification Record MG history:
  a. Confirm MG diagnosis as defined by the protocol inclusion criterion #2
  b. Record the initial MG clinical presentation (i.e., oMG or gMG). If the initial clinical presentation was oMG, record the time (date) to onset of gMG
  c. Record the maximum MGFA classification since diagnosis, if available
  d. Record whether the subject ever required ventilatory support since the diagnosis
  e. Record the number of hospitalizations, including number of ICU stays (days) and any ventilatory support associated with the hospitalization within the last 2 years prior to screening
  f. Record number and duration of all previous MG exacerbations or record number and duration of all previous MG exacerbations or crisis, the medication/therapy taken at the time of each exacerbation or crisis, and medication/therapy use for treatment of each exacerbation or crisis, if applicable.

Record MG Therapy Status (see Table 9)

Measure body weight and height

Measure vital signs, including assessments of systolic and diastolic blood pressure (BP), temperature, respiration rate (RR) and heart rate (HR)

Complete physical examination including assessments of the following organ/body systems: skin, head, ears, eyes, nose, throat, neck, lymph nodes, chest, heart, abdomen, extremities, musculoskeletal, and general neurologic examination.

Perform a 12-Lead ECG

Record concomitant medications, including prior IST, IVIg, and/or PE for MG from the time of diagnosis up to screening and all other concomitant medications within 30 days prior to the Screening Visit.

Administer MG-ADL by a properly trained evaluator. The recall period is the preceding 7 days.

Administer clinical assessments QMG, NIF, and MGC; these should be performed at approximately the same time of day by a properly trained evaluator. If the subject is taking a cholinesterase inhibitor, the dose must be withheld for at least 10 hours prior to the QMG and MGC tests.

Administer MG-QOL15 questionnaire to evaluate quality of life.

Obtain blood sample for AChR Abs test.

Obtain blood samples for laboratory tests (chemistry and hematology) (see Table 6)

Obtain pregnancy test (serum) for all women of childbearing potential. Note: if the subject is taking/using contraceptive medication/device, please be sure to record the medication or device on the appropriate electronic case report form (eCRF) pages (concomitant medication or procedure).

If all inclusion criteria and none of the exclusion criteria are met, subjects will be vaccinated against *N. meningitides*, if not already vaccinated within the time period of active coverage specified by the vaccine manufacturer or according to current medical/country guidelines. Subjects must be vaccinated at least 14 days prior to receiving the first dose of study medication or be vaccinated and receive treatment with appropriate antibiotics until 14 days after the vaccination.

If a subject experiences an MG Crisis during the Screening Period, the sponsor should be notified. Following discussion with the sponsor, a decision will be made about whether the subject may continue in the trial, be withdrawn and possibly, re-screened at a later date.

1.4.2. Study Period

Visit intervals during Induction Phase (Visits 2, 3, 4, 5 and 6) are weekly (every 7±2 days after the last visit). Visit intervals during the Maintenance Phase (Visits 7-17) are every 2 weeks (every 14 days±2 days since the last visit). Subjects who fail to return for a scheduled visit must be contacted by the site study staffs to determine the reason for missing the appointment. Subjects are strongly encouraged to return to the investigational site for evaluation if Clinical Deterioration or an AE is suspected to have occurred. In the exceptional circumstance where a subject cannot or does not come to the study site for examination, then the subject will be instructed to see his or her local neurologist or physician. In this event, the investigational site obtains relevant medical records as documentation from the local physician's examination, and enters relevant data in the eCRF as appropriate.

TABLE 9

MGFA MG THERAPY STATUS

| | |
|---|---|
| NT | No therapy |
| SPT | Status postthymectomy (record type of resection) |
| CH | Cholinesterase inhibitors |
| PR | Prednisone |
| IM | Immunosuppression therapy other than prednisone (define) |
| PE(a) | Plasma exchange therapy, acute (for exacerbations or preoperatively) |
| PE(c) | Plasma exchange therapy, chronic (used on a regular basis) |
| IG(a) | IVIg therapy, acute (for exacerbations or preoperatively) |
| IG(c) | IVIg therapy, chronic (used on a regular basis) |
| OT | Other forms of therapy (define) |

Figure 6:
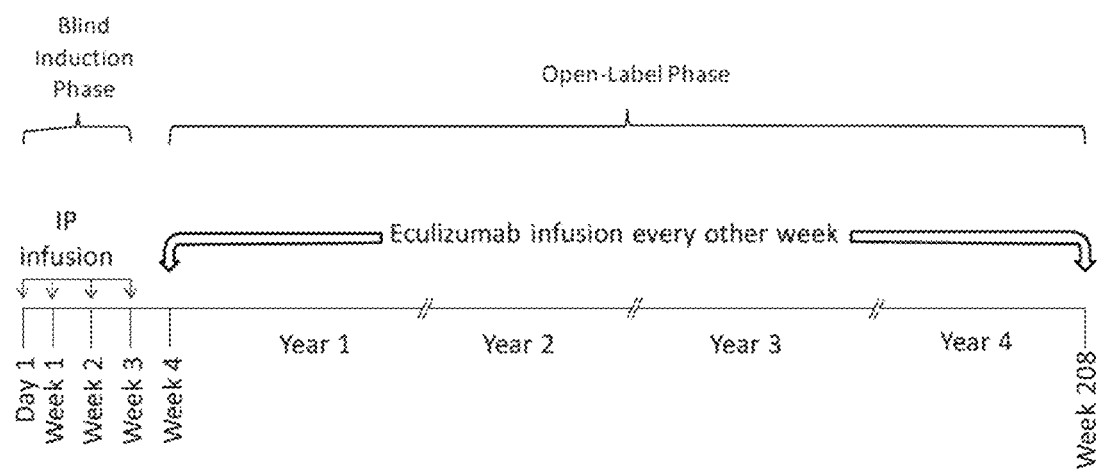
FIG. 6 is a schematic of the dosing schedule used in the clinical trial also including the extension period disclosed herein.

As it is vital to obtain information on any subject's missing visit to assure the missing appointment was not due to a clinical deterioration or an AE, every effort must be made to undertake protocol-specified follow-up procedures (see Table 6). Follow-up due diligence documentation consists of 3 phone calls followed by 1 registered letter to the subject's last known address. The study period is summarized in Table 6 and FIG. 6.

1.4.2.1. Induction Phase (Baseline [Visit 2/Day 1] Until Visit 6 [Week 4])

1.4.2.1.1. Baseline (Visit 2/Day 1)

Once all of the eligibility criteria have been confirmed by the PI, the subject is randomized on Day 1. The following tests and procedures are completed at the Baseline Visit (Visit 2/Day 1):

Measure vital signs, including assessments of systolic and diastolic BP, temperature, RR and HR Record MG Therapy Status (see Table 9)

Record any new medications or changes to concomitant medications

Evaluate and record AEs since the previous visit

Administer questionnaires to evaluate quality of life (MG-QOL 15, Neuro-QoL Fatigue, and EuroQoL [EQ-5D])

Administer MG-ADL by a properly trained evaluator, preferably the same evaluator, throughout the trial. The recall period is the preceding 7 days. If the number of days since the last visit was <7, the recall period is since the last visit.

Administer clinical assessments QMG, NIF, and MGC; these should be performed at approximately the same time of day by a properly trained evaluator, preferably the same evaluator, throughout the trial. If the subject is taking a cholinesterase inhibitor, the dose must be withheld for at least 10 hours prior to the QMG and MGC tests.

Perform Columbia-Suicide Severity Rating Scale (C-SSRS)

Obtain blood samples for clinical laboratory tests (chemistry and hematology)

Obtain pregnancy test (serum) for all women of childbearing potential.

Collect baseline blood samples for PK, PD, free C5, and HAHA assays 5-90 minutes before the infusion of IP.

Instruct the subject on the signs and symptoms of *N. meningitis*. Provide the Patient Safety Information Card describing the IP and emergency contact information to the subject prior to the first dose of IP.

Randomize the subject using the IXRS.

Administer the IP infusion over approximately 35 minutes according to the regimen described in Section 4.5, and observe subjects for 1 hour after the end of the IP infusion.

Collect peak blood samples for PK, PD, and free C5 assays at least 60 minutes after completion of the IP infusion.

1.4.2.1.2. Visits 3-5 (Weeks 1-3)

The following tests and procedures are completed:

Measure vital signs, including assessments of systolic and diastolic BP, temperature, RR, and HR Record any new medications or changes to concomitant medications Evaluate and record any new AEs or changes in AEs since the previous visit.

Administer MG-ADL by a properly trained evaluator, preferably the same evaluator, throughout the trial. The recall period is the preceding 7 days. If the number of days since the last visit was <7, the recall period is since the last visit.

Administer clinical assessments QMG, NIF, and MGC; these should be performed at approximately the same time of day by a properly trained evaluator, preferably the same evaluator, throughout the trial. If the subject is taking a cholinesterase inhibitor, the dose must be withheld for at least 10 hours prior to the QMG and MGC tests.

At Visit 3 (Week 1) only, collect trough (before IP infusion) blood samples for PK, PD, and free C5 assays. Trough blood samples are to be taken 5-90 minutes before the IP infusion.

Ensure that the subject has the Patient Safety Information Card that describes the IP and emergency contact information.

Obtain study drug kit assignation through the IXRS.

Administer the IP infusion over approximately 35 minutes according to the regimen described in Section 4.5, and observe subjects for 1 hour after the end of the IP infusion.

At Visit 3 (Week 1) only, collect peak (after IP infusion) blood samples for PK, PD, and free C5 assays. Peak blood samples are to be taken at least 60 minutes after the completion of the IP infusion.

1.4.2.1.3. Visit 6 (Week 4)

The following tests and procedures are completed at this visit:

Measure vital signs, including assessments of systolic and diastolic BP, temperature, RR, and HR Record any new medications or changes to concomitant medications Evaluate and record any new AEs or changes in AEs since the previous visit Administer questionnaires to evaluate quality of life (MG-QOL 15, Neuro-QOL Fatigue, and EQ-5D)

Administer MG-ADL by a properly trained evaluator, preferably the same evaluator, throughout the trial. The recall period is the preceding 7 days. If the number of days since the last visit was <7, the recall period is since the last visit.

Administer clinical assessments QMG, NIF, and MGC; these should be performed at approximately the same time of day by an appropriately trained evaluator, preferably the same evaluator, throughout the trial. If the subject is taking a cholinesterase inhibitor, the dose must be withheld for at least 10 hours prior to the QMG and MGC tests.

Assess change from baseline in the MGFA Post-Intervention Status (see Table 10).

Collect blood samples for clinical laboratory tests (chemistry and hematology).

Collect trough blood samples for PK, PD, free C5, and HAHA assays 5-90 minutes before the infusion of IP.

Ensure that the subject has the Patient Safety Information Card that describes the IP and emergency contact information.

Obtain study drug kit assignation through the IXRS.

Administer the IP infusion over approximately 35 minutes according to the regimen described in Section 4.5, and observe subjects for 1 hour after the end of the IP infusion.

Collect peak blood samples for PK, PD, and free C5 assays at least 60 minutes after completion of the IP infusion.

1.4.2.2. Maintenance Phase (Visit 7 [Week 6] Until End of Study Period Visit 17 [Week 26] or Early Termination of Visit)

During the Maintenance Phase, subjects return for infusions of IP every 2 weeks (14±2 days), according to the regimen described in Section 4.5. The following tests and procedures are completed at every visit beginning at Visit 7 (Week 6) and continuing until the End of Study (EOS), Visit 17 (Week 26) or at Early Termination (ET):

Measure vital signs, including assessments of systolic and diastolic BP, temperature, RR, and HR Record any new medications or changes to concomitant medications Evaluate and record any new AEs or changes in AEs since the previous visit.

Ensure that the subject has the Patient Safety Information Card that describes the IP and emergency contact information.

Administer the IP and observe subjects for 1 hour after the end of the IP infusion. IP will be administered after completion of other tests and procedures, excluding the peak blood sampling for PK/PD and free C5 assay.

At Visit 8 (Week 8), Visit 10 (Week 12), Visit 12 (Week 16), Visit 14 (Week 20), and until the EOS, Visit 17 (Week 26) or at ET, the following procedures are also completed, in addition to the 5 preceding procedures listed for the maintenance phase:

Administer questionnaires to evaluate quality of life (MG-QOL 15, Neuro-QOL Fatigue, and EQ-5D)

Administer MG-ADL by a properly trained evaluator, preferable the same evaluator, throughout the trial. The recall period is the preceding 7 days.

Administer clinical assessments QMG, NIF, and MGC; these should be performed at approximately the same time of day by a properly trained evaluator, preferably the same evaluator, throughout the trial. If the subject is taking a cholinesterase inhibitor, the dose must be withheld for at least 10 hours prior to the QMG and MGC tests.

Perform C-SSRS only at Visit 10 (Week 12) and Visit 17 (Week 26)/ET. The blood sample for the HAHA assay is to be collected 5-90 minutes before the infusion of IP.

Obtain blood sample for clinical laboratory tests (chemistry and hematology).

Obtain blood sample for the AChR Abs test and HAHA assay only at Visit 10 (Week 12) and Visit 17 (Week 26)/ET.

Collect trough blood samples for PK, PD, and free C5 assays 5-90 minutes before the infusion of IP only at Visits 8, 10, 14 and 17/ET (Weeks 8, 12, 20, and 26).

Collect peak blood samples for PK, PD, and free C5 assays at least 60 minutes after completion of the IP infusion only at Visits 8, 10, 14 and 17/ET (Weeks 8, 12, 20, and 26).

Measure body weight only at Visit 17 (Week 26)/ET.

Perform a 12-Lead ECG only at Visit 17 (Week 26)/ET.

Record MG Therapy Status (see Table 9) only at Visit 17 (Week 26)/ET.

Obtain pregnancy test must for all women of childbearing potential at Visit 17 (Week 26)/ET.

Assess change from baseline in the MGFA Post-Intervention Status only at Visit 10 (Week 12) and Visit 17 (Week 26)/ET.

1.4.2.3. Visits for MG Crisis or Clinical Deterioration

The evaluation visit for an MG crisis or Clinical Deterioration must be performed as soon as possible, within 48 hours of notification of the Investigator of the symptom onset. Additional evaluation visits can be scheduled at the discretion of the investigator. The following tests and procedures are completed at this visit:

Measure vital signs, including assessments of systolic and diastolic BP, temperature, RR, and HR Record any new medications or changes to concomitant medications, including all treatments for MG Evaluate and record any new AEs or changes in AEs since the previous visit Administer MG-ADL by a properly trained evaluator, preferably the same evaluator, throughout the trial. The recall period is the preceding 7 days or since the last visit whichever occurs earlier.

Administer clinical assessments QMG, NIF, and MGC; these should be performed at approximately the same time of day by a properly trained evaluator, preferably the same evaluator, throughout the trial.

Collect blood sample for the AChR Abs test

Collect blood samples for clinical laboratory tests (chemistry and hematology).

If medically indicated for evaluation of Clinical Deterioration, additional tests may be performed at the discretion of the Investigator.

PK, PD sampling at or during crisis or deterioration Visit:
  Collect one blood sample for PK, PD, and free C5 assays if no IP is administered.
  If IP is administered at the MG Crisis evaluation visit or at the visit for Clinical Deterioration, according to the protocol schedule, collect two blood samples, trough and peak, at [1] 5-90 minutes before the IP infusion and [2] at least 60 minutes after completion of the IP infusion.
  If the subject receives PE at the time of a crisis or Clinical Deterioration, a supplemental dose of IP will be administered. Collect three blood samples for PK, PD, and free C5 at [1] 5-90 minutes before PE, [2] 60 minutes after PE and before IP infusion, and [3] at least 60 minutes after completion of the IP infusion.

IP administration:
  Subject will continue IP administration in accordance with protocol specified IP administration schedule.
  If the crisis or Clinical Deterioration Visit coincides with a regular visit per protocol, subject will receive the regular scheduled IP administration per protocol schedule.
  If subjects undergo PE, a supplemental dose (2 vials IP) must be administered within 60 minutes after each PE session. If the subject is scheduled to receive the protocol-scheduled dose on the day of a PE session, then the scheduled dose should be administered within 60 minutes after the end of the PE.

1.4.2.4 Unscheduled Visit

Additional (Unscheduled) visits outside the specified visits are permitted at the discretion of the Investigator. Procedures, tests, and assessments are performed at the discretion of the Investigator. If an Unscheduled Visit is performed, any tests, procedures, or assessments performed at the Unscheduled Visits must be recorded on the eCRFs.

1.4.3. Safety Follow-Up Period (Post-Treatment+Week 4)

Safety Follow-Up Period (Post-Treatment+Week 8)

If a subject withdraws from the trial at any time during the Study Period after receiving any amount of IP (eculizumab or placebo) or does not wish to enter the extension trial after completion of this trial, a follow up visit for safety assessment is required at 4 weeks after the last dose of IP. The following tests and procedures will be completed at the safety follow-up visit:

Measure vital signs, including assessments of systolic and diastolic BP, temperature, RR, and HR Record any new medications or changes to concomitant medications Evaluate and record any new AEs or changes in AEs since the previous visit.

Administer MG-QOL15

Administer MG-ADL by a properly trained evaluator, preferably the same evaluator, throughout the trial. The recall period is the preceding 7 days.

Administer clinical assessments QMG, NIF, and MGC; these should be performed at approximately the same time of day by a properly trained evaluator, preferably the same evaluator, throughout the trial. If the subject is taking a cholinesterase inhibitor, the dose must be withheld for at least 10 hours prior to the QMG and MGC tests.

Assess change from baseline in MGFA Post-Intervention Status (see Table 10).

TABLE 10

| MGFA POST-INTERVENTION STATUS | |
|---|---|
| Complete stable remission (CSR) | The patient has had no symptoms or signs of MG for at least 1 year and has received no therapy for MG during that time. There is no weakness of any muscle on careful examination by someone skilled in the evaluation of neuromuscular disease. Isolate weakness of eyelid closure is accepted. |
| Pharmacological remission (PR) | The same criteria as for CSR, except that the patient continues to take some form of therapy for MG. Patients taking cholinesterase inhibitors are excluded from this category because their use suggests the presence of weakness. |
| Minimal manifestations (MM) | The patient has no symptoms of functional limitations from MG, but has some weakness on examination of some muscles. This class recognizes that some patients who otherwise meet the definition of CSR or PR do have weakness that is only detectable by careful examination. |
| MM-0 | The patient has received no MG treatment for at least 1 year. |
| MM-1 | The patient continues to receive some form of immuno-suppression, but no cholinesterase inhibitors or other symptomatic therapy. |
| MM-2 | The patient has received only low-dose cholinesterase inhibitors (<120 mg pyridostigmine/day) for at least 1 year. |
| MM-3 | The patient has received cholinesterase inhibitors or other symptomatic therapy and some form of immuno-suppression during the past year. |
| Change in Status | |
| Improved (I) | A substantial decrease in pretreatment clinical manifestations or a sustained substantial reduction in MG medications as defined in the protocol. In prospective studies, this should be defined as a specific decrease in QMG score. |
| Unchanged (U) | No substantial change in pretreatment clinical manifestations or reduction in MG medications as defined in the protocol. In prospective studies, this should be defined in terms of a maximum change in QMG score. |

TABLE 10-continued

MGFA POST-INTERVENTION STATUS

| | |
|---|---|
| Worse (W) | A substantial increase in pretreatment clinical manifestations or a substantial increase in MG medications as defined in the protocol. In prospective studies, this should be defined as a specific increase in QMG score. |
| Exacerbation (E) | Patients who have fulfilled criteria of CSR, PR, or MM, but subsequently developed clinical findings greater than permitted by these criteria. |
| Died of MG (D of MG) | Patients who died of MG, of complications of MG therapy, or within 30 days after thymectomy. List the cause (see Morbidity and Mortality data). |

If a subject is discontinued due to an AE, the AE will be followed until it is resolved or, in the opinion of the PI, is determined medically stable.

1.5. Number of Subjects

Approximately 92 subjects with refractory gMG are randomized in a 1:1 (eculizumab:placebo) ratio at approximately 100 centers. Randomization is across centers and is stratified based on MGFA clinical classifications (Class a vs. Class b and Classes II and III vs. Class IV) (see Table 7).

1.6. Treatment Assignment

Approximately 92 subjects with refractory gMG are randomized, 46 subjects to eculizumab and 46 subjects to placebo. All patients will remain on assigned double-blind treatment until the EOS/ET visit. Randomized subjects who discontinue after initiation of study treatment are not being replaced. Assignment will be performed through the IXRS at each visit.

2. Selection and Withdrawal of Subjects 2.1. Subject Inclusion Criteria
  1. Male or female subjects≥18 years old
  2. Diagnosis of MG must be made by the following tests:
     Positive serologic test for anti-AChR Abs as confirmed at screening, and
     One of the following:
     a. History of abnormal neuromuscular transmission test demonstrated by single-fiber electromyography (SFEMG) or repetitive nerve stimulation, or
     b. History of positive anticholinesterase test, e.g., edrophonium chloride test, or c. Subject has demonstrated improvement in MG signs on oral cholinesterase
        inhibitors, as assessed by the treating physician.
  3. MGFA Clinical Classification Class II to IV at screening.
  4. MG-ADL total score must be ≥6 at screening and Randomization (Day 1)
  5. Subjects who have
     a. Failed treatment over one year or more with 2 or more ISTs* (either in combination or as monotherapy), i.e., continue to have impairment ADLs (persistent weakness, experience crisis, or unable to tolerate IST) despite ISTs. Or,
     * Immunosuppressant's include, but are not limited to, corticosteroids AZA, MMF, methotrexate (MTX), cyclosporine, tacrolimus, or cyclophosphamide.
     b. Failed at least one IST and require chronic plasma exchange or IVIg to control symptoms, i.e., subjects who require PE or IVIg on a regular basis for the management of muscle weakness at least every 3 months over last 12 months.
  6. If subjects who enter the study are receiving AZA they must have been on AZA for ≥6 months and have been on a stable dose for >2 months prior to screening.
  7. If subjects who enter the study are receiving other ISTs, i.e., MMF, MTX, cyclosporine, tacrolimus, or cyclophosphamide, they must have been on the IST for ≥3 months and have been on a stable dose for >1 month prior to screening.
  8. If subjects who enter the study are receiving oral corticosteroids, they must have been on a stable dose for ≥4 weeks (28 days) prior to screening.
  9. If subjects who enter the study are receiving a cholinesterase inhibitor they must have been on a stable dose for >2 weeks prior to screening.
  10. Female subjects of child-bearing potential must have a negative pregnancy test (serum human chorionic gonadotropin [HCG]). All subjects must practice an effective, reliable and medically approved contraceptive regimen during the study and for up to 5 months following discontinuation of treatment.
  11. Subject must give written informed consent.
  12. Subject must be able and willing to comply with study procedures.

2.2. Subject Exclusion Criteria
  1. History of thymoma or other neoplasms of thymus.
  2. History of thymectomy within 12 months prior to screening.
  3. Weakness only affecting ocular or peri-ocular muscles (MGFA Class I).
  4. MG crisis at screening (MGFA Class V)
  5. Pregnancy or lactation.
  6. Any systemic bacterial or other infection, which is clinically significant in the opinion of the Investigator and has not been treated with appropriate antibiotics
  7. Unresolved meningococcal infection.
  8. Use of IVIg within 4 weeks prior to Randomization (Day 1).
  9. Use of PE within 4 weeks prior to Randomization (Day 1).
  10. Use of rituximab within 6 months prior to screening.
  11. Participation in any other investigational drug trial or exposure to other investigational agent, device, or procedures within 30 days prior to screening.
  12. Subjects who have received previous treatment with eculizumab.
  13. Hypersensitivity to murine proteins or to one of the excipients of eculizumab.
  14. Any medical condition that, in the opinion of the Investigator, might interfere with the subject's participation in the study, poses any added risk for the subject, or confounds the assessment of the subjects.

2.3. Subject Withdrawal Criteria 2.3.1. Withdrawal of Subjects from the Trial

Subjects are allowed to withdraw consent at any time. Every effort should be made to ensure subjects are willing to comply with trial participation prior to conducting the screening procedures and the subjects should be fully informed of the restrictions related to the change of concomitant medications during the trial. Investigators may choose to discontinue a subject's treatment because of AEs, as well as conditions or illnesses that preclude compliance with the protocol from the standpoint of the subject's safety or well-being. The study staff should notify the Sponsor and their site monitor of all trial withdrawals as soon as possible.

Reproduction and development studies with eculizumab have not been performed; therefore, eculizumab should not be administered to pregnant women. At the time of the last follow-up visit, all subjects of childbearing potential must continue to use adequate contraception for up to 5 months following discontinuation of eculizumab treatment. If a subject becomes pregnant, the IP must be immediately discontinued and the Sponsor must be notified. Each pregnancy will be followed to term and the Sponsor notified regarding the outcome.

2.3.2. Handling of Withdrawals

When a subject withdraws or is withdrawn from the trial, the Investigator shall record the withdrawal reason(s). Whenever possible, all subjects who prematurely withdraw from the trial will undergo all assessments at the ET visit for safety as per the Schedule of Assessments (Table 6). A follow-up visit for safety assessment is required at 8 weeks after the last dose of IP administration (Table 6).

If a subject is discontinued due to an AE, the event will be followed until it is resolved or in the opinion of the PI the subject is determined to be medically stable. Every effort will be made to undertake protocol-specified safety follow-up procedures.

Subjects who fail to return for final assessments will be contacted by the site study staffs in an attempt to have them comply with the protocol. As it is vital to obtain follow-up data on any subject withdrawn because of an AE or SAE, follow-up due diligence documentation will consist of 3 phone calls followed by 1 registered letter to the subject's last known address. In any case, every effort must be made to undertake protocol-specified safety follow-up procedures.

2.3.3. Sponsor's Termination of Trial

Alexion Pharmaceuticals, Inc. or a regulatory authority may discontinue the trial at any time for any reason including, for example, clinical or administrative reasons.

2.3.4. End of Trial Definition

The end of trial is defined as the last visit completed by the last patient.

3. Treatment of Subjects 3.1. Description of Investigational Product

Eculizumab (600 mg, 900 mg or 1200 mg) or matching placebo is administered intravenously over approximately 35 minutes according to the regimen shown in Table 11.

TABLE 11

TRIAL DOSE REGIMEN

| Dose Period | Frequency of Investigational Product Administration | Visits | # of Vials | Equivalent Eculizumab Dose |
|---|---|---|---|---|
| Induction Phase | Weekly (every 7 ± 2 days) | 2-5 | 3 | 900 mg |
| | | 6 | 4 | 1200 mg |
| Maintenance Phase | Every 2 weeks (14 ± 2 days) from the fifth dose onward | 7-17 | 4 | 1200 mg |
| Supplement Doses* | If PE is given due to a Clinical Deterioration, administer within 60 minutes after the end of each PE session as described below*. | | 2 | 600 mg |

Induction Phase

Eculizumab or placebo: 3 vials of IP (equivalent to 900 mg of eculizumab) weekly for 4 weeks (every 7 days±2 days) followed by 4 vials of IP (equivalent to 1200 mg of eculizumab) one week later for the fifth dose (Visit 6/Week 4).

Maintenance Phase

Eculizumab or placebo: 4 vials of IP (equivalent to 1200 mg of eculizumab) every 2 weeks (14 days±2 days)

*Supplemental Doses

If PE is administered due to a Clinical Deterioration (as defined by this protocol), supplemental IP (2 vials, equivalent to 600 mg of eculizumab or matching placebo) will be administered within 60 minutes after the end of each PE session. If PE is administered on a day of regularly scheduled IP administration, subjects will receive the regularly scheduled number of vials (3 vials on Visits 2-4; 4 vials on all other visits) within 60 minutes after each PE session.

3.2. Concomitant Medications 3.2.1. Allowed Medications 3.2.1.1. Palliative and Supportive Care Palliative and supportive care is permitted during the course of the trial for underlying conditions.

The following medications are allowed under certain circumstances and restrictions.

3.2.1.2. Cholinesterase Inhibitors

For subjects who enter the trial receiving a cholinesterase inhibitor for at least two weeks prior to screening, the dose and schedule of their cholinesterase inhibitor is maintained stable throughout the entire Study Period, unless there is compelling medical need. Increases in cholinesterase therapy that are required as a result of inter-current illness or other medical cause of deterioration are permitted but dosing should be returned to dosing levels at trial entry as soon as feasible and the trial sponsor should be notified of the change.

Cholinesterase inhibitor treatment must be withheld for at least 10 hours prior to QMG and MGC tests.

If a decrease in cholinesterase inhibitor is considered based on clinical evaluation, sponsor approval must be obtained prior to the change in dose in order for the subject to remain on study. Dose increase as a result of inter-current illness or other medical cause is permitted, but dose should be returned to dose level at trial entry as soon as feasible and the trial sponsor should be notified.

3.2.1.3. Immunosuppressive Agents

The following immunosuppressive agents are allowed during the trial: corticosteroid, AZA, MMF, MTX, tacrolimus, cyclosporine, or cyclophosphamide. The immunosuppressive agent(s) and its appropriate dose level to be used for an individual subject is at the discretion of the treating physician.

Corticosteroid—for subjects who enter the trial receiving oral corticosteroid, e.g., prednisone, the dose/schedule must have been stable for four weeks prior to trial and may not be changed during the entire double-blind Study Period. If a decrease or taper in steroid dose is considered during the Study Period based on clinical evaluation, sponsor approval must be obtained prior to the change in order for the subject to remain on trial. If the dose level subsequently must be increased, the dose level increase cannot be above the dose level reported at the baseline (at the start of randomized treatment).

High-dose steroid should be reserved for subjects that experience Clinical Deterioration as defined by this protocol. Every effort should be made to notify the Sponsor within 24 hours of administration should a subject require a rescue therapy for Clinical Deterioration.

AZA, MMF, MTX, tacrolimus, cyclosporine or cyclophosphamide—for subjects who enter the trial receiving above mentioned immunosuppressive agents, the dose regimen of the immunosuppressive agent may not be changed during the entire double-blind Study Period. If a change in the dose regimen is considered due to known toxicity or side effects associated with the given immunosuppressive agent, sponsor approval must be obtained prior to the dose change in order for the subject to remain on the trial. A different immunosuppressive agent cannot be added or substituted during the 26-week double-blind Study Period.

3.2.1.4. Plasma Exchange/Plasmapheresis (PE)/IVIg

Use of PE or IVIg will be allowed for subjects who experience a Clinical Deterioration as defined by this protocol. The rescue therapy used for a particular subject is at the discretion of the treating physician. Every effort should be made to notify the Sponsor within 24 hours should a subject require a rescue therapy.

If PE is administered as a rescue therapy, supplemental IP (2 vials) are administered within 60 minutes after the end of each PE session. Routine (per protocol schedule) IP administration is continued per the specified dose-administration schedule for the subject. If the subject is scheduled to receive the protocol-scheduled dose on the day of a PE session, then the scheduled dose is administered within 60 minutes after the end of the PE session.

3.2.2. Disallowed Medications

The following concurrent medications are prohibited during the trial:
Use of
rituximab 3.3. Treatment Compliance The infusion of IP into subjects is under the supervision of the PI/Sub-Investigator or their designee, to ensure that the subject receives the appropriate dose at the appropriate time-points during the trial.

Subjects who fail to return for a scheduled visit within the accepted intervals must be contacted by the site study staffs to determine the reason for missing the appointment. Instructions for handling of missing visits are provided in Section 1.4.2.

3.4. Randomization and Blinding 3.4.1. Randomization

Subjects are randomized on Day 1 after the Investigator has verified that they are eligible. Subjects are randomized in a 1:1 ratio of eculizumab infusion to placebo infusion. The randomization will be across centers using an IXRS. The randomization stratification will be based on MGFA clinical classification assessed at the Screening Visit according to the following 4 groupings:
  a. MGFA Class IIa and IIIa
  b. MGFA Class IVa
  c. MGFA Class IIb and IIIb, and
  d. MGFA Class IVb The MGFA clinical classifications are described in Table 7.

3.4.2. Blinding and Unblinding

All trial subjects, investigational site personnel, sponsor staff, sponsor designees, and all staff directly associated with the conduct of the trial are blinded to the subject treatment assignments. The double blind is maintained by using identical IP kits and labels for eculizumab and placebo. The placebo has an identical appearance to that of eculizumab. The random code is maintained by Almac Clinical Services. There is no antidote to reverse the effects of eculizumab.

Therefore, unblinding would not be helpful in the planning of patient treatment for a given event. Unblinding should only be considered for the safety of the subject. If unblinding is deemed necessary by the Investigator, the Investigator can unblind the patient's treatment allocation using IXRS. The Investigator must note the date, time and reason for unblinding.

The Investigator should inform the Medical Monitor that the patient was unblinded, however they are not required to reveal to the Medical Monitor the patients' treatment allocation.

When an AE is an unexpected related serious AE, the blind will be broken by the Sponsor only for that specific subject. The blind will be maintained for persons responsible for the ongoing conduct of the study (such as the management, monitors, investigators, etc.) and those responsible for data analysis and interpretation of results at the conclusion of the study, such as biometrics personnel. Unblinded information will only be accessible to those who need to be involved in the safety reporting to Health Authorities, Ethics Committees and/or IRBs.

Investigators will receive only blinded information unless unblinded information is judged necessary for safety reasons.

4. Investigational Product Materials and Management 4.1. Investigational Product Each vial of IP contains eculizumab 300 mg or matching placebo for IV administration.

4.2 Investigational Product Packaging and Labeling

The active IP, eculizumab is manufactured and supplied by Alexion in single 30 mL vials as a solution concentration of 10 mg/ml. The comparator product is manufactured by Alexion Pharmaceuticals, Inc., as a matching sterile, clear, colorless solution with the same buffer components but without active ingredient, in an identical 30 ml vial. See Table 12.

All study medication is prepared in vials, packaged in kits, labeled in an identical manner.

IP vials will be individually packaged into a kit. Both vials and kits will be labeled according to the protocol and local regulatory requirements. Each kit will have a label describing the contents and a place for the pharmacist to record the subject number and initials.

Study medication is shipped and released to each participating trial center upon receipt of all required essential documents based upon federal, state, and local regulations (Table 12).

TABLE 12

INVESTIGATIONAL PRODUCT

| | Investigational | |
| --- | --- | --- |
| Product Name: | Eculizumab | Placebo |
| Dosage Form: | Concentrate for solution for infusion | Solution for infusion |
| Unit Dose: | 300 mg | 0 mg |
| Route of Administration: | Intravenous Infusion | Intravenous Infusion |
| Physical Description: | 30 mL vial | 30 mL vial |
| Manufacturer: | Alexion Pharmaceuticals, Inc. | Alexion Pharmaceuticals, Inc. |

4.3. Investigational Product Storage

IP is released to the site upon receipt of all required essential documents based upon federal, state, and local regulations. See Table 12.

Upon arrival at the center, the IP is promptly removed from the shipping cooler and stored in refrigerated conditions at 2 to 8° C. The pharmacist should immediately record the reception of the IP and notify the distributor if vials are damaged and/or if temperature excursions have occurred during transportation. IP must be stored in a secure, limited-access storage area and temperature must be monitored daily.

Diluted solutions of IP may be stored at 2 to 8° C. (36-46° F.) for up to 24 hours prior to administration. If the IP is prepared more than 4 hours in advance of a subject's visit, the diluted material should be stored at 2 to 8° C. The solution should be allowed to warm to room temperature prior to administration. The material must not be heated (e.g., by using a microwave or other heat source) other than by ambient air temperature.

4.4. Investigational Product Preparation

Infusions of IP are prepared using aseptic technique. Each vial of IP contains 300 mg of active ingredient in 30 mL of product solution or matching placebo.

Withdraw the required amount of IP from the vials. Transfer the recommended dose to an infusion bag. Dilute the IP to a final concentration of 5 mg/ml by addition to the infusion bag of the appropriate amount (equal volume) of 0.9% Sodium Chloride Injection, USP; 0.45% Sodium Chloride Injection, USP; 5% Dextrose in Water Injection, USP; or Ringer's Injection, USP. The final volume of a 5 mg/mL diluted IP solution is 120 mL for 600 mg doses (2 vials), 180 mL for 900 mg doses (3 vials) and 240 mL for 1200 mg doses (4 vials) as shown in Table 13.

TABLE 13

INVESTIGATIONAL PRODUCT RECONSTITUTION

| Investigational Product | Volume of IP | Volume of Diluent [a] | Total Volume of Administration |
|---|---|---|---|
| 600 mg (2 vials) | 60 mL | 60 mL | 120 |
| 900 mg (3 vials) | 90 mL | 90 mL | 180 |
| 1200 mg (4 vials) | 120 mL | 120 mL | 240 |

[a] Choose one of the following diluents: a. 0.9% sodium chloride; b. 0.45% sodium chloride; c. 5% dextrose in water; d. Ringer's injection Gently invert the infusion bag containing the diluted IP solution to ensure thorough mixing of the product and diluents. Discard any unused portion left in a vial, as the product contains no preservatives. The diluted solution should be allowed to warm to room temperature by exposure to ambient air prior to administration.

4.5. Administration

Do not Administer as an IV Push or Bolus Injection

IP is only administered via IV infusion and must be diluted to a final concentration of 5 mg/mL prior to administration. Prior to administration, if the diluted solution is refrigerated, it is allowed to warm to room temperature by exposure to ambient air. The diluted solution must not be heated in a microwave or with any heat source other than ambient air temperature. Parenteral drug products are inspected visually for particulate matter and discoloration prior to administration.

The diluted IP is intravenously administered over 35 minutes (range 25 to 45 minutes). It is not necessary to protect the infusion bags from light while IP is being administered to the subject. At the site's discretion, the diluted IP may be administered via gravity feed, a syringe-type pump, or an infusion pump. The subjects are monitored for 1 hour following infusion.

If an AE occurs during the administration of the IP, the infusion may be slowed or stopped at the discretion of the Investigator, depending upon the nature and severity of the event. The overall time of infusion should not exceed 2 hours. The AE must be captured in the subject's source document and CRF.

5. Assessment of Efficacy

Duration of treatment commences with the first infusion of IP (eculizumab or placebo). The 26-week Study Period defines the time period for assessment of the study endpoints (specified in Table 6, the schedule of assessments). Efficacy will be assessed comparing eculizumab outcomes to placebo outcomes. Statistical analyses of the efficacy endpoints are summarized below and described in more detail in the statistical analysis plan. For all scales noted below except the EQ Visual Analog Scale (VAS) and Myasthenia Gravis Foundation of America (MGFA) Post-Intervention Status (PIS) the higher the score the greater the impairment.

5.1. MG Activities of Daily Living Profile (MG-ADL)

The MG-ADL is an 8-point questionnaire that focuses on relevant symptoms and functional performance of activities of daily living (ADL) in MG subjects (see Table 1). The 8 items of the MG-ADL were derived from symptom-based components of the original 13-item QMG to assess disability secondary to ocular (2 items), bulbar (3 items), respiratory (1 item), and gross motor or limb (2 items) impairment related to effects from MG. In this functional status instrument, each response is graded 0 (normal) to 3 (most severe). The range of total MG-ADL score is 0-24. A clinically meaningful improvement in a patient's MG-ADL would be a 3 point or greater reduction in score after 26 weeks of treatment. The recall period for MG-ADL is the preceding 7 days. MG-ADL will be performed at Screening, Day 1, Weeks 1-4, 8, 10, 12, 16, 20, and 26 or ET (Visits 2-6, 8, 10, 12, 14, and 17, or ET) by a properly trained evaluator, preferably the same evaluator throughout the study.

5.2. QMG Scoring System

The current QMG scoring system consists of 13 items: ocular (2 items), facial (1 item), bulbar (2 items), gross motor (6 items), axial (1 item) and respiratory (1 item); each graded 0 to 3, with 3 being the most severe (see FIG. 21, originally Table 2). The range of total QMG score is 0-39. The QMG scoring system is considered to be an objective evaluation of therapy for MG and is based on quantitative testing of sentinel muscle groups. The MGFA task force has recommended that the QMG score be used in prospective studies of therapy for MG (15). A clinically meaningful improvement in a patient's QMG would be a 4 point or greater reduction in score after 26 weeks of treatment. The QMG will be administered at Screening, Day 1, Weeks 1-4, 8, 12, 16, 20, and 26 or ET (Visits 1-6, 8, 10, 12, 14, and 17 or ET).

5.3. MGC Score

The MGC is a validated assessment tool for measuring clinical status of subjects with MG (16). The MGC assesses 10 important functional areas most frequently affected by MG and the scales are weighted for clinical significance that incorporate subject-reported outcomes (see Table 3). A clinically meaningful improvement in a patient's MGC would be a 3 point or greater reduction in score after 26 weeks of treatment. MGC will be administered at Screening, Day 1, Weeks 1-4, 8, 12, 16, 20, and 26 or ET (Visits 1-6, 8, 10, 12, 14, and 17 or ET).

5.4. Quality of Life Assessments 5.4.1. MG-QOL 15

The 15-item Myasthenia Gravis Qualify of Life scale (MG-QOL 15) (see FIG. 1) is a health-related quality of life evaluative instrument specific to subjects with MG. MG-QOL15 was designed to provide information about subjects' perception of impairment and disability and the degree to which disease manifestations are tolerated and to be easy to administer and interpret (17). The MG-QOL 15 is completed by the subject. Higher scores indicate greater extent of and dissatisfaction with MG-related dysfunction. A clinically meaningful improvement in a patient's MG-QOL 15 would be an increase in score after 26 weeks of treatment. The MG-QOL 15 is administered at Screening, Day 1, Weeks 4, 8, 12, 16, 20, and 26 or ET (Visits 1-2, 6, 8, 10, 12, 14, and 17 or ET).

5.4.2. Neuro-QOL Fatigue

The Neuro-QOL Fatigue is a reliable and validated brief 19-item survey of fatigue, completed by the subject (18). Higher scores indicate greater fatigue and greater impact of MG on activities (see FIG. 22, originally Table 5). A clinically meaningful improvement in a patient's Neuro-QQL Fatigue score would be reflected in a decrease in score after 26 weeks of treatment. The Neuro-QOL Fatigue is administered at Day 1, Weeks 4, 8, 12, 16, 20, and 26 or ET (Visits 2, 6, 8, 10, 12, 14, and 17 or ET).

5.4.3. EUROQOL (EQ-5D)

The EUROQOL (EQ-5D) is a reliable and validated survey of health status in 5 areas: mobility, self-care, usual activities, pain/discomfort, and anxiety/depression, completed by the subject (19). Each area has 3 levels: level 1 (no problems), level 2 (some problems), and level 3 (extreme problems) (see FIGS. 2A and 2B). The EQ VAS records the subject's self-rated health on a vertical, 20 cm visual analogue scale where the endpoints are labeled "Best imaginable health state, marked as 100" and "Worst imaginable health state, marked as 0." A clinically meaningful improvement in a patient's EQ-5D would be reflected as an increase in score after 26 weeks of treatment. The EQ-5D is administered at Day 1, Weeks 4, 8, 12, 16, 20, and 26 or ET (Visits 2, 6, 8, 10, 12, 14, and 17 or ET).

5.5. Other Efficacy Assessments 5.5.1. Negative Inspiratory Force NIF and Forced Vital Capacity Subjects with increasingly severe MG can suffer from potentially fatal respiratory complications including profound respiratory muscle weakness. Respiratory function is monitored closely for evidence of respiratory failure in MG subjects and ventilator support is recommended in the event of consistent declines in serial measurements of Forced Vital Capacity (FVC) or Negative Inspiratory Force (NIF), loss of upper airway integrity (difficulty handling oral secretions, swallowing, or speaking) or in the setting of emerging respiratory failure. FVC as one of the test items in QMG is performed when QMG is performed. NIF was to be performed using the NIF Meter. It is measured at Screening, Day 1, Weeks 1-4, 8, 12, 16, 20, and 26 or ET (Visits 1-6, 8, 10, 12, 14, and 17 or ET).

5.5.2. MGFA Post-Intervention Status

The MG clinical state is assessed using the MGFA Post-Intervention Status. See Table 10. Change in status categories of Improved, Unchanged, Worse, Exacerbation and Died of MG as well as the Minimal manifestation (MM) is assessed and recorded at Weeks 4, 12 and 26 or ET (Visits 6, 10 and 17 or ET) by the PI or the same neurologist skilled in the evaluation of MG subjects throughout the trial. The sub-scores of MM, i.e., MM-0, MM-1, and MM-3, will not be used in this protocol.

6.2. Determination of Sample Size

The study design is a randomized, double blind, placebo-controlled design. Subjects will be randomly assigned 1:1 to eculizumab or placebo. The randomization stratification variable will be based on MG clinical classification by the Myasthenia Gravis Foundation of America (MGFA) according to the following 4 groupings (Class IIa and IIIa, Class IVa, Class IIb and IIIb and Class IVb).

The sample size and power calculation assumptions are as follows:
1:1 randomization (eculizumab:placebo)
Power 90% for both the primary and the first secondary endpoints
Two-sided 5% level of significance
Drop-out rate 15%
Mean changes from baseline for MG-ADL are assumed to be 4 for eculizumab and 1.5 for placebo with a standard deviation of 3.25, mean changes in QMG total score of 7 for eculizumab and 3 for placebo with a standard deviation of 6, and mean ranked differences between the treatment groups is assumed to be 3 with a standard deviation of 4 for both endpoints. Sample size calculations based on t-test.

With these assumptions, a sample size of approximately 92 subjects (46 eculizumab and 46 placebos) provides 90% power to detect a treatment difference at 26 weeks.

6.3. Analyses Sets

Analyses are produced for the double-blind Study Period in order to compare the eculizumab group with placebo group. The analyses include efficacy, safety, and PK/PD analyses.

6.3.1. Full Analysis Set

The full analysis set (FAS) is the population on which primary, secondary, and tertiary efficacy analyses is performed and consists of all subjects who are randomized to IP and who have received at least 1 dose of IP (eculizumab or placebo treatment) and have at least one efficacy assessment post IP infusion. Subjects are compared for efficacy according to the treatment they were randomized to receive, irrespective of the treatment they actually received.

6.3.2. Per-Protocol Set

The Per-Protocol (PP) Set is a subset of the Full Analysis Set (FAS) population, excluding subjects with major protocol deviations. The possible categories of major protocol deviations are defined in the statistical analysis plan. The per-protocol population will include all subjects who:
Have no major protocol deviations or inclusion/exclusion criteria deviations that might potentially affect efficacy,
Subjects who took at least 80% of the required doses and remained enrolled in the trial for 26 weeks or subjects who took at least 80% of the required doses up to the time of being discontinued for Clinical Deterioration (e.g., MG crisis/exacerbation).

The PP population will be fully described in the statistical analysis plan, and subjects identified prior to database lock. Efficacy analyses will also be performed on the PP data set.

6.7. Efficacy Analyses

Note: During the Study Period, Baseline is defined as the last available assessment prior to treatment for all subjects, regardless of treatment group.

6.7.1. Primary Efficacy Endpoint

The primary efficacy endpoint is change from baseline in the MG-ADL total score at Week 26 of the Study Period. The primary efficacy analysis is conducted on the available 26 week data from the Study Period for all subjects. The trial is considered to have met its primary efficacy objective if a statistically significant difference ($p \leq 0.05$) between the eculizumab treatment group and placebo group is observed for change from baseline in the MG-ADL total score at Week 26. Confidence intervals and p-values will be presented. For the primary analysis concerning the change from baseline in the MG-ADL total score at Week 26, treatment groups are compared using a worst-rank score analysis (i.e., analysis of covariance [ANCOVA] analysis with ranks) with effects for treatment. The baseline MG-ADL total score and the randomization stratification variables are also to be covariates in the model. In this analysis, the actual changes from baseline are ranked from highest (best improvement in MG-ADL score) to lowest (least improvement/most worsening in MG-ADL score) across all subjects who did not need rescue therapy. Then, any subject who needed rescue therapy would be given lower ranks. These lower ranks are based on the time to rescue therapy from the start of investigational product (Day 1). The subject with the shortest time to rescue therapy would get the absolute lowest rank in the analysis and the subject with the longest time to rescue therapy would get a rank that is one lower than the lowest ranked subject without rescue therapy. Last observation carried-forward is used for missing changes from baseline at Week 26 for patients with missing Week 26 who did not require rescue therapy.

A sensitivity analysis for the actual change from baseline in the MG-ADL total score at Week 26 is also performed. Treatment groups are compared using ANCOVA analysis using the actual change from baseline in the MG-ADL total score at Week 26 with effects for treatment. The baseline MG-ADL total score and the randomization stratification variable are also covariates in the model. Last observation carried-forward is used for missing changes from baseline at Week 26.

A sensitivity analysis for the actual change from baseline in the MG-ADL total score at Week 26 is also performed. In the sensitivity analysis, treatment groups are compared using repeated measures model with effects for treatment and visits. The baseline MG-ADL total score, the randomization stratification variable, and an indicator for the IST treatment status of the subject are also covariates in the model. Subjects have an IST treatment status variable defined based on the IST treatments the subject receives.

In addition, summaries of changes from baseline in the MG-ADL total score at Week 26 are produced by treatment group for subjects who have failed ISTs.
  Subjects who have failed treatment over one year or more with 2 or more ISTs in sequence or in combination.
  Subjects who have failed at least one IST and require chronic plasma exchange or IVIg to control symptoms.

6.7.2. Secondary Efficacy Analysis

Unless otherwise specified, the secondary efficacy analyses use the available 26-week data from the Study Period. Hypothesis testing comparing eculizumab treatment with placebo treatment for the secondary efficacy analyses are performed using a closed testing procedure with the following rank order:
  1. Change from baseline in QMG total score at Week 26
  2. Proportion of subjects with at least a 3-point reduction in the MG-ADL total score from baseline to Week 26 and with no rescue therapy
  3. Proportion of subjects with at least a 5-point reduction in the QMG total score from baseline to Week 26 and with no rescue therapy
  4. Change from baseline in the MGC score at Week 26
  5. Change from baseline in MG-QOL15 at Week 26

The hypothesis testing will proceed from highest rank (#1) Change from baseline in QMG total score at Week 26 to (#5) Change from baseline in MG-QOL-15, and if statistical significance is not achieved at an endpoint (p≤0.05), then endpoints of lower rank are not considered to be statistically significant. Confidence intervals and p-values are presented for all secondary efficacy endpoints for descriptive purposes, regardless of the outcome of the closed testing procedure.

The secondary endpoints that involve changes from baseline are analyzed using a worst-case ranked analysis of covariance (ANCOVA) like that described for the primary efficacy endpoints as the primary analysis for the particular secondary endpoint. The ranked ANCOVA will have effects for treatment, the baseline for the particular endpoint, and the randomization stratification variable.

A sensitivity analysis for the change from baseline in QMG at Week 26 is analyzed using repeated measures model with effects for treatment, visits, and baseline QMG score in order to compare treatment groups. The randomization stratification variable is also a covariate in the model. A sensitivity analysis for the actual change from baseline in QMG score at Week 26 will also be performed. Treatment groups are compared using ANCOVA analysis using the actual change from baseline in the QMG score at Week 26 with effects for treatment. The baseline QMG score and the randomization stratification variable are also covariates in the model. Last observation carried-forward will be used for missing changes from baseline at Week 26.

A sensitivity analysis for the change from baseline in MGC at Week 26 is analyzed using repeated measures model with effects for treatment, visits, and baseline MGC score in order to compare treatment groups. The randomization stratification variable is also a covariate in the model.

A sensitivity analysis for the change from baseline in MG-QOL-15 at Week 26 is analyzed using repeated measures model with effects for treatment, visits, and baseline MG-QOL-15 score in order to compare treatment groups. The randomization stratification variable is also a covariate in the model.

The proportion of subjects with at least a 3 point reduction in the MG-ADL total score from baseline to Week 26 with no rescue therapy are analyzed by the Cochran-Mantel-Haenszel test stratified by randomization stratification variable in order to compare eculizumab versus placebo.

The proportion of subjects with at least a 5 point reduction in the QMG total score from baseline to Week 26 with no rescue therapy are analyzed by the Cochran-Mantel-Haenszel test stratified by randomization stratification variable in order to compare eculizumab versus placebo.

Additional sensitivity analyses are performed in order that assess the impact of IST treatment status on the various secondary endpoints. A sensitivity analysis for the change from baseline in the secondary endpoints (i.e., QMG, MGC, and MG-QOL-15) at Week 26 are analyzed using repeated measures model with effects for treatment, visits, and baseline score in order to compare treatment groups. The randomization stratification variable and an indicator for the IST treatment status of the subject are also covariates in the model. Subjects will have an IST treatment status variable defined based on the IST treatments the subject receives.

In addition, summaries of changes from baseline in QMG, MGC, and MG-QOL-15 at Week 26 are produced by treatment group for subjects who have failed ISTs.
  Subjects who have failed treatment over one year or more with 2 or more ISTs in sequence or in combination
  Subjects who have failed at least one IST and require chronic plasma exchange or IVIg to control symptoms.

6.7.3. Tertiary Efficacy Endpoints

The tertiary efficacy analyses for the Study Period include the following:
  1. Time to response as measured by the reduction in the MG-ADL total score (3-point reduction from baseline)

2. Change from baseline in Neuro-QOL Fatigue at Week 26
3. Change from baseline in EQ-5D at 26 weeks
4. Change from baseline in NIF at Week 26 in subjects with abnormal NIF at baseline
5. Change from baseline in FVC at Week 26 in subjects with abnormal FVC at baseline
6. Change from baseline in the MG-ADL individual items and change from baseline in the MG-ADL sub-categories for the bulbar (items 1, 2 and 3), respiratory (item 4), limb (items 5 and 6) and ocular (items 7 and 8) at Week 26 in subjects with an abnormal baseline score for the particular item or sub-category
7. Change from baseline in the MGFA Post-Intervention Status at Week 26.

For the time to response on the MG-ADL total score (3-point reduction in MG-ADL from baseline), treatment groups are compared using Cox PH regression with robust variance estimation. The randomization stratification variable is also a covariate in the model. Inference is based on the Wald test of the log hazard ratio.

Quality of life is summarized as appropriate to the quality of life instrument and treatment group comparisons is performed as specified in the statistical analysis plan (SAP).

The tertiary endpoints that involve changes from baseline are analyzed using a worst-case ranked ANCOVA like that described for the primary efficacy endpoints as the primary analysis for the particular tertiary endpoint. The ranked ANCOVA has effects for treatment, the baseline for the particular endpoint, and the randomization stratification variable.

A sensitivity analysis for the change from baseline in NIF at Week 26 for subjects with abnormal NIF at baseline is analyzed using repeated measures model with effects for treatment, visits, and baseline NIF in order to compare treatment groups. The randomization stratification variables are also covariates in the model.

A sensitivity analysis for the change from baseline in FVC is analyzed using repeated measures model with effects for treatment, visits, and baseline FVC in order to compare treatment groups. The randomization stratification variable is also a covariate in the model.

A sensitivity analysis for the change from baseline in the MG-ADL individual items and sub-categories at Week 26 in subjects that are abnormal at baseline are analyzed using repeated measures model with effects for treatment, visits, and baseline MG-ADL individual item and sub-categories, as applicable for the analysis, in order to compare treatment groups. The randomization stratification variable is also a covariate in the model. In addition, for all full analysis set (FAS) and all PP subjects, a sensitivity analysis for the change from baseline in the MG-ADL individual items and sub-categories at Week 26 are performed using repeated measures model with effects for treatment, visits, and baseline MG-ADL individual item or sub-categories score, as applicable for the analysis, in order to compare treatment groups. The randomization stratification variable is also a covariate in the model. Finally, similar sensitivity analyses and/or summaries are produced (depending on the number of subjects) in the subset of subjects who were normal at baseline and became abnormal after baseline in the MG-ADL individual items and sub-categories.

A summary of subjects going from normal to abnormal for NIF and FVC are presented. A summary of subjects going from normal to abnormal for a particular MG-ADL individual items and sub-categories are produced.

6.11. Other Statistical Issues 6.11.1. Significance Levels

For all analyses, the eculizumab treated group is compared to the placebo group and all hypothesis testing is two-sided and performed at the 0.05 level of significance, unless otherwise specified. Estimates of treatment effect on efficacy parameters are accompanied by two-sided 95% confidence intervals for the effect size.

6.11.2. Missing or Invalid Data

For efficacy and safety analyses, missing post-baseline efficacy and safety data are not imputed unless indicated in the described analysis in the SAP.

6.11.3. Interim Analysis

There is no interim analysis planned for this trial.

Example 2: Extension Trial

An extension trial is described herein that was run to evaluate the long-term safety of eculizumab in subjects with refractory gMG. Other secondary objectives include:
Evaluation of the long-term efficacy as measured by MG-ADL.
Evaluation of long-term efficacy by additional efficacy measures including:
QMG, MGC,
MG-ADL individual items and subcategories
Quality of life.
Description of the PK and PD of eculizumab in refractory gMG patients.

Figure 7:
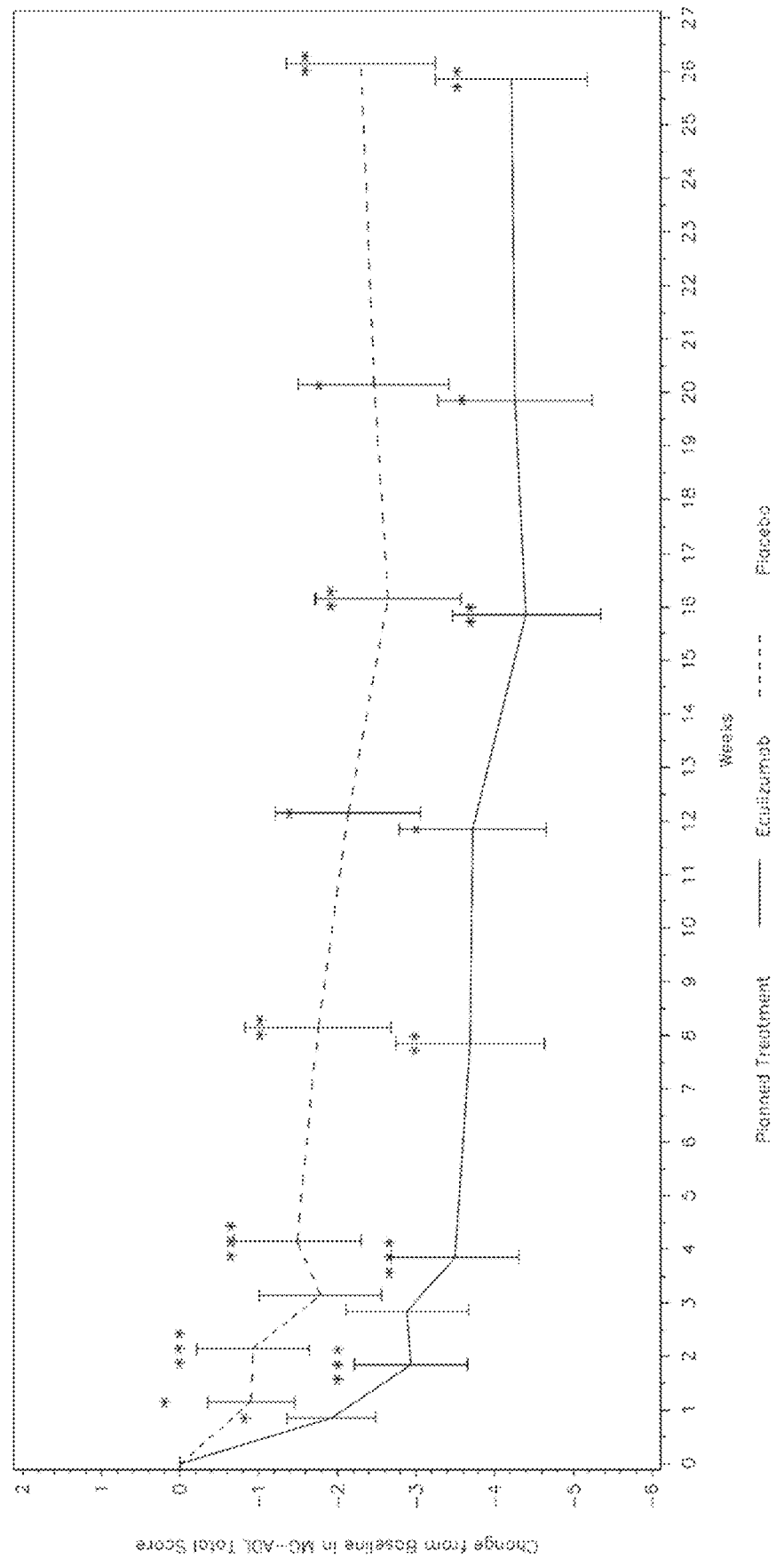
FIG. 7 is a graphical depiction of the changes from baseline in MG-ADL values obtained for placebo and eculizumab groups over the initial 26 weeks of the trial.
Figure 8:
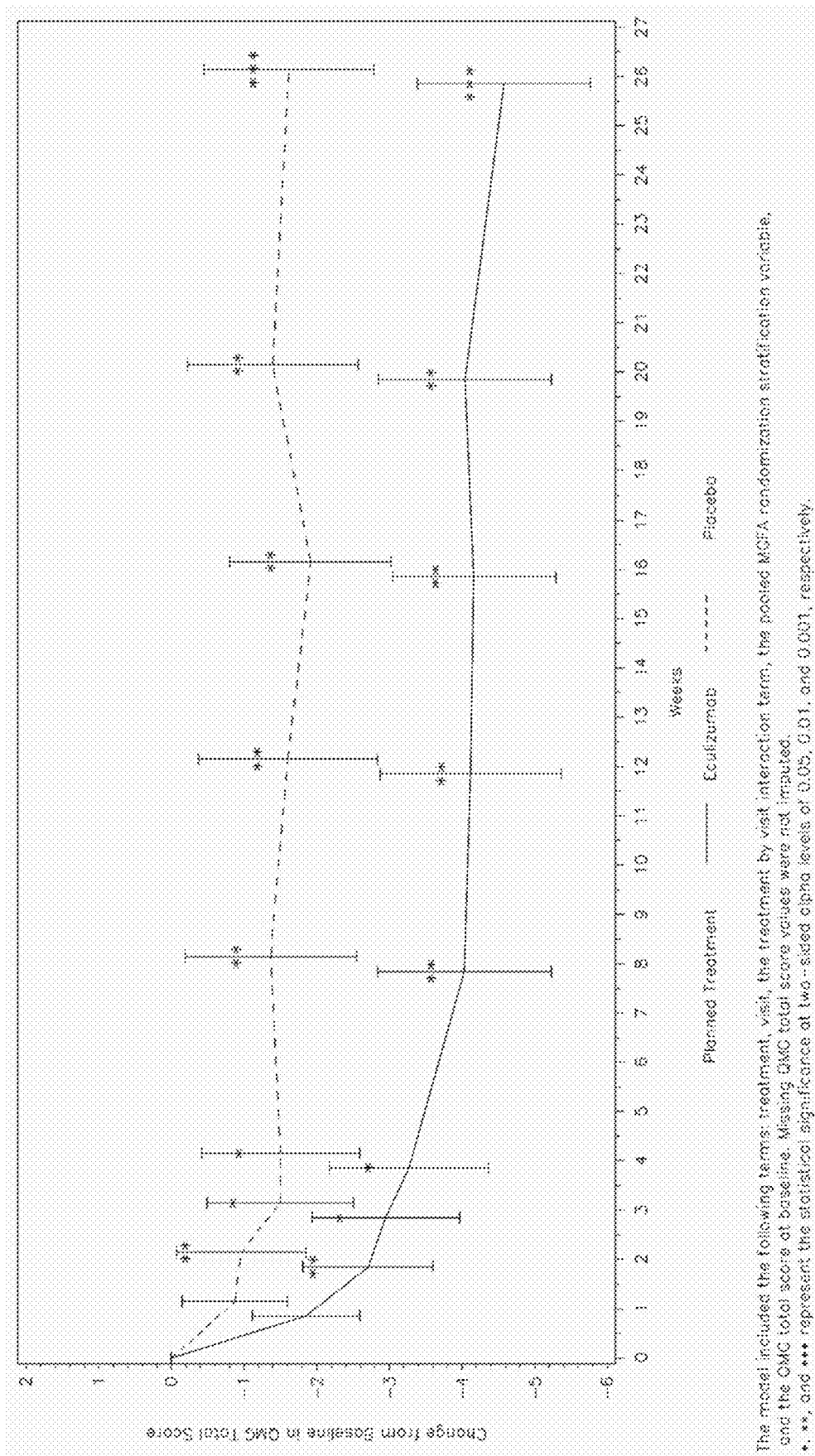
FIG. 8 is a graphical depiction of the changes from baseline in QMG values obtained for placebo and eculizumab groups over the initial 26 weeks of the trial.
Figure 9:
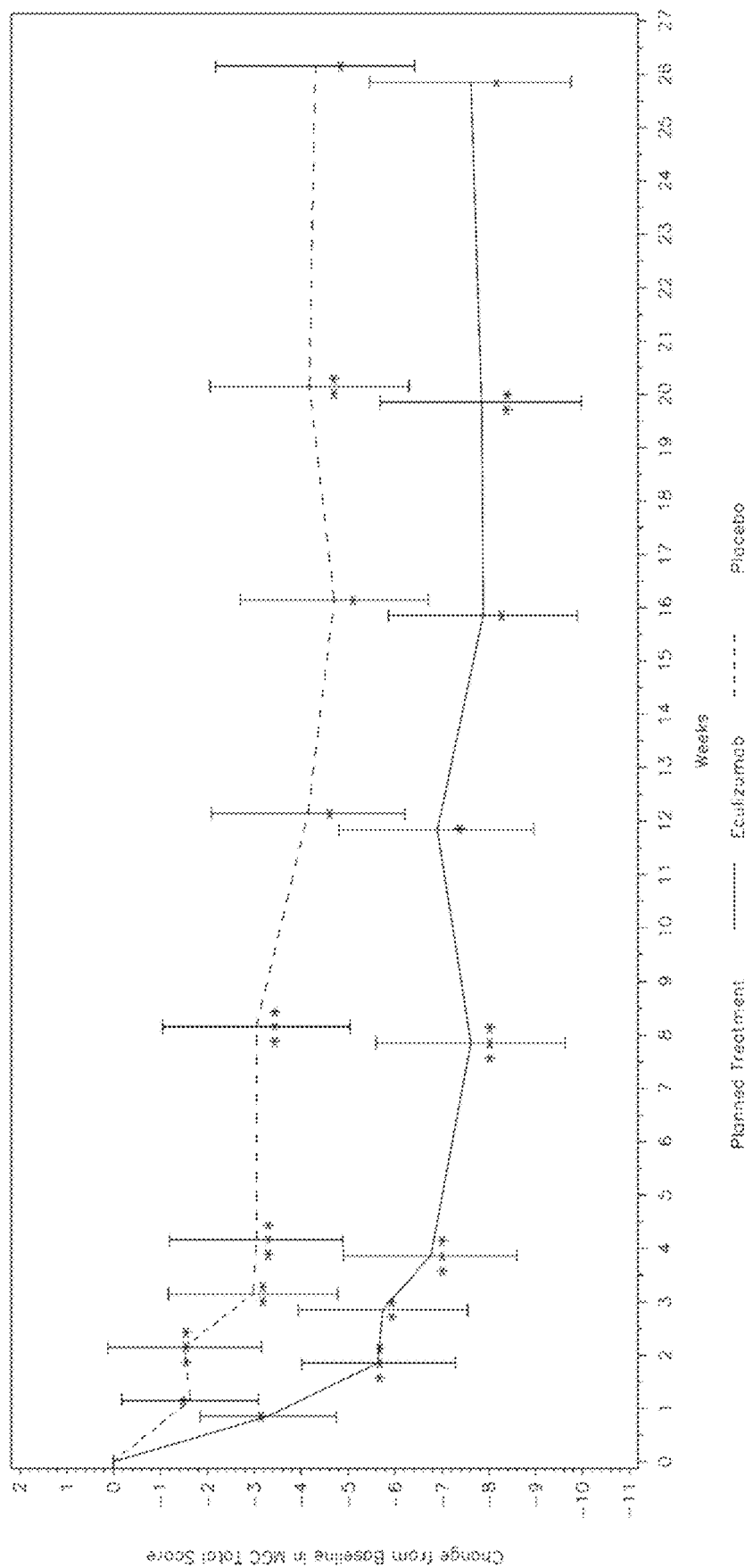
FIG. 9 is a graphical depiction of the changes from baseline in MGC values obtained for placebo and eculizumab groups over the initial 26 weeks of the trial.
Figure 10:
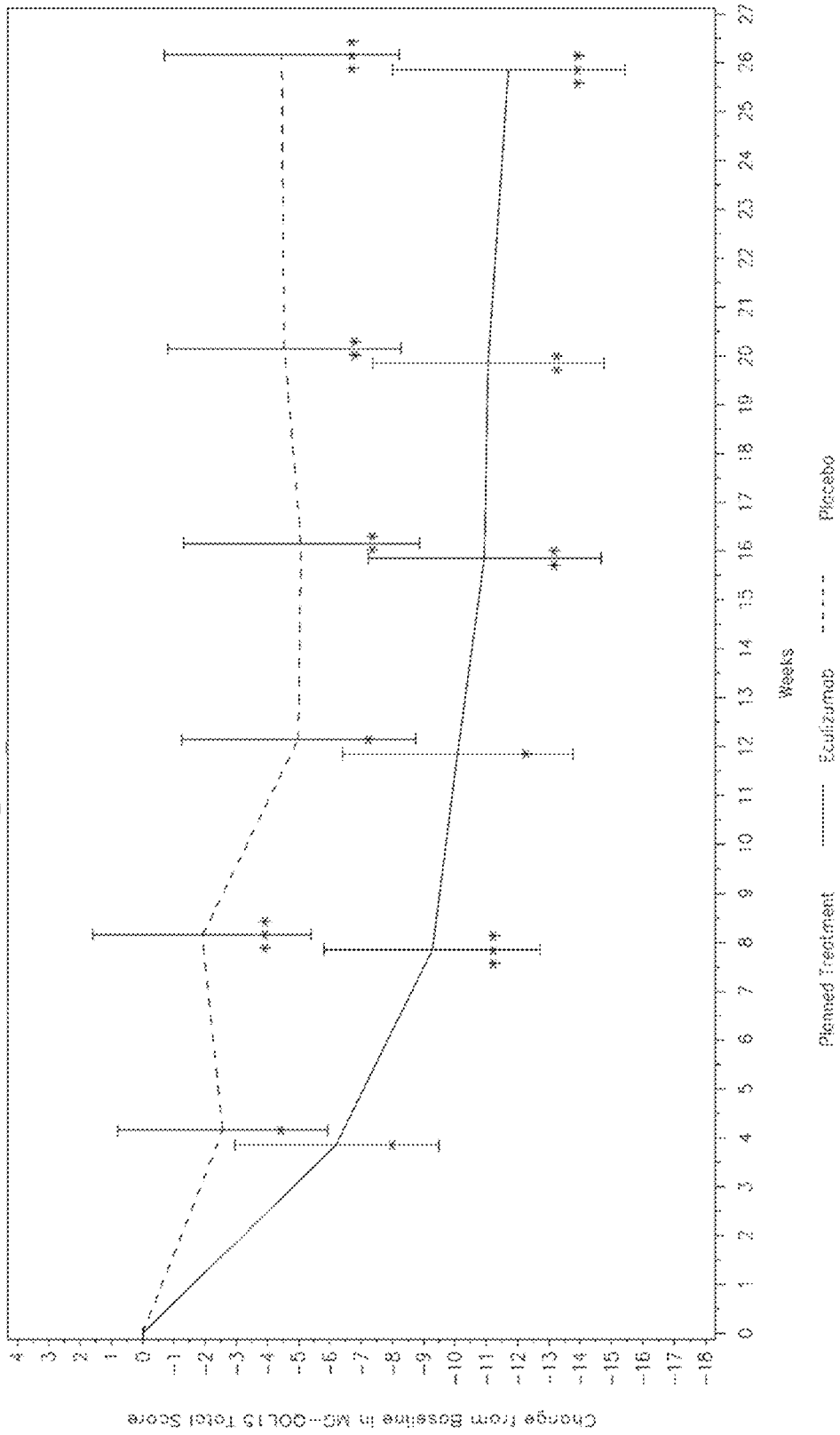
FIG. 10 is a graphical depiction of the changes from baseline in MG-QOL 15 values obtained for placebo and eculizumab groups over the initial 26 weeks of the trial.

The extension trial lasts for 4 years (FPFV to LPLV). The first visit occurs within 2 weeks of Visit 17 (Week 26) in the trial described above. To maintain the blind of the previous trial, all subjects undergo a blind induction phase, followed by an open label maintenance phase. This is summarized in FIGS. 6 and 7. "Home infusion" at selected visits is performed with permission of the primary investigator in accordance with regulations. Assessments, Treatment, Concomitant/Prohibited medications were performed as in the study described above.

The inclusion criteria for the extension trial was completion of the previous trial. Exclusion criteria were withdrawing from the previous trial and pregnancy or intention to get pregnant. IST treatment could be changed at the treating physician's discretion but rituximab was prohibited.

Efficacy was measured by MG-ADL, QMG, MGC, NIF, FVC, QOL, G-QOL15, Neuro-QOL Fatigue, EQ-5D and MGFA Post-Intervention Status.

Example 3: Results from REGAIN Study Comprising ECU-MG-301 26 Week (301) Trial and ECU-MG-302 Extension (302) Trial The REGAIN study is a randomized, double-blind, placebo-controlled, multicenter trial evaluating the safety and efficacy of eculizumab in patients with refractory gMG. The study enrolled and treated 125 adult patients across North America, South America, Europe, and Asia. Patients had a confirmed MG diagnosis with positive serologic test for anti-AChR antibodies. All patients had previously failed treatment with at least two immunosuppressive agents or failed treatment with at least one immunosuppressive agent and required chronic plasma exchange or IVIg, and had an MG-ADL total score≥6 at study entry.

As discussed above the patients were initially randomized according to MGFA Clinical Classification shown in Table 7 into the following four groups:

MGFA IIa/IIIa
MGFA IIb/IIIB
MGFA IVa
MGFA IVb

The breakdown of the MGFA classification at screening was as follows: Class IIa 25 total patients; Class IIb 22 total patients; Class IIIa 36 total patients; Class IIIb 30 total patients; Class IVa 6 total patients; and Class IVb 6 total patients.

The patients were assigned to the placebo group as follows: Class IIa 15 (23.8%) total patients; Class IIb 14 (22.2%) total patients; Class IIIa 16 (25.4%) total patients; Class IIIb 13 (20.6%) total patients; Class IVa 2 (3.2%) total patients; and Class IVb 3 (4.8%) total patients.

The patients were assigned to the eculizumab group were as follows: Class IIa 10 (16.1%) total patients; Class IIb 8 (12.9%) total patients; Class IIIa 20 (32.3%) total patients; Class IIIb 17 (27.4%) total patients; Class IVa 4 (6.5%) total patients; and Class IVb 3 (4.8%) total patients.

The disposition of patients completing the 301 trial and entering the 302 trial is shown below in Table 14.

TABLE 14

PATIENT DISPOSITION IN THE 301 AND 302 TRIALS

| Status | Placebo n (%) | Eculizumab n (%) | Total n (%) |
| --- | --- | --- | --- |
| Randomized | 63 (100.0) | 63 (100.0) | 126 (100.0) |
| Treated | 63 (100.0) | 62 (98.4) | 125 (99.2) |
| Completed the Study | 61 (96.8) | 57 (90.5) | 118 (93.7) |
| Discontinued | 2 (3.2) | 6 (9.5) | 8 (6.3) |
| Adverse Event | 0 (0.0) | 4 (6.3) | 4 (3.2) |
| Death | 0 (0.0) | 0 (0.0) | 0 (0.0) |
| Withdrawal by Subject | 2 (3.2) | 1 (1.6) | 3 (2.4) |
| Other | 0 (0.0) | 1 (1.6) | 1 (0.8) |
| Enrolled in Open-Label Extension Study | 61 (96.8) | 56 (88.9) | 117 (92.9) |

Therefore 96.8% of the placebo patients and 88.9% of the eculizumab patients proceeded into the extension trial.

The demographics of the 301 trial participants were as is shown below in Table 15.

TABLE 15

DEMOGRAPHICS OF 301 CLINICAL TRIAL PARTICIPANTS

| Variable | Statistic | Placebo (N = 63) | Eculizumab (N = 62) | Total (N = 125) |
| --- | --- | --- | --- | --- |
| Age at First IP Dose (years) (1) | n | 63 | 62 | 125 |
|  | Mean (SD) | 46.9 (17.98) | 47.5 (15.66) | 47.2 (16.80) |
|  | Median | 48.0 | 44.5 | 46.0 |
|  | Min, Max | 19, 79 | 19, 74 | 19, 79 |
| Sex |  |  |  |  |
| Male | n (%) | 22 (34.9) | 21 (33.9) | 43 (34.4) |
| Female | n (%) | 41 (65.1) | 41 (66.1) | 82 (65.6) |
| Race |  |  |  |  |
| Asian | n (%) | 16 (25.4) | 3 (4.8) | 19 (15.2) |
| Black or African American | n (%) | 3 (4.8) | 0 (0.0) | 3 (2.4) |
| White | n (%) | 42 (66.7) | 53 (85.5) | 95 (76.0) |
| Other | n (%) | 2 (3.2) | 6 (9.7) | 8 (6.4) |
| Is the subject of Japanese descent? |  |  |  |  |
| Yes | n (%) | 9 (14.3) | 3 (4.8) | 12 (9.6) |
| No | n (%) | 54 (85.7) | 59 (95.2) | 113 (90.4) |

The protocol defines clinical deterioration as a subject who has one of the following:

1. MG Crisis
2. Significant symptomatic worsening, defined as worsening on any one of the MG-ADL individual items excluding ocular (i.e., talking, chewing, swallowing, breathing, upper and lower extremity weakness):

To Grade 3, or 2-point worsening in MG-ADL
3. The treating physician believes that the subject's health is in jeopardy if rescue therapy is not administered.

Rescue therapy is defined in the protocol as follows: Use of PE or IVIg will be allowed for subjects who experience a Clinical Deterioration as defined by this protocol. The rescue therapy used for a particular subject is at the discretion of the treating physician If PE is administered as a rescue therapy, supplemental IP (2 vials) are administered within 60 minutes after the end of each PE session. Routine (per protocol schedule) IP administration is continued per the specified dose-administration schedule for the subject. If the subject is scheduled to receive the protocol-scheduled dose on the day of a PE session, then the scheduled dose is administered within 60 minutes after the end of the PE session.

The total numbers of patients who experienced clinical deterioration during the protocol were as is shown below in Table 16.

TABLE 16

CLINICAL DETERIORATION DURING THE 301

| Variable | Statistic | Placebo (N = 63) | Eculizumab (N = 62) |
| --- | --- | --- | --- |
| Total Number of Subjects Reporting Clinical Deterioration | n (%) | 15 (23.8) | 6 (9.7) |
| Total Number of Subjects Experiencing Clinical Deterioration Per Protocol Criteria | n (%) | 11 (17.5) | 6 (9.7) |
| Total Number of Subjects |  |  |  |

TABLE 16-continued

CLINICAL DETERIORATION DURING THE 301

| Variable | Statistic | Placebo (N = 63) | Eculizumab (N = 62) |
|---|---|---|---|
| Experiencing the Following Events: | | | |
| MG Crisis | n (%) | 0 ( 0.0) | 1 ( 1.6) |
| Significant symptomatic worsening | n (%) | 9 ( 14.3) | 4 ( 6.5) |
| Subject's health is in jeopardy | n (%) | 3 ( 4.8) | 2 ( 3.2) |
| Other | n (%) | 4 ( 6.3) | 0 ( 0.0) |
| Total Number of Clinical Deterioration Events: | n | 27 | 13 |
| MG Crisis | n | 0 | 1 |
| Significant symptomatic worsening | n | 14 | 4 |
| Subject's health is in jeopardy | n | 7 | 8 |
| Other | n | 6 | 0 |

The clinical deteriorations requiring rescue therapy are shown in Table 17 below:

TABLE 17

CLINICAL DETERIORATION REQUIRING RESCUE THERAPIES DURING THE 301

| Variable | Statistic | Placebo (N = 63) | Eculizumab (N = 62) |
|---|---|---|---|
| Total Number of Subjects Requiring Rescue Therapy: | n (%) | 12 ( 19.0) | 6 ( 9.7) |
| Total Number of Subjects Requiring High Dose Corticosteroids | n (%) | 5 ( 7.9) | 0 ( 0.0) |
| Total Number of Subjects Requiring Plasmapheresis/Plasma Exchange | n (%) | 4 ( 6.3) | 3 ( 4.8) |
| Total Number of Subjects Requiring IVIg | n (%) | 6 ( 9.5) | 4 ( 6.5) |
| Total Number of Subjects Requiring Other Rescue Therapy | n (%) | 2 ( 3.2) | 1 ( 1.6) |
| Total Number of Clinical Deterioration Events Requiring Rescue Therapy: | n | 24 | 13 |
| Total Number of Clinical Deterioration Events Requiring High Dose Corticosteriods | n | 8 | 0 |
| Total Number of Clinical Deterioration Events Requiring Plasmapheresis/Plasma Exchange | n | 10 | 4 |
| Total Number of Clinical Deterioration Events Requiring IVig | n | 13 | 10 |
| Total Number of Clinical Deterioration Events Requiring OtherRescue Therapy | n | 2 | 2 |

The primary and secondary endpoints as described above were used as shown below:

Primary Endpoint:
  Change from baseline in MG-ADL Total Score at Week 26
Secondary Endpoints (hierarchal):
  Change from baseline in QMG Total Score at Week 26
  Proportion of subjects with ≥3-point reduction in MG-ADL Total Score from baseline to Week 26 and without rescue therapy
  Proportion of subjects with ≥5-point reduction in QMG Total Score from baseline to Week 26 and without rescue therapy
  Change from baseline in the Myasthenia Gravis Composite (MGC) Total Score at Week 26
  Change from baseline in MG-QoL15 at Week 26

One primary endpoint in the MG-ADL score at week 26. The score ranges from 0-24 and contains 3 bulbar items, 1 respiratory item, 2 gross motor or limb items, and 2 ocular items. A clinically meaningful improvement in MG-ADL is defined as a 3 points or greater reduction. See Table 1.

TABLE 18

MG-ADL WORST RANK ANALYSIS: SAP3 PER PROTOCOL SET

| Variable | Statistic | Placebo (N = 56) | Eculizumab (N = 54) | Difference in LS Means and 95% CI | p-value |
|---|---|---|---|---|---|
| Worst Ranked Change from Baseline | Ranked Score LS Mean (SEM) | 61.3 (4.10) | 48.4 (4.20) | −12.8 | 0.0305 |
| | 95% CI for LS Mean | (53.15, 69.39) | (40.11, 56.74) | (−24.46, −1.24) | |
| Baseline MG-ADL Total Score for patients not needing rescue therapy or dropping out of the study | n | 48 | 49 | | |
| | Mean (SD) | 9.8 (2.70) | 10.1 (3.07) | | |
| | Median | 9.0 | 10.0 | | |
| | Min, Max | 5, 18 | 5, 18 | | |
| Week 26 MG-ADL Total Score (LOCF) for patients not needing rescue therapy or dropping out of the study | n | 48 | 49 | | |
| | Mean (SD) | 7.0 (3.37) | 5.5 (4.04) | | |
| | Median | 6.0 | 5.0 | | |
| | Min, Max | 2, 16 | 0, 15 | | |
| Change from Baseline to Week 26 in MG-ADL Total Score for patients not needing rescue therapy or dropping out of the study | n | 48 | 49 | | |
| | Mean (SD) | −2.8 (3.05) | −4.7 (4.35) | | |
| | Median | −2.0 | −4.0 | | |
| | Min, Max | −8, 7 | −15, 4 | | |

The results from the patients who finished the entire protocol are shown in Table 18. Therefore, as shown in Table 20 the median value for the eculizumab group showed a −4 reduction in MG-ADL. This result demonstrates eculizumab produced a clinically meaningful improvement in MG patients as measured by their MG-ADL score.

The data were analyzed in multiple ways for statistical purposes as shown in Tables 18, 19, 20, and 21, but in each case the eculizumab group produced clinically meaningful improvement in MG-ADL and the placebo group failed to produce clinically meaningful improvement in MG-ADL. See Tables 18-21.

TABLE 19

MG-ADL WORST RANK ANALYSIS: SAP3 FULL ANALYSIS SET

| Variable | Statistic | Placebo (N = 63) | Eculizumab (N = 62) | Difference in LS Means and 95% CI | p-value |
|---|---|---|---|---|---|
| Worst Ranked Change from Baseline | Ranked Score LS Mean (SEM) | 68.3 (4.49) | 56.6 (4.53) | −11.7 | 0.0698 |
| | 95% CI for LS Mean | (59.43, 77.20) | (47.66, 65.61) | (−24.33, 0.96) | |
| Baseline MG-ADL Total Score for patients not needing rescue therapy or dropping out of the study | n | 51 | 52 | | |
| | Mean (SD) | 9.9 (2.64) | 10.1 (3.00) | | |
| | Median | 9.0 | 10.0 | | |
| | Min, Max | 5, 18 | 5, 18 | | |
| Week 26 MG-ADL Total Score (LOGF) for patients not needing rescue therapy or dropping out of the study | n | 51 | 52 | | |
| | Mean (SD) | 7.0 (3.36) | 5.4 (4.05) | | |
| | Median | 6.0 | 5.0 | | |
| | Min, Max | 2, 16 | 0, 15 | | |
| Change from Baseline to Week 26 in MG-ADL Total Score for patients not needing rescue therapy or dropping out of the study | n | 51 | 52 | | |
| | Mean (SD) | −2.8 (3.07) | −4.7 (4.32) | | |
| | Median | −2.0 | −4.5 | | |
| | Min, Max | −8, 7 | −15, 4 | | |

Refractory gMG is an ultra-rare segment of MG—a debilitating, complement-mediated neuromuscular disease—in which patients have largely exhausted conventional therapy and continue to suffer profound muscle weakness throughout the body, resulting in slurred speech, impaired swallowing and choking, double vision, upper and lower extremity weakness, disabling fatigue, shortness of breath due to respiratory muscle weakness, and episodes of respiratory failure. In the study, the primary efficacy endpoint of change from baseline in Myasthenia Gravis-Activities of Daily Living Profile (MG-ADL) total score, a patient-reported assessment, at week 26, did not reach statistical significance (p=0.0698) as measured by a worst-rank analysis.

TABLE 20

MG-ADL ANCOVA ACTUAL CHANGES FULL ANALYSIS SET

| Variable | Statistic | Placebo (N = 63) | Eculizumab (N = 62) | Difference in LS Means and 95% CI | p-value |
|---|---|---|---|---|---|
| Change from Baseline | LS Mean (SEM) | −2.6 (0.48) | −4.0 (0.48) | −1.4 | 0.0390 |
| | 95% CI for LS Mean | (−3.52, −1.63) | (−4.96, −3.04) | (−2.77, −0.07) | |
| Baseline MG-ADL Total Score | n | 63 | 62 | | |
| | Mean (SD) | 9.9 (2.58) | 10.5 (3.06) | | |
| | Median | 9.0 | 10.0 | | |
| | Min, Max | 5, 18 | 5, 18 | | |
| Week 26 MG-ADL Total Score (LOCF) | n | 63 | 62 | | |
| | Mean (SD) | 7.4 (3.50) | 6.4 (4.76) | | |
| | Median | 7.0 | 6.0 | | |
| | Min, Max | 0, 18 | 0, 17 | | |
| Change from Baseline | n | 63 | 62 | | |
| | Mean (SD) | −2.4 (3.32) | −4.1 (4.48) | | |
| | Median | −2.0 | −4.0 | | |
| | Min, Max | −8, 7 | −15, 4 | | |

TABLE 21

MG-ADL ANCOVA ACTUAL CHANGES PER PROTOCOL SET

| Variable | Statistic | Placebo (N = 56) | Eculizumab (N = 54) | Difference in LS Means and 95% CI | p-value |
|---|---|---|---|---|---|
| Change from Baseline | LS Mean (SEM) | −2.6 (0.48) | −4.3 (0.49) | −1.7 | 0.0153 |
|  | 95% CI for LS Mean | (−3.54, −1.63) | (−5.25, −3.30) | (−3.05, −0.33) |  |
| Baseline MG-ADL Total Score | n | 56 | 54 |  |  |
|  | Mean (SD) | 9.9 (2.63) | 10.3 (3.04) |  |  |
|  | Median | 9.0 | 10.0 |  |  |
|  | Min, Max | 5, 18 | 5, 18 |  |  |
| Week 26 MG-ADL Total Score (LOCF) | n | 56 | 54 |  |  |
|  | Mean (SD) | 7.4 (3.39) | 6.0 (4.36) |  |  |
|  | Median | 7.0 | 6.0 |  |  |
|  | Min, Max | 2, 16 | 0, 17 |  |  |
| Change from Baseline | n | 56 | 54 |  |  |
|  | Mean (SD) | −2.4 (3.16) | −4.3 (4.47) |  |  |
|  | Median | −2.0 | −4.0 |  |  |
|  | Min, Max | −8, 7 | −15, 4 |  |  |

Next the QMG scores were evaluated for all study participants. The current QMG scoring system consists of 13 items: ocular (2 items), facial (1 item), bulbar (2 items), gross motor (6 items), axial (1 item) and respiratory (1 item); each graded 0 to 3, with 3 being the most severe (see FIG. 21, originally Table 2). The range of total QMG score is 0-39. The QMG scoring system is considered to be an objective evaluation of therapy for MG and is based on quantitative testing of sentinel muscle groups. The MGFA task force has recommended that the QMG score be used in prospective studies of therapy for MG. A clinically meaningful improvement in a patient's QMG would be a 5 point or greater reduction in score after 26 weeks of treatment.

Figure 11:
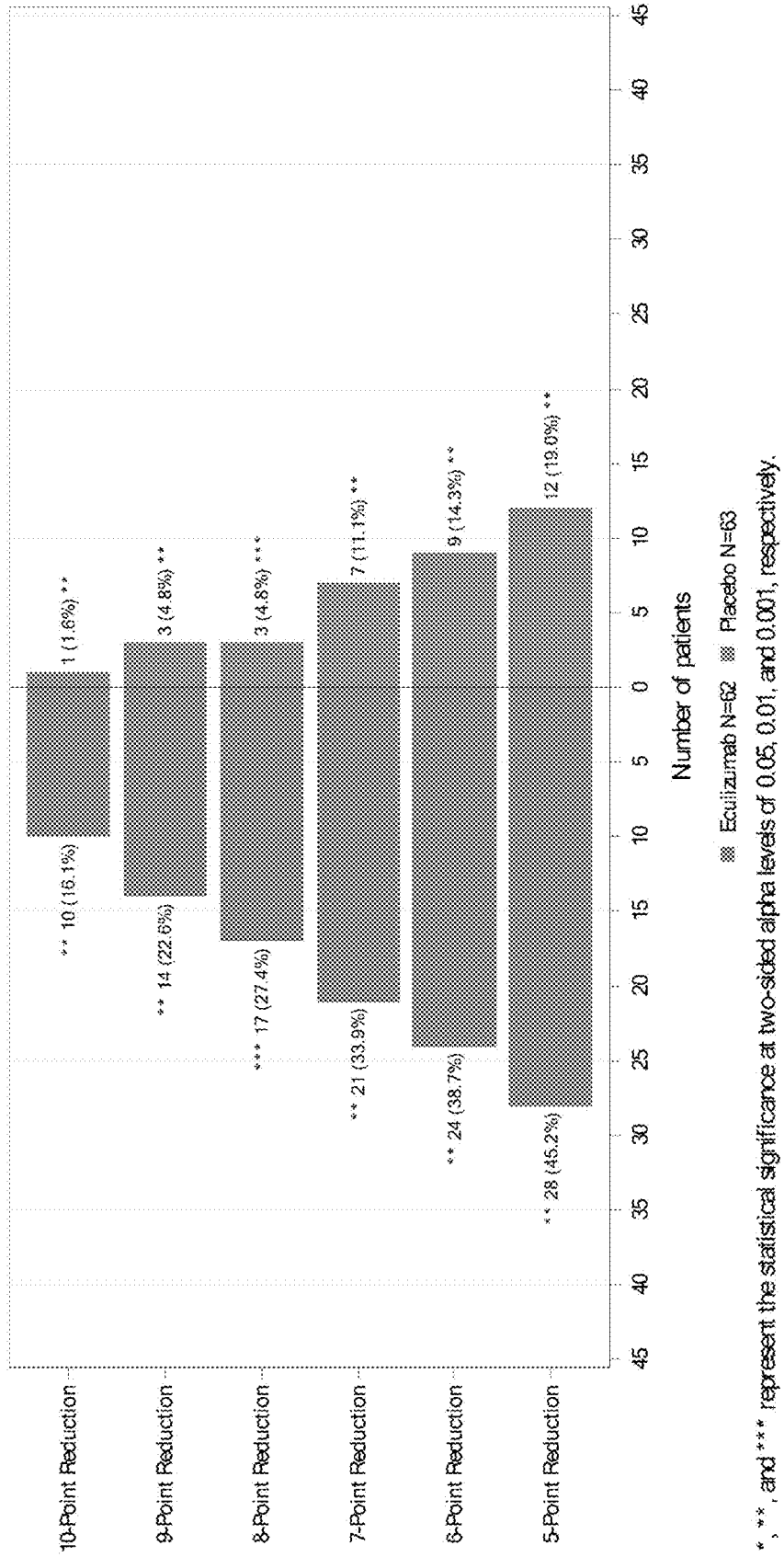
FIG. 11 is a graphical depiction of the numbers of patients in both the placebo and eculizumab treated groups achieving between a 5 and 10 point reduction in QMG score over the initial 26 weeks of the trial.

The QMG score for the full data set was-5 in the eculizumab treated group and therefore resulted in a clinically significant improvement for all patients not needing rescue or dropping out of the study. See Table 22 below and FIG. 11 for the results.

TABLE 22

QMG WORST RANK ANALYSIS: SAP3 FULL ANALYSIS SET

| Variable | Statistic | Placebo (N = 63) | Eculizumab (N = 62) | Difference in LS Means and 95% CI | p-value |
|---|---|---|---|---|---|
| Worst Ranked Change from Baseline | Ranked Score LS Mean (SEM) | 70.7 (4.46) | 54.7 (4.50) | −16.0 | 0.0129 |
|  | 95% CI for LS Mean | (61.85, 79.51) | (45.82, 63.64) | (−28.48, −3.43) |  |
| Baseline QMG Total Score for patients not needing rescue therapy or dropping out of the study | n | 51 | 52 |  |  |
|  | Mean (SD) | 16.4 (5.76) | 17.1 (4.96) |  |  |
|  | Median | 15.0 | 17.0 |  |  |
|  | Min, Max | 8, 34 | 6, 31 |  |  |
| Week 26 QMG Total Score (LOCF) for patients no tneeding rescue therapy or dropping out of the study | n | 51 | 52 |  |  |
|  | Mean (SD) | 14.1 (5.40) | 11.7 (5.83) |  |  |
|  | Median | 13.0 | 12.0 |  |  |
|  | Min, Max | 5, 32 | 1, 27 |  |  |
| Change from Baseline to Week 26 in QMG Total Score for patients not needing rescue therapy or dropping out of the study | n | 51 | 52 |  |  |
|  | Mean (SD) | −2.4 (3.70) | −5.4 (4.80) |  |  |
|  | Median | −3.0 | −5.0 |  |  |
|  | Min, Max | −11, 8 | −16, 2 |  |  |

Next, the MGC score was evaluated for all study participants over time. The MGC is a validated assessment tool for measuring clinical status of subjects with MG (16). The MGC assesses 10 important functional areas most frequently affected by MG and the scales are weighted for clinical significance that incorporate subject-reported outcomes (see Table 3). MGC will be administered at Screening, Day 1, Weeks 1-4, 8, 12, 16, 20, and 26 or ET (Visits 1-6, 8, 10, 12, 14, and 17 or ET). Total scores range from 0-50. A clinically meaningful improvement in a patient's MGC would be a 3 point or greater reduction in score after 26 weeks of treatment.

TABLE 23

MG COMPOSITE WORST RANK ANALYSIS: SAP3 FULL ANALYSIS SET

| Variable | Statistic | Placebo (N = 63) | Eculizumab (N = 62) | Difference in LS Means and 95% CI | p-value |
|---|---|---|---|---|---|
| Worst Ranked Change from Baseline | Ranked Score LS Mean (SEM) | 67.7 (4.47) | 57.3 (4.52) | −10.5 | 0.1026 |
|  | 95% CI for LS Mean | (58.89, 76.57) | (48.32, 66.21) | (−23.07, 2.13) |  |
| Baseline MGC Total Score for patients not needing rescue therapy or dropping out of the study | n | 51 | 52 |  |  |
|  | Mean (SD) | 19.0 (6.19) | 19.4 (5.97) |  |  |
|  | Median | 19.0 | 20.0 |  |  |
|  | Min, Max | 7, 40 | 7, 35 |  |  |
| Week 26 MGC Total Score (LOCF) for patients not needing rescue therapy or dropping out of the study | n | 51 | 52 |  |  |
|  | Mean (SD) | 13.0 (6.96) | 10.3 (7.00) |  |  |
|  | Median | 12.0 | 9.5 |  |  |
|  | Min, Max | 3, 37 | 0, 28 |  |  |
| Change from Baseline to Week 26 in MGC Total Score for patients not needing rescue therapy or dropping out of the study | n | 51 | 52 |  |  |
|  | Mean (SD) | −6.0 (6.19) | −9.2 (8.08) |  |  |
|  | Median | −6.0 | −10.0 |  |  |
|  | Min, Max | −21, 13 | −24, 17 |  |  |

The MGC score for the full data set was (−10) in the eculizumab treated group and therefore resulted in a clinically significant improvement for all patients not needing rescue or dropping out of the study. See Table 23 above for the results.

The 15-item Myasthenia Gravis Qualify of Life scale (MG-QOL 15) is a health-related quality of life evaluative instrument specific to subjects with MG. See Table 4. MG-QOL15 was designed to provide information about subjects' perception of impairment and disability and the degree to which disease manifestations are tolerated and to be easy to administer and interpret. The MG-QOL 15 is completed by the subject. Total scores range from 0 to 60 and higher scores indicate greater extent of and dissatisfaction with MG-related dysfunction. A clinically meaningful improvement in a patient's MGQOL would be a decrease in score after 26 weeks of treatment.

The MG-QOL15 median score for the full data set was (−11.5) in the eculizumab treated group and therefore resulted in a clinically significant improvement for all patients not needing rescue or dropping out of the study. See Table 24 below for the results.

TABLE 24

MG-QOL15 WORST RANK ANALYSIS FULL ANALYSIS SET

| Variable | Statistic | Placebo (N = 63) | Eculizumab (N = 62) | Difference in LS Means and 95% CI | p-value |
|---|---|---|---|---|---|
| Worst Ranked Change from Baseline | Ranked Score LS Mean (SEM) | 69.7 (4.51) | 55.5 (4.55) | −14.3 | 0.0281 |
|  | 95% CI for LS Mean | (60.79, 78.66) | (46.43, 64.47) | (−26.98, −1.56) |  |
| Baseline MG-QOL 15 Total Score for patients not needing rescue therapy or dropping out of the study | n | 51 | 52 |  |  |
|  | Mean (SD) | 30.2 (13.10) | 31.5 (11.82) |  |  |
|  | Median | 30.0 | 32.0 |  |  |
|  | Min, Max | 6, 60 | 6, 59 |  |  |

TABLE 24-continued

MG-QOL15 WORST RANK ANALYSIS FULL ANALYSIS SET

| Variable | Statistic | Placebo (N = 63) | Eculizumab (N = 62) | Difference in LS Means and 95% CI | p-value |
|---|---|---|---|---|---|
| Week 26 MG-QOL 15 Total Score (LOCF) for patients not needing rescue therapy or dropping out of the study | n | 51 | 52 | | |
| | Mean (SD) | 23.7 (13.38) | 18.0 (14.37) | | |
| | Median | 20.0 | 16.0 | | |
| | Min, Max | 3, 58 | 0, 59 | | |
| Change from Baseline to Week 26 in MG-QOL15 Total Score for patients not needing rescue therapy or dropping out of the study | n | 51 | 52 | | |
| | Mean (SD) | −6.5 (9.40) | −13.5 (14.07) | | |
| | Median | −6.0 | −11.5 | | |
| | Min, Max | −30, 16 | −44, 19 | | |

The Neuro-QOL Fatigue is a reliable and validated brief 19-item survey of fatigue completed by the subject. Higher scores indicate greater fatigue and greater impact of MG on activities (see FIG. 22, originally Table 5). A clinically meaningful improvement in a patient's Neuro-QQL Fatigue score would be reflected in a decrease in score after 26 weeks of treatment.

As shown in Table 25 below, the eculizumab treated group realized a clinically meaningful improvement (reduction) in their Neuro-QQL Fatigue score after 26 weeks of treatment.

TABLE 25

NEURO FATIGUE QOL WORST RANK ANALYSIS FULL ANALYSIS SET

| Variable | Statistic | Placebo (N = 63) | Eculizumab (N = 62) | Difference in LS Means and 95% CI | p-value |
|---|---|---|---|---|---|
| Worst Ranked Change from Baseline | Ranked Score LS Mean (SEM) | 74.1 (6.26) | 58.5 (6.06) | −15.6 | 0.0145 |
| | 95% CI for LS Mean | (61.73, 86.53) | (46.49, 70.48) | (−28.13, −3.15) | |
| Baseline Neuro-QOL Fatigue Total Score for patients not needing rescue therapy or dropping out of the study | n | 49 | 51 | | |
| | Mean (SD) | 61.7 (15.36) | 61.8 (13.57) | | |
| | Median | 65.0 | 62.0 | | |
| | Min, Max | 29, 88 | 36, 92 | | |
| Week 26 Neuro-QOL Fatigue Total Score (LOCF) for patients not needing rescue therapy or dropping out of the study | n | 49 | 51 | | |
| | Mean (SD) | 52.6 (18.66) | 43.6 (19.44) | | |
| | Median | 55.0 | 38.0 | | |
| | Min, Max | 21, 85 | 19, 95 | | |
| Change from Baseline to Week 26 in Neuro-QOL Fatigue Total Score for patients not needing rescue therapy or dropping out of the study | n | 49 | 51 | | |
| | Mean (SD) | −9.1 (14.58) | −18.2 (19.60) | | |
| | Median | −8.0 | −16.0 | | |
| | Min, Max | −51, 20 | −59, 30 | | |

Discussion of the Significance of the REGAIN Study

The first prospectively defined secondary efficacy endpoint of change from baseline in Quantitative Myasthenia Gravis (QMG) total score, a physician-administered assessment of MG clinical severity, with eculizumab treatment compared to placebo at week 26, achieved a p-value of 0.0129 as measured by a worst-rank analysis. In addition, the second and third prospectively defined secondary efficacy endpoints of responder status in MG-ADL and QMG achieved p-values of <0.05: the proportion of patients with at least a 3-point reduction in MG-ADL total score and no rescue therapy from baseline to week 26 with eculizumab treatment, compared to placebo, achieved a p-value of 0.0229, and the proportion of patients with at least a 5-point reduction in QMG total score and no rescue therapy from baseline to week 26 with eculizumab treatment compared to placebo achieved a p-value of 0.0018.

It is encouraging that the REGAIN study achieved clinically meaningful improvements in MG-ADL and QMG measures in patients treated with eculizumab compared with placebo. The magnitude of effect on QMG observed in this large, prospective registration trial is unprecedented in more than 30 years of clinical investigation of refractory MG patients. There is an urgent need in the MG community for a therapy with the potential to dramatically improve the lives of patients with refractory gMG, who continue to experience profound complement-mediated muscle weakness that makes it difficult or impossible to perform simple daily activities, including walking, talking, swallowing, and even breathing normally.

Pre-specified sensitivity analyses were prospectively defined to validate results for the primary and first secondary endpoints. Three of the four prospectively defined MG-ADL sensitivity analyses achieved p-values<0.05, including the sensitivity analysis around the primary endpoint for change from baseline in MG-ADL using repeated measures, which showed a mean change with eculizumab treatment at week 26 of −4.2 versus a mean change with placebo at week 26 of −2.3 and achieved a p-value of 0.0058. Additionally, all four prospectively defined QMG sensitivity analyses achieved p-values<0.05, including the sensitivity analysis around the first secondary endpoint for change from baseline in QMG using repeated measures, which showed a mean change with eculizumab treatment at week 26 of −4.6 versus a mean change with placebo at week 26 of −1.6 and achieved a p-value of 0.0006.

The findings from this study underscore the pivotal role of complement inhibition in addressing the underlying pathophysiology of refractory gMG. Importantly, the totality of data including the first three secondary endpoints and a series of prospectively defined sensitivity analyses, shows early and sustained substantial improvements over 26 weeks for patients treated with eculizumab compared to placebo Example 4: Anti-C5 Antibodies for Use in Treating Refractory Myasthenia Gravis Table 27 below contains sequences of anti-complement protein C5 specific humanized antibodies that can be used in treating refractory MG. The antibody was an anti-C5 antibody such as eculizumab having three heavy chain complementarity determining regions (CDRs) as set forth in Table 27 using the Kabat definitions of CDRs as heavy chain CDR1 in SEQ ID NO: 1, heavy chain CDR2 in SEQ ID NO: 2, and heavy chain CDR3 in SEQ ID NO: 3. The eculizumab light chain CDRs are set forth below as as light chain CDR1 in SEQ ID NO: 4, light chain CDR2 in SEQ ID NO: 5 and light chain CDR3 in SEQ ID NO: 6. The heavy chain variable region of eculizumab is set forth in SEQ ID NO: 7 and the light chain variable region of eculizumab is set forth in SEQ ID NO: 8. The complete heavy chain of eculizumab is set forth below as SEQ ID NO: 10 and the light chain is set forth below as SEQ ID NO: 11

The antibody may be an eculizumab variant known as BNJ441 and having selected mutations in the CDR regions combined with mutations in the Fc region to increase the T½ of the antibody in the patient. The BNJ441 antibody has heavy chain variable region as set forth in SEQ ID NO: 12 and the light chain variable region of BNJ441 is set forth in SEQ ID NO: 8. The complete heavy chain of BNJ441 is set forth below as SEQ ID NO: 14 and the light chain is set forth below as SEQ ID NO: 11

The antibody may be an anti-C5 antibody unrelated to eculizumab such as the 7086 antibody and having three heavy chain complementarity determining regions (CDRs) as set forth in Table 27 using the Kabat definitions of CDRs as heavy chain CDR1 in SEQ ID NO: 21, heavy chain CDR2 in SEQ ID NO: 22, and heavy chain CDR3 in SEQ ID NO: 23. The 7086 antibody light chain CDRs are set forth below as light chain CDR1 in SEQ ID NO: 24, light chain CDR2 in SEQ ID NO: 25 and light chain CDR3 in SEQ ID NO: 26. The heavy chain variable region of 7086 is set forth in SEQ ID NO: 27 and the light chain variable region of 7086 is set forth in SEQ ID NO: 28.

The antibody may be an anti-C5 antibody unrelated to eculizumab such as the 8110 antibody and having three heavy chain complementarity determining regions (CDRs) as set forth in Table 27 using the Kabat definitions of CDRs as heavy chain CDR1 in SEQ ID NO: 29, heavy chain CDR2 in SEQ ID NO: 30, and heavy chain CDR3 in SEQ ID NO: 31. The 7086 antibody light chain CDRs are set forth below as light chain CDR1 in SEQ ID NO: 32, light chain CDR2 in SEQ ID NO: 33 and light chain CDR3 in SEQ ID NO: 34. The heavy chain variable region of 8110 is set forth in SEQ ID NO: 35 and the light chain variable region of 8110 is set forth in SEQ ID NO: 36.

The antibody may be an anti-C5 antibody or antigen binding fragment thereof comprising a heavy chain variable region amino acid sequence according to SEQ ID NO: 37 and a light chain variable region amino acid sequence according to SEQ ID NO: 38.

Figure 12:
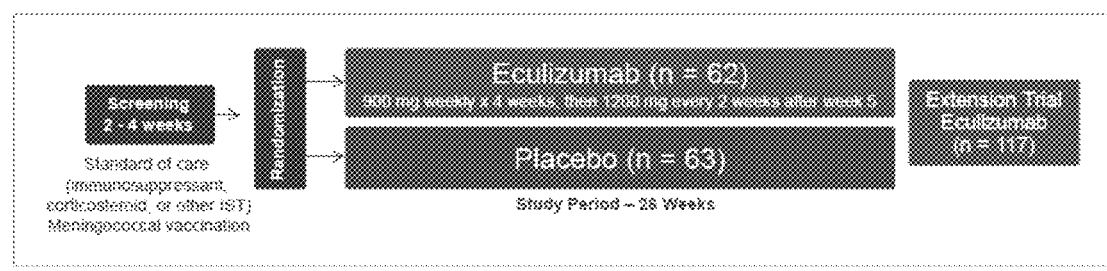
FIG. 12 is a schematic of the REGAIN study design.

Example 5: Dual Responder Analyses of Both Muscle Strength and Activities of Daily Living, Eculizumab Versus Placebo, in Refractory Generalized Myasthenia Gravis (gMG) Patients: Results from the REGAIN Study The objective of the example was to assess the time course of response in patients who demonstrated a clinically meaningful response to eculizumab and the proportion of patients who had clinically meaningful relevant responses on both the MG-ADL and the QMG. Patients with refractory gMG continued to receive stable doses of ISTs (including corticosteroids) throughout the study; patients were randomized to receive blinded eculizumab 900 mg weekly for 4 weeks, 1200 mg on the fifth week, and then 1200 mg every 2 weeks thereafter (n=62) or blinded placebo (n=63) (FIG. 12).

The Myasthenia Gravis Activities of Daily Living (MG-ADL) is a physician-directed, patient-reported measure of symptom severity related to MG-specific ADLs (Muppidi, Ann. N.Y. Acad. Sci. 1274:114-19 (2012)), and the Quantitative Myasthenia Gravis (QMG) tool is a clinician-reported measure of muscle strength (Barohn et al., Ann. N.Y. Acad. Sci. 841:769-72 (1998)). Pre-specified responder analyses included the proportion of patients who responded with ≥3-point improvement in MG-ADL total score with no rescue; and the proportion of patients with ≥5-point improvement in QMG total score with no rescue. In an ad hoc dual responder analysis, response was defined as an improvement of ≥3 points from baseline in the MG-ADL total score and improvement of ≥5 points from baseline in the QMG total score, with no rescue therapy. In addition to the prespecified responder thresholds (i.e., ≥3-point improvement for MG-ADL and ≥5-point improvement for QMG), thresholds of ≥4, 5, 6, 7, and 8 for MG-ADL and ≥6, 7, 8, 9, and 10 for QMG were also examined. P values from a Cochran-Mantel-Haenszel (CMH) test were provided for the more stringent criteria to aid interpretation.

Figure 13:
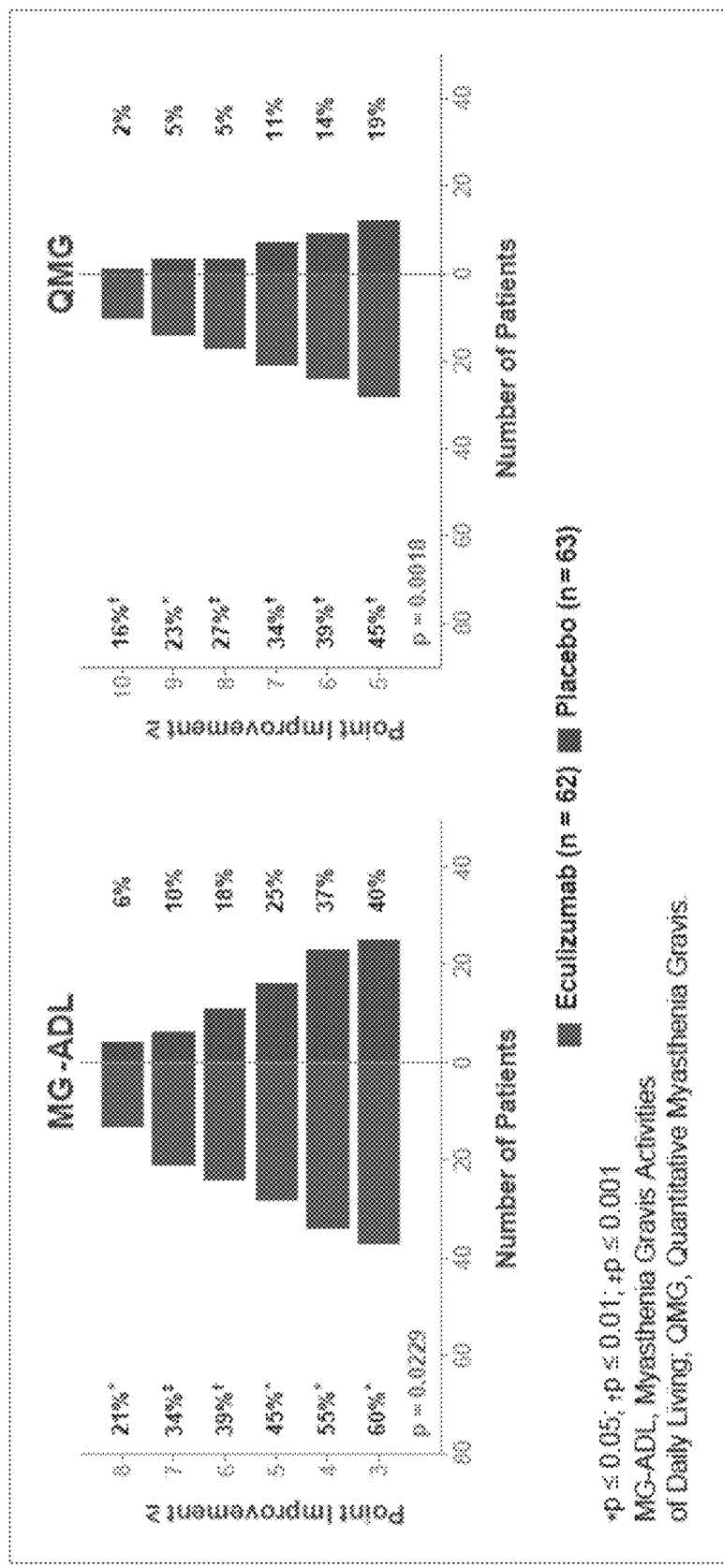
FIG. 13 is a graphical depiction of responder analyses (MG-ADL and QMG) illustrating the proportion of patients with improvement in total score and no rescue therapy at week 26 from baseline.
Figure 14:
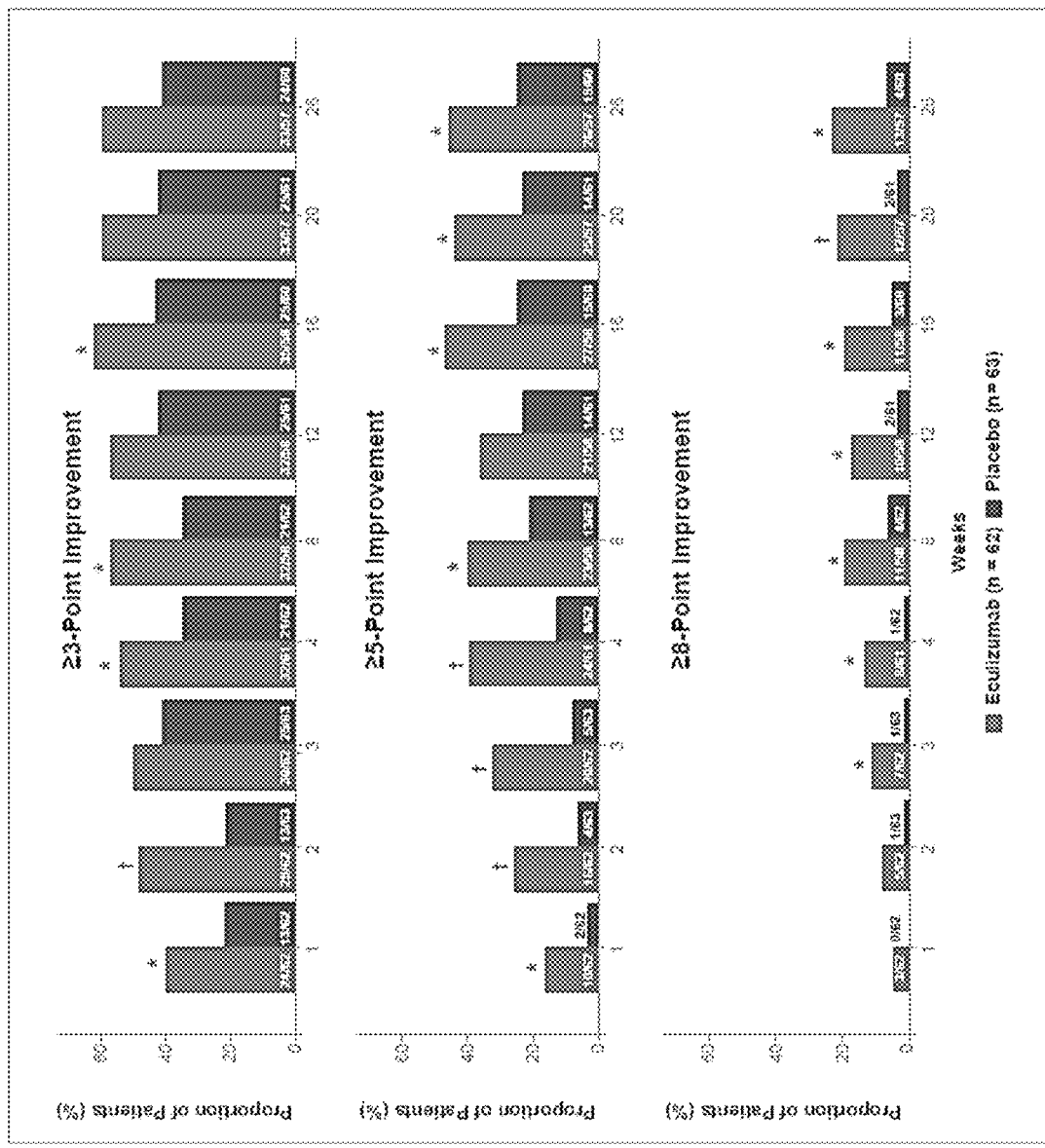
FIG. 14 is a graphical depiction of the proportion of patients with a ≥3, ≥5, or ≥8-point reduction in MG-ADL total score and no rescue therapy over time from baseline to week 26.
Figure 15:
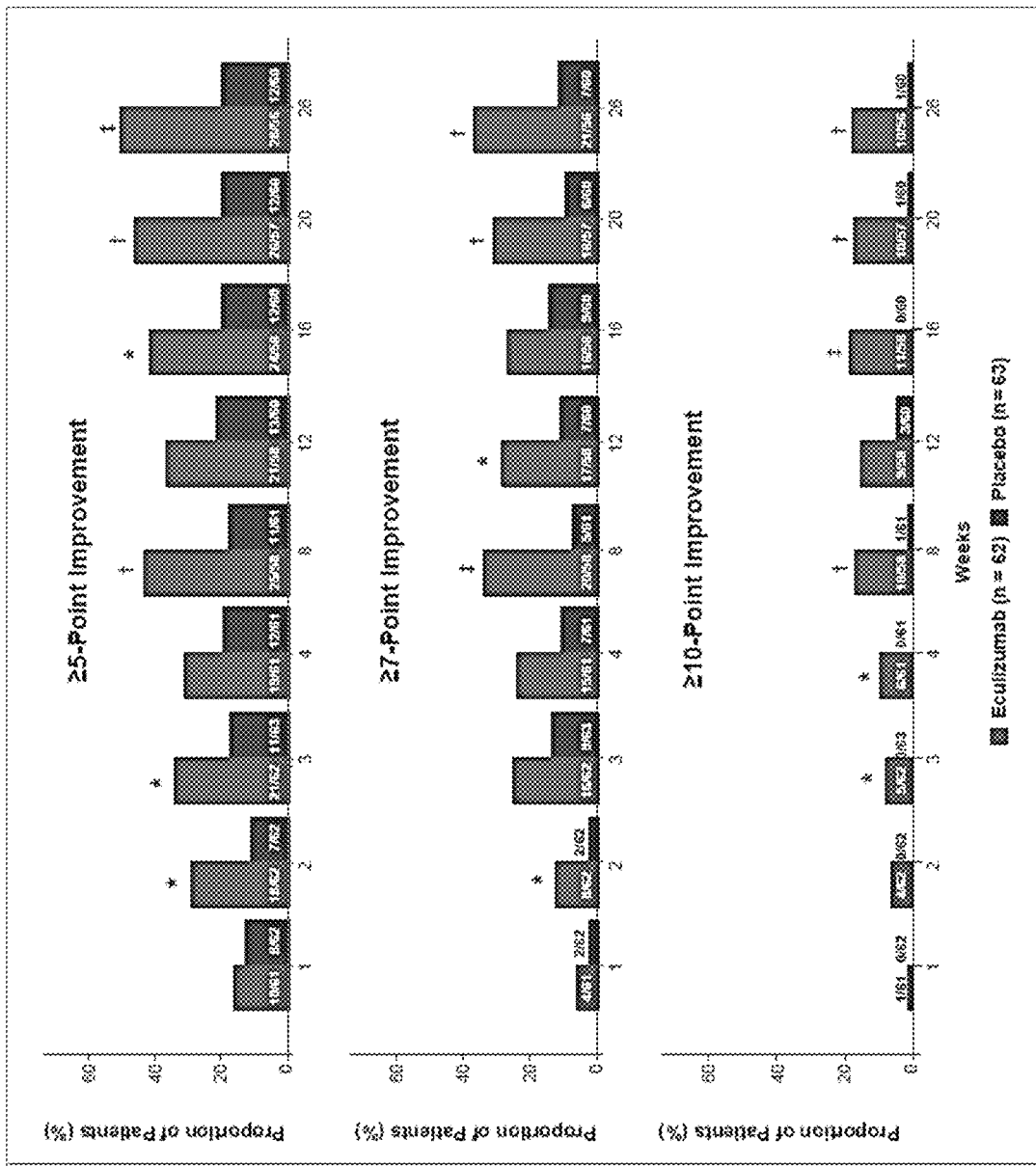
FIG. 15 is a graphical depiction of the proportion of patients with ≥5, ≥7, or ≥10-point reduction in QMG total score and no rescue over time from baseline to week 26.
Figure 16:
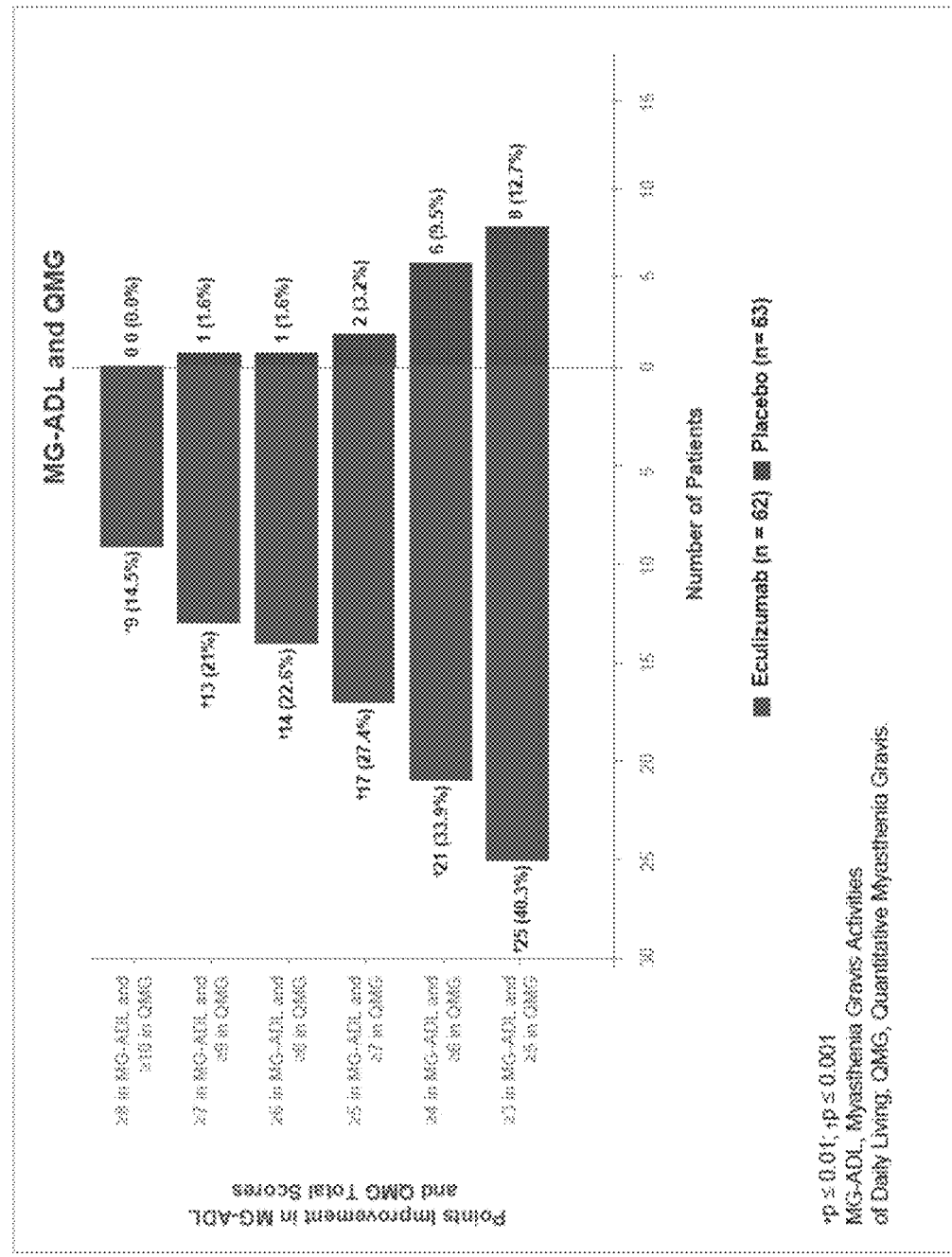
FIG. 16 is a graphical depiction of dual responders (assessed by MG-ADL and QMG total scores) with no rescue therapy at week 26.
Figure 17:
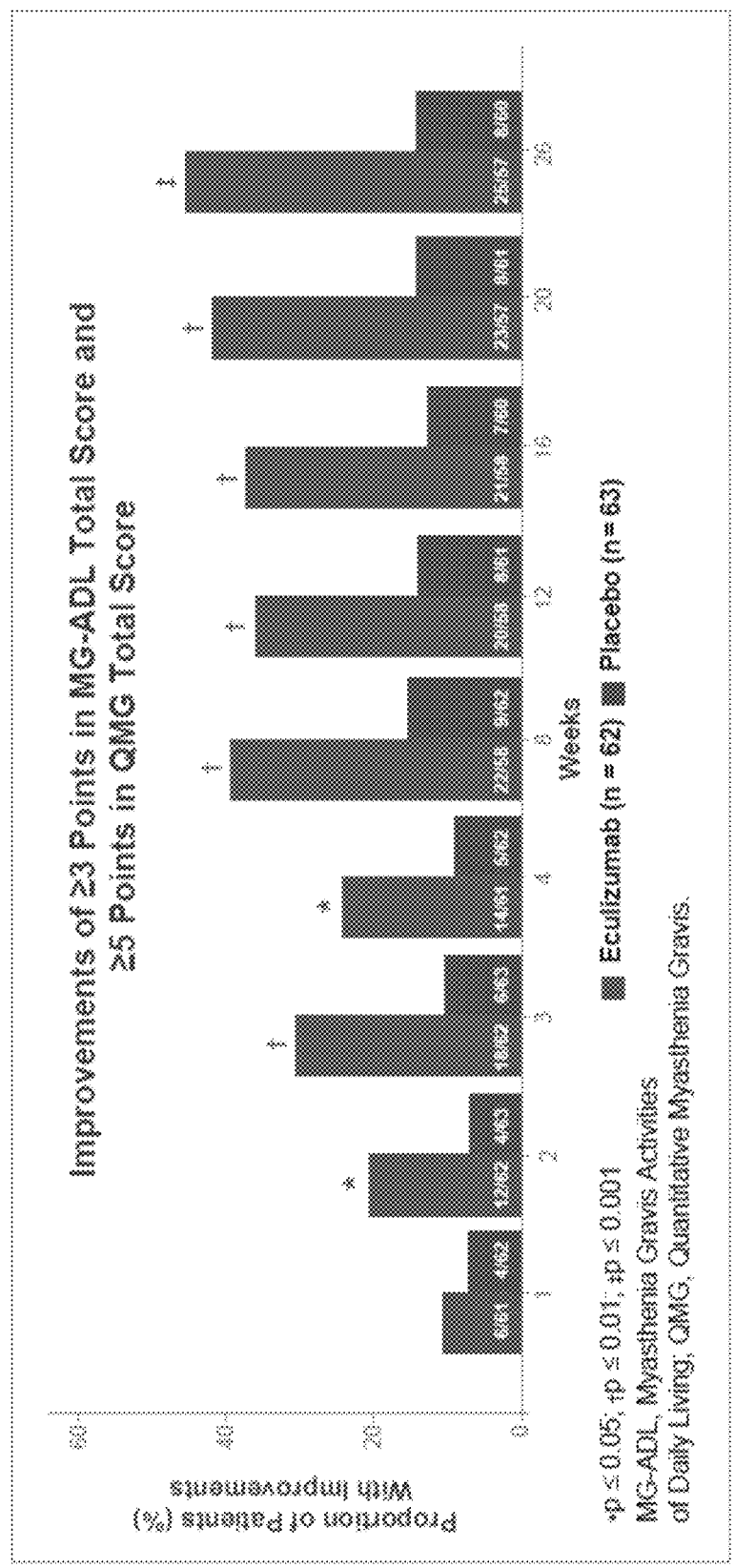
FIG. 17 is a graphical depiction of the proportion of patients with at least 3-point improvement in MG-ADL total score and ≥5-point improvement in QMG total score and no rescue therapy assessed over time from baseline to week 26.

More patients receiving eculizumab than those who received placebo experienced clinically meaningful responses as defined above, and also clinically meaningful relevant responses based on the more stringent thresholds for both MG-ADL and QMG total scores (FIG. 13). MG-ADL responder analyses conducted at each assessment date over the 26-week study are shown in FIG. 14 (the proportion of patients with a ≥3, 5, or 8 point change in the MG-ADL). QMG responder analyses conducted at each assessment date over the 26-week study are shown in FIG. 15 (the proportion of patients with a greater than 5, 7, or 10 point change in the QMG). There was a substantial overlap of patients who achieved a clinically meaningful response in both the MG-ADL total score and QMG total score (FIG. 16). For each of the categorical thresholds of response, a >3-fold increase was seen in the proportion of improved patients in the eculizumab group compared with those in the placebo group (FIG. 16). More patients receiving eculizumab versus placebo achieved clinically meaningful responses at week 26 in both the MG-ADL and QMG scores (week 26: eculizumab 40% vs placebo 13%; nominal P<0.001) (FIG. 16). The benefit of eculizumab treatment was apparent within the first 2 weeks (week 2: eculizumab 19% vs placebo 6% were dual responders; nominal P=0.0297) and was sustained through week 26 (all P≤0.05) (FIG. 17).

Three times as many patients with refractory gMG who were treated with eculizumab experienced clinically meaningful improvements in both muscle strength and ADLs compared with the placebo group by week 26. An increased proportion of individual assessment responders (on both the MG-ADL and the QMG) as well as dual responders occurred in the eculizumab-treated patient group compared with the placebo group which was observed early and generally maintained over the course of the study.

Figure 18:
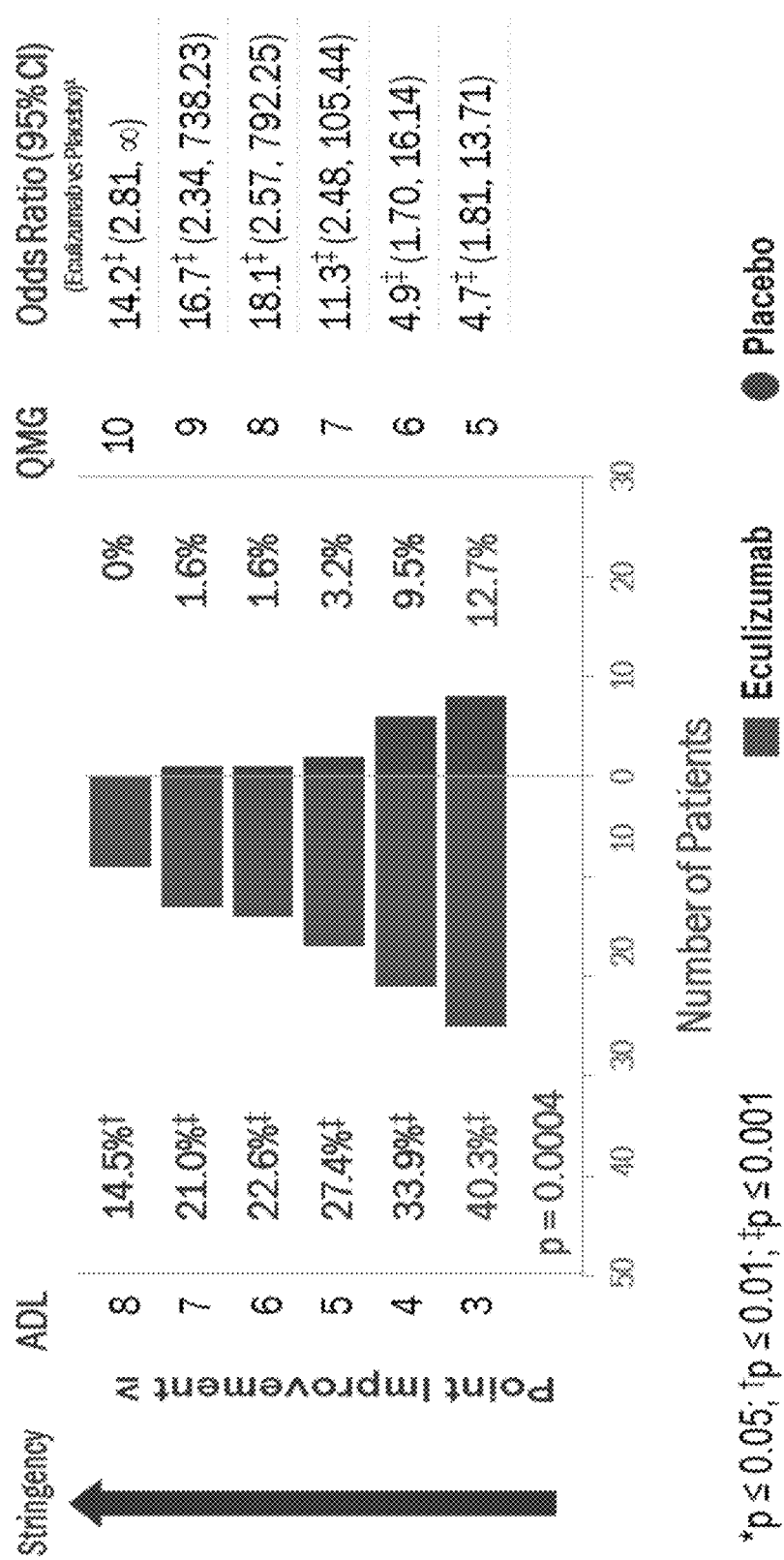
FIG. 18 is a graphical depiction of the percentage of patients who simultaneously met increasingly stringent criteria based on MG-ADL and QMG. The bottom row describes a threshold for both scales above the MCID (minimal clinically meaningful difference: 3 for MG-ADL and 5 for QMG). Higher bars represent increasing thresholds. The right-most panel displays odds ratios for meeting each threshold for eculizumab vs. placebo treated patients.
Figure 19:
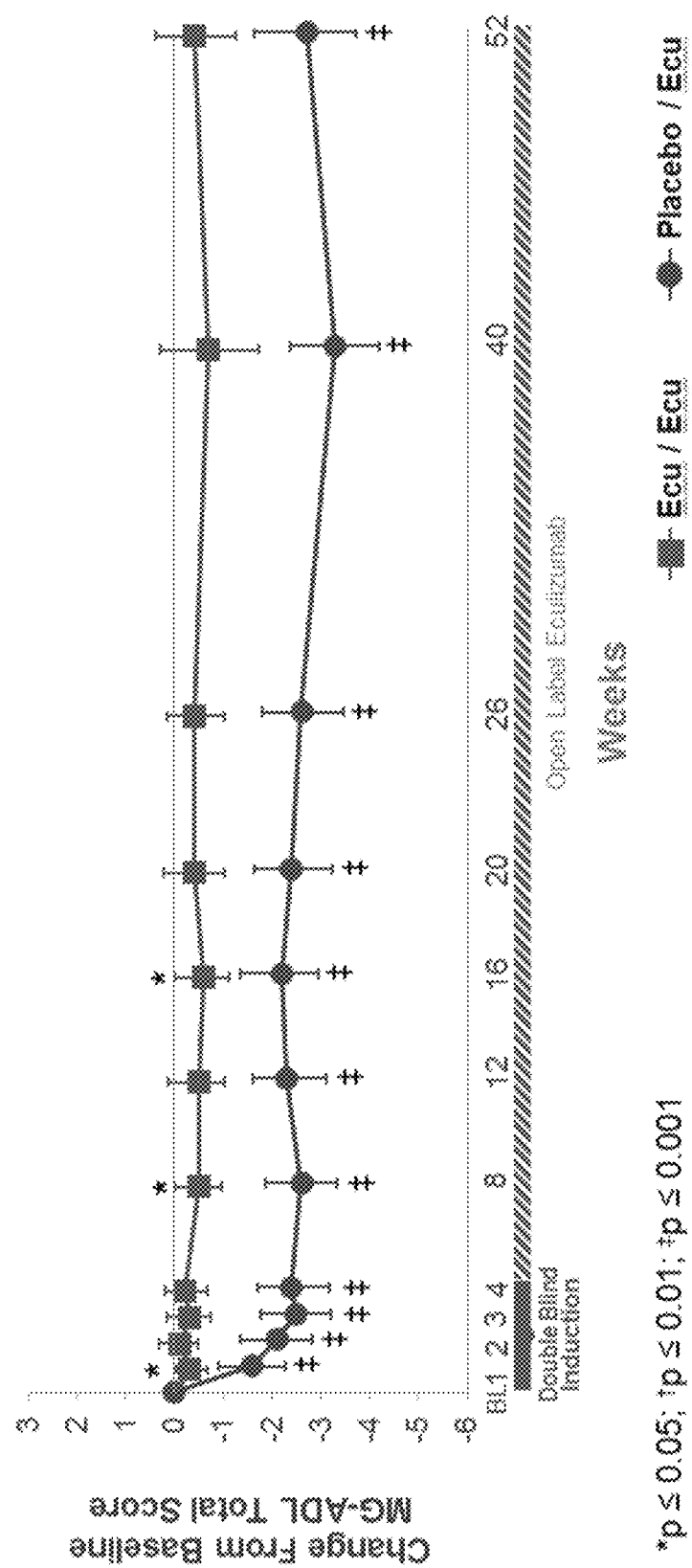
FIG. 19 is a graphical depiction of the change from baseline in MG-ADL total score (LS Mean and 95% CI) by treatment arm over time from ECU-MG-302 baseline to week 52 in study ECU-MG-302 using a repeated-measures model.
Figure 20:
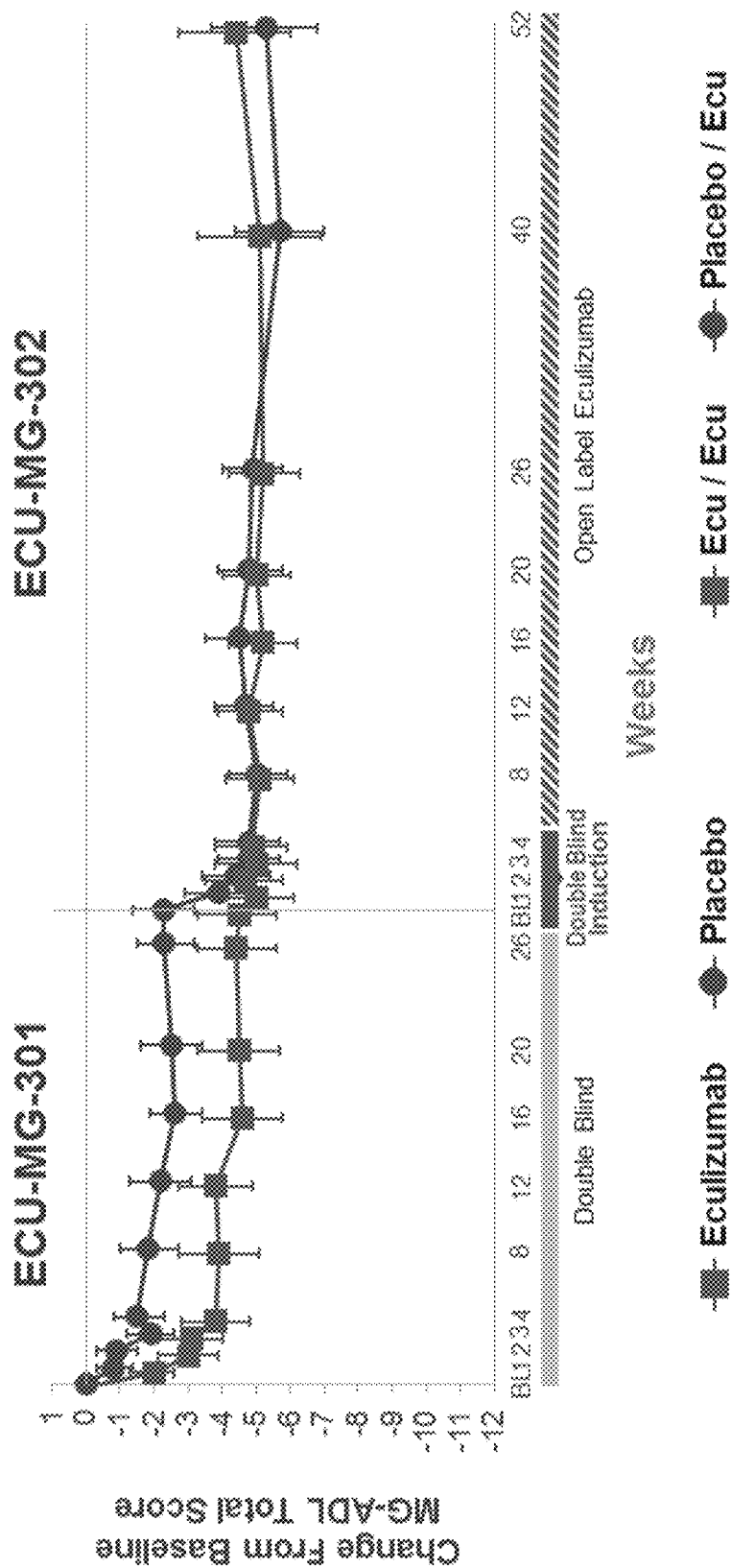
FIG. 20 is a graphical depiction of the change from baseline in MG-ADL total score (Mean and 95% CI) by treatment arm over time from ECU-MG-301 baseline to week 52 in study ECU-MG-302.

As shown in FIG. 18, the response rate was substantially higher in eculizumab-treated patients (40.3%) than in placebo-treated patients (12.7%), showing a clinically significant response by both patient- and physician-assessed outcome measures in patients treated with eculizumab. With increasingly stringent response criteria, the superiority of response to eculizumab over placebo becomes more pronounced, with odds ratios exceeding 10.

Example 6: Efficacy of Eculizumab is Maintained Beyond 26 Weeks in Patients with AChR+ Refractory Generalized Myasthenia Gravis (gMG)

Patients who completed REGAIN were allowed to continue into an open-label extension study known as ECU-MG-302. Each patient enrolled in the extension trial underwent an initial 4-week blinded induction before receiving open-label eculizumab maintenance treatment (1200 mg every 2 weeks). MG-ADL, QMG, MGC, and MG-QOL15 scores and safety were assessed.

In contrast with Study ECU-MG-301, in which patients were required to maintain stable MG therapy throughout the 26-week study period, adjustment of background immunosuppressant therapy (IST), including corticosteroids and acetylcholinesterase inhibitors (AChI), was permitted in Study ECU-MG-302. Investigators could change dosing of an existing IST/AChI, discontinue an existing IST/AChI, or add a new IST/AChI.

The MG-ADL total score in eculizumab/eculizumab patients (n=56) was unchanged from open-label baseline through week 52. In the placebo/eculizumab patients (n=60), rapid improvement in MG-ADL total score from open-label baseline was demonstrated with a change from ECU-MG-302 baseline in MG-ADL total score observed as early as week 1 (−1.6 [−2.28, −0.89]; p<0.0001). The majority of the overall treatment effect was achieved by week 4 (−2.4 [−3.19, −1.71]; p<0.0001) during the blind induction phase, and was sustained through week 52 (−2.7 [−3.73, −1.63]; p<0.0001). Changes in QMG, MGC, and MG-QOL15 total scores followed a pattern similar to that of the MG-ADL (QMG: −4.6; P<0.0001; MGC: −5.1; P<0.0001; and MG-QOL15: −5.7; P=0.005 at week 52). Similar patterns of response were seen on the respiratory, bulbar, limb, and ocular MG-ADL domains. The safety profile of eculizumab remained unchanged throughout the open-label extension study and was consistent with the known profile.

Overall, 65 (55.6%) patients reported a change in their IST usage during the study. Greater proportions of patients had dose reductions or stopped ≥1 IST than those who had dose increases or started ≥1 IST (Table 26). 55 (47.0%) patients decreased their daily dose of 1 IST and 2 (1.7%) patients decreased the daily dose of >1 IST; 29 (24.8%) patients increased their daily dose of 1 IST, and none increased their dose of >1 IST. 19 (16.2%) patients stopped an existing IST; 5 (4.3%) patients started a new IST. The most common reason for change in IST therapy was improvement in MG symptoms, with 42 (35.9%) patients reporting improvement in MG symptoms as the reason for changing IST therapy. In comparison, 21 (17.9%) patients reported worsening of MG symptoms as the primary reason for changing IST therapy. Side-effects/intolerance to an IST was reported as the reason for change in IST therapy in 13 (11.1%) patients.

TABLE 26

SUMMARY OF CHANGES IN IMMUNOSUPPRESSANT THERAPY STATUS-EXTENSION SAFETY SET

| Parameter | Placebo/Eculizumab (N = 61) | | Eculizumab/Eculizumab (N = 56) | | All Patients (N = 117) | |
|---|---|---|---|---|---|---|
| | Change IST Events, n | Patients, n (%) | Change IST Events, n | Patients, n (%) | Change IST Events, n | Patients, n (%) |
| IST Change Events and Patients with IST Changes | 148 | 36 (59.0) | 157 | 29 (51.8) | 305 | 65 (55.6) |
| Changes Made in IST Status | | | | | | |
| Start of New IST | 2 | 2 (3.3) | 5 | 3 (5.4) | 7 | 5 (4.3) |
| Stop of an Existing IST | 9 | 7 (11.5) | 13 | 12 (21.4) | 22 | 19 (16.2) |
| Increase the Daily dose of one IST | 33 | 16 (26.2) | 37 | 13 (23.2) | 70 | 29 (24.8) |
| Decrease the Daily dose of one IST | 102 | 30 (49.2) | 102 | 25 (44.6) | 204 | 55 (47.0) |
| Increased the Daily dose of more than one IST | 0 | 0 (0.0) | 0 | 0 (0.0) | 0 | 0 (0.0) |
| Decreased the Daily dose of more than one IST | 2 | 2 (3.3) | 0 | 0 (0.0) | 2 | 2 (1.7) |
| Primary reason for change in IST Status | | | | | | |
| MG symptoms improved | 88 | 26 (42.6) | 70 | 16 (28.6) | 158 | 42 (35.9) |
| MG symptoms worsened | 22 | 11 (18.0) | 19 | 10 (17.9) | 41 | 21 (17.9) |

TABLE 26-continued

SUMMARY OF CHANGES IN IMMUNOSUPPRESSANT THERAPY STATUS-
EXTENSION SAFETY SET

| Parameter | Placebo/Eculizumab (N = 61) | | Eculizumab/Eculizumab (N = 56) | | All Patients (N = 117) | |
|---|---|---|---|---|---|---|
| | Change IST Events, n | Patients, n (%) | Change IST Events, n | Patients, n (%) | Change IST Events, n | Patients, n (%) |
| Side effects-intolerant to existing IST | 12 | 6 (9.8) | 15 | 7 (12.5) | 27 | 13 (11.1) |
| New indication other than MG for IST usage | 0 | 0 (0.0) | 1 | 1 (1.8) | 1 | 1 (0.9) |
| Other | 26 | 11 (18.0) | 51 | 12 (21.4) | 77 | 23 (19.7) |

Abbreviations: IST = immunosuppressant therapy; MG = myasthenia gravis

Overall, the extension study demonstrated that patients who received eculizumab in Study ECU-MG-301 sustained their improvements through 52 weeks of additional eculizumab treatment in Study ECU-MG-302. For patients who received placebo in Study ECU-MG-301, an improvement occurred rapidly after starting eculizumab treatment and was maintained through 52 weeks of Study ECU-MG-302, similar to the effect observed in eculizumab-treated patients in Study ECU-MG-301.

TABLE 27

SEQUENCE SUMMARY

SEQ ID NO: 1
GYIFSNYWIQ

SEQ ID NO: 2
EILPGSGSTEYTENFKD

SEQ ID NO: 3
YFFGSSPNWYFDV

SEQ ID NO: 4
GASENIYGALN

SEQ ID NO: 5
GATNLAD

SEQ ID NO: 6
QNVLNTPLT

SEQ ID NO: 7
QVQLVQSGAEVKKPGASVKVSCKASGYIFSNYWIQWVRQAPGQGLEWMGEILPGSGSTEYTEN
FKDRVTMTRDTSTSTVYMELSSLRSEDTAVYYCARYFFGSSPNWYFDVWGQGTLVTVSS

SEQ ID NO: 8
DIQMTQSPSSLSASVGDRVTITCGASENIYGALNWYQQKPGKAPKLLIYGATNLADGVPSRFS
GSGSGTDFTLTISSLQPEDFATYYCQNVLNTPLTFGQGTKVEIK

SEQ ID NO: 9
ASTKGPSVFPLAPCSRSTSESTAALGCLVKDYFPEPVTVSWNSGALTSGVHTFPAVLQSSGLY
SLSSVVTVPSSNFGTQTYTCNVDHKPSNTKVDKTVERKCCVECPPCPAPPVAGPSVFLFPPKP
KDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFY
PSDIAVEWESNGQPENNYKTTPPVLDSDGSFFLYSRLTVDKSRWQEGNVFSCSVMHEALHNHY
TQKSLSLSLGK

SEQ ID NO: 10
QVQLVQSGAEVKKPGASVKVSCKASGYIFSNYWIQWVRQAPGQGLEWMGEILPGSGSTEYTEN
FKDRVTMTRDTSTSTVYMELSSLRSEDTAVYYCARYFFGSSPNWYFDVWGQGTLVTVSSASTK
GPSVFPLAPCSRSTSESTAALGCLVKDYFPEPVTVSWNSGALTSGVHTFPAVLQSSGLYSLSS
VVTVPSSNFGTQTYTCNVDHKPSNTKVDKTVERKCCVECPPCPAPPVAGPSVFLFPPKPKDTL
MISRTPEVTCVVVDVSQEDPEVQENWYVDGVEVHNAKTKPREEQFNSTYRVVSVLTVLHQDWL
NGKEYKCKVSNKGLPSSIEKTISKAKGQPREPQVYTLPPSQEEMTKNQVSLTCLVKGFYPSDI
AVEWESNGQPENNYKTTPPVLDSDGSFFLYSRLTVDKSRWQEGNVFSCSVMHEALHNHYTQKS
LSLSLGK

SEQ ID NO: 11
DIQMTQSPSSLSASVGDRVTITCGASENIYGALNWYQQKPGKAPKLLIYGATNLADGVPSRFS
GSGSGTDFTLTISSLQPEDFATYYCQNVLNTPLTFGQGTKVEIKRTVAAPSVFIFPPSDEQLK
SGTASVVCLLNNFYPREAKVQWKVDNALQSGNSQESVTEQDSKDSTYSLSSTLTLSKADYEKH
KVYACEVTHQGLSSPVTKSFNRGEC

TABLE 27-continued

SEQUENCE SUMMARY

SEQ ID NO: 12
QVQLVQSGAEVKKPGASVKVSCKASGHIFSNYWIQWVRQAPGQGLEWMGEILPGSGHTEYTEN
FKDRVTMTRDTSTSTVYMELSSLRSEDTAVYYCARYFFGSSPNWYFDVWGQGTLVTVSS

SEQ ID NO: 13
ASTKGPSVFPLAPCSRSTSESTAALGCLVKDYFPEPVTVSWNSGALTSGVHTFPAVLQSSGLY
SLSSVVTVPSSNFGTQTYTCNVDHKPSNTKVDKTVERKCCVECPPCPAPPVAGPSVFLFPPKP
KDTLMISRTPEVTCVVVDVSQEDPEVQFNWYVDGVEVHNAKTKPREEQFNSTYRVVSVLTVLH
QDWLNGKEYKCKVSNKGLPSSIEKTISKAKGQPREPQVYTLPPSQEEMTKNQVSLTCLVKGFY
PSDIAVEWESNGQPENNYKTTPPVLDSDGSFFLYSRLTVDKSRWQEGNVFSCSVLHEALHSHY
TQKSLSLSLGK

SEQ ID NO: 14
QVQLVQSGAEVKKPGASVKVSCKASGHIFSNYWIQWVRQAPGQGLEWMGEILPGSGHTEYTEN
FKDRVTMTRDTSTSTVYMELSSLRSEDTAVYYCARYFFGSSPNWYFDVWGQGTLVTVSSASTK
GPSVFPLAPCSRSTSESTAALGCLVKDYFPEPVTVSWNSGALTSGVHTFPAVLQSSGLYSLSS
VVTVPSSNFGTQTYTCNVDHKPSNTKVDKTVERKCCVECPPCPAPPVAGPSVFLFPPKPKDTL
MISRTPEVTCVVVDVSQEDPEVQFNWYVDGVEVHNAKTKPREEQFNSTYRVVSVLTVLHQDWL
NGKEYKCKVSNKGLPSSIEKTISKAKGQPREPQVYTLPPSQEEMTKNQVSLTCLVKGFYPSDI
AVEWESNGQPENNYKTTPPVLDSDGSFFLYSRLTVDKSRWQEGNVFSCSVLHEALHSHYTQKS
LSLSLGK

SEQ ID NO: 15
ASTKGPSVFPLAPCSRSTSESTAALGCLVKDYFPEPVTVSWNSGALTSGVHTFPAVLQSSGLY
SLSSVVTVTSSNFGTQTYTCNVDHKPSNTKVDKTVERKCCVECPPCPAPPVAGPSVFLFPPKP
KDTLYITREPEVTCVVVDVSHEDPEVQFNWYVDGMEVHNAKTKPREEQFNSTFRVVSVLTVVH
QDWLNGKEYKCKVSNKGLPAPIEKTISKTKGQPREPQVYTLPPSREEMTKNQVSLTCLVKGFY
PSDIAVEWESNGQPENNYKTTPPMLDSDGSFFLYSKLTVDKSRWQQGNVFSCSVMHEALHNHY
TQKSLSLSPGK

SEQ ID NO: 16
QVQLVQSGAEVKKPGASVKVSCKASGYIFSNYWIQWVRQAPGQGLEWMGEILPGSGSTEYTEN
FKDRVTMTRDTSTSTVYMELSSLRSEDTAVYYCARYFFGSSPNWYFDVWGQGTLVTVSSASTK
GPSVFPLAPCSRSTSESTAALGCLVKDYFPEPVTVSWNSGALTSGVHTFPAVLQSSGLYSLSS
VVTVTSSNFGTQTYTCNVDHKPSNTKVDKTVERKCCVECPPCPAPPVAGPSVFLFPPKPKDTL
YITREPEVTCVVVDVSHEDPEVQFNWYVDGMEVHNAKTKPREEQFNSTFRVVSVLTVVHQDWL
NGKEYKCKVSNKGLPAPIEKTISKTKGQPREPQVYTLPPSREEMTKNQVSLTCLVKGFYPSDI
AVEWESNGQPENNYKTTPPMLDSDGSFFLYSKLTVDKSRWQQGNVFSCSVMHEALHNHYTQKS
LSLSPGK

SEQ ID NO: 17
GASENIYHALN

SEQ ID NO: 18
EILPGSGHTEYTENFKD

SEQ ID NO: 19
GHIFSNYWIQ

SEQ ID NO: 20
QVQLVQSGAEVKKPGASVKVSCKASGHIFSNYWIQWVRQAPGQGLEWMGEILPGSGHTEYTEN
FKDRVTMTRDTSTSTVYMELSSLRSEDTAVYYCARYFFGSSPNWYFDVWGQGTLVTVSSASTK
GPSVFPLAPCSRSTSESTAALGCLVKDYFPEPVTVSWNSGALTSGVHTFPAVLQSSGLYSLSS
VVTVPSSNFGTQTYTCNVDHKPSNTKVDKTVERKCCVECPPCPAPPVAGPSVFLFPPKPKDTL
MISRTPEVTCVVVDVSQEDPEVQFNWYVDGVEVHNAKTKPREEQFNSTYRVVSVLTVLHQDWL
NGKEYKCKVSNKGLPSSIEKTISKAKGQPREPQVYTLPPSQEEMTKNQVSLTCLVKGFYPSDI
AVEWESNGQPENNYKTTPPVLDSDGSFFLYSRLTVDKSRWQEGNVFSCSVMHEALHNHYTQKS
LSLSLGK

SEQ ID NO: 21
SYAIS

SEQ ID NO: 22
GIGPFFGTANYAQKFQG

SEQ ID NO: 23
DTPYFDY

SEQ ID NO: 24
SGDSIPNYYVY

SEQ ID NO: 25
DDSNRPS

SEQ ID NO: 26
QSFDSSLNAEV

TABLE 27-continued

SEQUENCE SUMMARY

SEQ ID NO: 27
QVQLVQSGAEVKKPGSSVKVSCKASGGTFSSYAISVWRQAPGQGLEWMGGIGPFFGTANYAQK
FQGRVTITADESTSTAYMELSSLRSEDTAVYYCARDTPYFDYWGQGTLVTVSS

SEQ ID NO: 28
DIELTQPPSVSVAPGQTARISCSGDSIPNYYVYWYQQKPGQAPVLVIYDDSNRPSGIPERFSG
SNSGNTATLTISGTQAEDEADYYCQSFDSSLNAEVFGGGTKLTVL

SEQ ID NO: 29
NYIS

SEQ ID NO: 30
IIDPDDSYTEYSPSFQG

SEQ ID NO: 31
YEYGGFDI

SEQ ID NO: 32
SGDNIGNSYVH

SEQ ID NO: 33
KDNDRPS

SEQ ID NO: 34
GTYDIESYV

SEQ ID NO: 35
EVQLVQSGAEVKKPGESLKISCKGSGYSFTNYISWVRQMPGKGLEWMGIIDPDDSYTEYSPSF
QGQVTISADKSISTAYLQWSSLKASDTAMYYCARYEYGGFDIWGQGTLVTVSS

SEQ ID NO: 36
SYELTQPPSVSVAPGQTARISCSGDNIGNSYVHWYQQKPGQAPVLVIYKDNDRPSGIPERFSG
SNSGNTATLTISGTQAEDEADYYCGTYDIESYVFGGGTKLTVL

SEQ ID NO: 37
QVQLVESGGGLVQPGRSLRLSCAASGFTVHSSYYMAWVRQAPGKGLEWVGAIFTGSGAEYKAE
WAKGRVTISKDTSKNQVVLTMTNMDPVDTATYYCASDAGYDYPTHAMHYWGQGTLVTVSS

SEQ ID NO: 38
DIQMTQSPSSLSASVGDRVTITCRASQGISSSLAWYQQKPGKAPKLLIYGASETESGVPSRFS
GSGSGTDFTLTISSLQPEDFATYYCQNTKVGSSYGNTFGGGTKVEIK

SEQ ID NO: 39
QVQLVESGGGLVQPGRSLRLSCAASGFTVHSSYYMAWVRQAPGKGLEWVGAIFTGSGAEY
KAEWAKGRVTISKDTSKNQVVLTMTNMDPVDTATYYCASDAGYDYPTHAMHYWGQGTLVT
VSSASTKGPSVFPLAPSSKSTSGGTAALGCLVKDYFPEPVTVSWNSGALTSGVHTFPAVL
QSSGLYSLSSVVTVPSSSLGTQTYICNVNHKPSNTKVDKKVEPKSCDKTHTCPPCPAPEL
RRGPKVFLFPPKPKDTLMISRTPEVTCVVVDVSHEDPEVKFNWYVDGVEVHNAKTKPREE
QYNSTYRVVSVLTVLHQDWLNGKEYKCKVSNKGLPSSIEKTISKAKGQPREPQVYTLPPS
REEMTKNQVSLTCLVKGFYPSDIAVEWESNGQPENNYKTTPPVLDSDGSFFLYSKLTVDK
SRWQQGNVFSCSVLHEALHAHYTRKELSLSP

REFERENCES CITED

The following references are hereby incorporated by reference in their entirety:

(1) Conti-Fine et al., "Myasthenia gravis: past, present, and future," *J. Clin. Invest.* 116 (11): 2843-54 (2006).
(2) Howard J. F., "Clinical Overview of MG," Myasthenia Gravis Foundation of America, Inc. 2006.
(3) Phillips, "The epidemiology of myasthenia gravis," *Semin. Neurol.* 24 (1): 17-20 (2004).
(4) Kim et al., "Treatment of myasthenia gravis based on its immunopathogenesis," *J. Clin. Neurol.* 7 (4): 173-83 (2011).
(5) Vincent et al., "Myasthenia gravis," *Adv. Neurol.* 88:159-88 (2002).
(6) Sahashi et al., "Ultrastructural localization of immune complexes (IgG and C3) at the end-plate in experimental autoimmune myasthenia gravis. *J. Neuropathol. Exp. Neurol.* 37 (2): 212-23 (1978).
(7) Dalakas, "Intravenous immunoglobulin in autoimmune neuromuscular diseases," *JAMA* 291 (19): 2367-75 (2004).
(8) Engel et al., "Immune complexes (IgG and C3) at the motor end-plate in myasthenia gravis: ultrastructural and light microscopic localization and electrophysiologic correlations," *Mayo Clin. Proc.* 52 (5): 267-80 (1977).
(9) Nastuk et al., "Changes in serum complement activity in patients with myasthenia gravis," *Proc. Soc. Exp. Biol. Med.* 105:177-84 (1960).
(10) Peng et al., "Role of C5 in the development of airway inflammation, airway hyperresponsiveness, and ongoing airway response," *J. Clin. Invest.* 115 (6): 1590-600 (2005).
(11) Vakeva et al., "Myocardial infarction and apoptosis after myocardial ischemia and reperfusion: role of the terminal complement components and inhibition by anti-C5 therapy," *Circulation* 97 (22): 2259-67 (1998).

(12) Wang et al., "Complement inhibition with an anti-C5 monoclonal antibody prevents hyperacute rejection in a xenograft heart transplantation model," *Transplantation* 68 (11): 1643-51 (1999).
(13) Howard et al., "A nandomized, double-blind, placebo-controlled phase II study of eculizumab in patients with refractory generalized myasthenia gravis," *Muscle Nerve* 48 (1): 76-84 (2013).
(14) Muppidi et al., "MG-ADL: still a relevant outcome measure," *Muscle Nerve* 44 (5): 727-31 (2011).
(15) Benatar et al., "Recommendations for myasthenia gravis clinical trials," *Muscle Nerve* 45 (6): 909-17 (2012).
(16) Burns et al., "The MG Composite: A valid and reliable outcome measure for myasthenia gravis," *Neurology* 74 (18): 1434-40 (2010).
(17) Burns et al., "The MG-QOL15 for following the health-related quality of life of patients with myasthenia gravis," *Muscle Nerve* 43 (1): 14-8 (2011).
(18) Cella D., Measuring Quality of Life in Neurological Disorders; Final Report of the Neuro-QOL Study September 2010. 2010.
(19) Szende A. and Williams A., "Measuring Self-Reported Population Health: An International Perspective based on EQ-5D, (2004) <http://www.euroqol.org/fileadmin/user_upload/Documenten/PDF/Books/Measuring_Self-Reported_Population_Health_—_An International Perspective_based_on_EQ-5D.pdf>.
(20) Posner et al., "The Columbia-Suicide Severity Rating Scale: initial validity and internal consistency findings from three multisite studies with adolescents and adults," *Am. J. Psychiatry* 168 (12): 1266-77 (2011).
(21) Nilsson et al., "Columbia-Suicide Severity Rating Scale Scoring and Data Analysis Guide, (2013)<http://cssrs.columbia.edu/wp-content/uploads/ScoringandDataAnalysisGuide-for-Clinical-Trials.pdf>.

What is claimed is:

1. A method of treating refractory generalized myasthenia gravis in a patient in need thereof comprising administering a therapeutically effective amount of an eculizumab variant comprising a heavy chain amino acid sequence according to SEQ ID NO: 14 and a light chain amino acid sequence according to SEQ ID NO: 11 to the patient;
   wherein the patient is positive for auto-antibodies binding to nicotinic acetylcholine receptor (anti-AChR); and
   wherein the patient is administered the eculizumab variant for at least 26 weeks.

2. The method of claim 1, wherein the eculizumab variant is administered at a dose between 600 mg and 6000 mg; and
   wherein the patient is administered the eculizumab variant for at least 26 weeks.

3. The method of claim 1, wherein the patient experiences a clinically meaningful improvement (reduction) in Myasthenia Gravis Activities of Daily Living (MG-ADL) score, in quantitative Myasthenia Gravis score (QMG), in Myasthenia Gravis Composite (MGC) score, in quality of life as measured by Myasthenia Gravis Quality of Life (MG-QOL-15) score, in neuro-fatigue as measured by Neuro-QOL Fatigue score, or in health status as measured by EQ-5D health status score, after 26 weeks of treatment.

4. The method of claim 3, wherein the clinically meaningful improvement the patient experiences is at least a 3 point reduction in the patient's MG-ADL score, at least a 4 point reduction in the patient's QMG score, at least a 6 point reduction in the patient's MGC score, at least a 6 point reduction in the patient's MGC score, at least a 6 point reduction in the patient's MG-QOL-15 score, or at least an 8 point reduction in the patient's Neuro-QOL score, after 26 weeks of treatment.

5. A method of treating refractory generalized myasthenia gravis in a patient in need thereof comprising administering an eculizumab variant comprising a heavy chain amino acid sequence according to SEQ ID NO: 14 and a light chain amino acid sequence according to SEQ ID NO: 11 to the patient;
   wherein the patient is positive for auto-antibodies binding to nicotinic acetylcholine receptor (anti-AChR);
   wherein the eculizumab variant is administered at a dose between 600 mg and 6000 mg;
   wherein the patient is administered the eculizumab variant for at least 26 weeks;
   and
   wherein the patient has a clinically meaningful improvement (reduction) in at least two measurements of generalized myasthenia gravis severity selected from the group consisting of MG-ADL, QMG, MGC, MG-QOL, and Neuro-QOL.

6. The method of claim 1, wherein the eculizumab variant is administered subcutaneously or by intravenous infusion.

7. The method of claim 1, wherein the patient has failed treatment over one year or more with two or more ISTs in sequence or in combination.

8. The method of claim 1, wherein the patient has failed at least one IST and requires chronic plasma exchange or IVIg to control symptoms.

9. The method of claim 1, wherein the patient experiences a reduction in the administration of one or more IST following at least 26 weeks of treatment.

10. The method of claim 1, wherein the patient experiences a reduction in IST dosing following at least 26 weeks of treatment.

11. The method of claim 1, wherein the patient experiences a reduction in one or more IST dosing and a discontinuation in one or more IST following at least 26 of treatment.

12. The method of claim 1, wherein the patient shows marked generalized weakness or bulbar signs and symptoms of myasthenia gravis while receiving therapy for myasthenia gravis including anticholinesterase inhibitor therapy and immunosuppressant therapy (IST) and requires chronic plasma exchange or chronic IVIg to maintain clinical stability.

13. The method of claim 5, wherein the patient shows marked generalized weakness or bulbar signs and symptoms of myasthenia gravis while receiving therapy for myasthenia gravis including anticholinesterase inhibitor therapy and immunosuppressant therapy (IST) and requires chronic plasma exchange or chronic IVIg to maintain clinical stability.

14. The method of claim 1, wherein the eculizumab variant is ALXN1210 (BNJ441).

15. The method of claim 4, wherein the eculizumab variant is ALXN1210 (BNJ441).

* * * * *

SEQUENCE LISTING

```
<160> NUMBER OF SEQ ID NOS: 39

<210> SEQ ID NO 1
<211> LENGTH: 10
<212> TYPE: PRT
<213> ORGANISM: Artificial Sequence
<220> FEATURE:
<223> OTHER INFORMATION: Heavy Chain Complementarity Determining
      Sequence 1

<400> SEQUENCE: 1

Gly Tyr Ile Phe Ser Asn Tyr Trp Ile Gln
1               5                   10

<210> SEQ ID NO 2
<211> LENGTH: 17
<212> TYPE: PRT
<213> ORGANISM: Artificial Sequence
<220> FEATURE:
<223> OTHER INFORMATION: Heavy Chain Complementarity Determining
      Sequence two

<400> SEQUENCE: 2

Glu Ile Leu Pro Gly Ser Gly Ser Thr Glu Tyr Thr Glu Asn Phe Lys
1               5                   10                  15

Asp

<210> SEQ ID NO 3
<211> LENGTH: 13
<212> TYPE: PRT
<213> ORGANISM: Artificial Sequence
<220> FEATURE:
<223> OTHER INFORMATION: Heavy Chain Complementarity Determining
      Sequence 3

<400> SEQUENCE: 3

Tyr Phe Phe Gly Ser Ser Pro Asn Trp Tyr Phe Asp Val
1               5                   10

<210> SEQ ID NO 4
<211> LENGTH: 11
<212> TYPE: PRT
<213> ORGANISM: Artificial Sequence
<220> FEATURE:
<223> OTHER INFORMATION: Light Chain Complementarity Determining
      Sequence 1

<400> SEQUENCE: 4
```

```
Gly Ala Ser Glu Asn Ile Tyr Gly Ala Leu Asn
1               5                   10
```

<210> SEQ ID NO 5
<211> LENGTH: 7
<212> TYPE: PRT
<213> ORGANISM: Artificial Sequence
<220> FEATURE:
<223> OTHER INFORMATION: Light Chain Complementarity Determining
      Sequence 2

<400> SEQUENCE: 5

```
Gly Ala Thr Asn Leu Ala Asp
1               5
```

<210> SEQ ID NO 6
<211> LENGTH: 9
<212> TYPE: PRT
<213> ORGANISM: Artificial Sequence
<220> FEATURE:
<223> OTHER INFORMATION: Light Chain Complementarity Determining
      Sequence 3

<400> SEQUENCE: 6

```
Gln Asn Val Leu Asn Thr Pro Leu Thr
1               5
```

<210> SEQ ID NO 7
<211> LENGTH: 122
<212> TYPE: PRT
<213> ORGANISM: Artificial Sequence
<220> FEATURE:
<223> OTHER INFORMATION: Humanized heavy chain variable region sequence

<400> SEQUENCE: 7

```
Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ile Phe Ser Asn Tyr
            20                  25                  30

Trp Ile Gln Trp Val Arg Gln Ala Pro Gly Gln Gly Leu Glu Trp Met
        35                  40                  45

Gly Glu Ile Leu Pro Gly Ser Gly Ser Thr Glu Tyr Thr Glu Asn Phe
    50                  55                  60

Lys Asp Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Tyr Phe Phe Gly Ser Ser Pro Asn Trp Tyr Phe Asp Val Trp
            100                 105                 110

Gly Gln Gly Thr Leu Val Thr Val Ser Ser
        115                 120
```

<210> SEQ ID NO 8
<211> LENGTH: 107
<212> TYPE: PRT
<213> ORGANISM: Artificial Sequence
<220> FEATURE:
<223> OTHER INFORMATION: Light Chain variable region sequence

<400> SEQUENCE: 8

```
Asp Ile Gln Met Thr Gln Ser Pro Ser Ser Leu Ser Ala Ser Val Gly
1               5                   10                  15
```

```
Asp Arg Val Thr Ile Thr Cys Gly Ala Ser Glu Asn Ile Tyr Gly Ala
            20                  25                  30

Leu Asn Trp Tyr Gln Gln Lys Pro Gly Lys Ala Pro Lys Leu Leu Ile
         35                  40                  45

Tyr Gly Ala Thr Asn Leu Ala Asp Gly Val Pro Ser Arg Phe Ser Gly
     50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Asn Val Leu Asn Thr Pro Leu
                 85                  90                  95

Thr Phe Gly Gln Gly Thr Lys Val Glu Ile Lys
            100                 105
```

<210> SEQ ID NO 9
<211> LENGTH: 326
<212> TYPE: PRT
<213> ORGANISM: Artificial Sequence
<220> FEATURE:
<223> OTHER INFORMATION: Engineered Heavy Chain Constant Region IgG2/4

<400> SEQUENCE: 9

```
Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
         35                  40                  45

Gly Val His Thr Phe Pro Ala Val Leu Gln Ser Ser Gly Leu Tyr Ser
     50                  55                  60

Leu Ser Ser Val Val Thr Val Pro Ser Ser Asn Phe Gly Thr Gln Thr
65                  70                  75                  80

Tyr Thr Cys Asn Val Asp His Lys Pro Ser Asn Thr Lys Val Asp Lys
                 85                  90                  95

Thr Val Glu Arg Lys Cys Cys Val Glu Cys Pro Pro Cys Pro Ala Pro
            100                 105                 110

Pro Val Ala Gly Pro Ser Val Phe Leu Phe Pro Pro Lys Pro Lys Asp
         115                 120                 125

Thr Leu Met Ile Ser Arg Thr Pro Glu Val Thr Cys Val Val Val Asp
     130                 135                 140

Val Ser Gln Glu Asp Pro Glu Val Gln Phe Asn Trp Tyr Val Asp Gly
145                 150                 155                 160

Val Glu Val His Asn Ala Lys Thr Lys Pro Arg Glu Glu Gln Phe Asn
                 165                 170                 175

Ser Thr Tyr Arg Val Val Ser Val Leu Thr Val Leu His Gln Asp Trp
            180                 185                 190

Leu Asn Gly Lys Glu Tyr Lys Cys Lys Val Ser Asn Lys Gly Leu Pro
         195                 200                 205

Ser Ser Ile Glu Lys Thr Ile Ser Lys Ala Lys Gly Gln Pro Arg Glu
     210                 215                 220

Pro Gln Val Tyr Thr Leu Pro Pro Ser Gln Glu Glu Met Thr Lys Asn
225                 230                 235                 240

Gln Val Ser Leu Thr Cys Leu Val Lys Gly Phe Tyr Pro Ser Asp Ile
                 245                 250                 255

Ala Val Glu Trp Glu Ser Asn Gly Gln Pro Glu Asn Asn Tyr Lys Thr
            260                 265                 270
```

```
Thr Pro Pro Val Leu Asp Ser Asp Gly Ser Phe Phe Leu Tyr Ser Arg
            275                 280                 285
Leu Thr Val Asp Lys Ser Arg Trp Gln Glu Gly Asn Val Phe Ser Cys
    290                 295                 300
Ser Val Met His Glu Ala Leu His Asn His Tyr Thr Gln Lys Ser Leu
305                 310                 315                 320
Ser Leu Ser Leu Gly Lys
                325

<210> SEQ ID NO 10
<211> LENGTH: 448
<212> TYPE: PRT
<213> ORGANISM: Artificial Sequence
<220> FEATURE:
<223> OTHER INFORMATION: Humanized entire antibody heavy chain sequence

<400> SEQUENCE: 10

Gln Val Gln Leu Val Gln Ser Gly Ala Glu Val Lys Lys Pro Gly Ala
1               5                   10                  15
Ser Val Lys Val Ser Cys Lys Ala Ser Gly Tyr Ile Phe Ser Asn Tyr
            20                  25                  30
Trp Ile Gln Trp Val Arg Gln Ala Pro Gly Gln Gly Leu Glu Trp Met
        35                  40                  45
Gly Glu Ile Leu Pro Gly Ser Gly Ser Thr Glu Tyr Thr Glu Asn Phe
    50                  55                  60
Lys Asp Arg Val Thr Met Thr Arg Asp Thr Ser Thr Ser Thr Val Tyr
65                  70                  75                  80
Met Glu Leu Ser Ser Leu Arg Ser Glu Asp Thr Ala Val Tyr Tyr Cys
                85                  90                  95
Ala Arg Tyr Phe Phe Gly Ser Ser Pro Asn Trp Tyr Phe Asp Val Trp
            100                 105                 110
Gly Gln Gly Thr Leu Val Thr Val Ser Ser Ala Ser Thr Lys Gly Pro
        115                 120                 125
Ser Val Phe Pro Leu Ala Pro Cys Ser Arg Ser Thr Ser Glu Ser Thr
    130                 135                 140
Ala Ala Leu Gly Cys Leu Val Lys Asp Tyr Phe Pro Glu Pro Val Thr
145                 150                 155                 160
Val Ser Trp Asn Ser Gly Ala Leu Thr Ser Gly Val His Thr Phe Pro
                165                 170                 175
Ala Val Leu Gln Ser Ser Gly Leu Tyr Ser Leu Ser Ser Val Val Thr
            180                 185                 190
Val Pro Ser Ser Asn Phe Gly Thr Gln Thr Tyr Thr Cys Asn Val Asp
        195                 200                 205
His Lys Pro Ser Asn Thr Lys Val Asp Lys Thr Val Glu Arg Lys Cys
    210                 215                 220
Cys Val Glu Cys Pro Pro Cys Pro Ala Pro Pro Val Ala Gly Pro Ser
225                 230                 235                 240
Val Phe Leu Phe Pro Pro Lys Pro Lys Asp Thr Leu Met Ile Ser Arg
                245                 250                 255
Thr Pro Glu Val Thr Cys Val Val Val Asp Val Ser Gln Glu Asp Pro
            260                 265                 270
Glu Val Gln Phe Asn Trp Tyr Val Asp Gly Val Glu Val His Asn Ala
        275                 280                 285
Lys Thr Lys Pro Arg Glu Glu Gln Phe Asn Ser Thr Tyr Arg Val Val
    290                 295                 300
```

```
Ser Val Leu Thr Val Leu His Gln Asp Trp Leu Asn Gly Lys Glu Tyr
305                 310                 315                 320

Lys Cys Lys Val Ser Asn Lys Gly Leu Pro Ser Ser Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Gln Glu Glu Met Thr Lys Asn Gln Val Ser Leu Thr Cys
        355                 360                 365

Leu Val Lys Gly Phe Tyr Pro Ser Asp Ile Ala Val Glu Trp Glu Ser
    370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Arg Leu Thr Val Asp Lys Ser
                405                 410                 415

Arg Trp Gln Glu Gly Asn Val Phe Ser Cys Ser Val Met His Glu Ala
            420                 425                 430

Leu His Asn His Tyr Thr Gln Lys Ser Leu Ser Leu Ser Leu Gly Lys
        435                 440                 445

<210> SEQ ID NO 11
<211> LENGTH: 214
<212> TYPE: PRT
<213> ORGANISM: Artificial Sequence
<220> FEATURE:
<223> OTHER INFORMATION: Humanized entire light chain sequence

<400> SEQUENCE: 11

Asp Ile Gln Met Thr Gln Ser Pro Ser Ser Leu Ser Ala Ser Val Gly
1               5                   10                  15

Asp Arg Val Thr Ile Thr Cys Gly Ala Ser Glu Asn Ile Tyr Gly Ala
            20                  25                  30

Leu Asn Trp Tyr Gln Gln Lys Pro Gly Lys Ala Pro Lys Leu Leu Ile
        35                  40                  45

Tyr Gly Ala Thr Asn Leu Ala Asp Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Asn Val Leu Asn Thr Pro Leu
                85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210
```

```
<210> SEQ ID NO 12
<211> LENGTH: 122
<212> TYPE: PRT
<213> ORGANISM: Artificial Sequence
<220> FEATURE:
<223> OTHER INFORMATION: Humanized and modified heavy chain variable
      region sequence

<400> SEQUENCE: 12

Gln Val Gln Leu Val Gln Ser Gly Ala Glu Val Lys Lys Pro Gly Ala
1               5                   10                  15

Ser Val Lys Val Ser Cys Lys Ala Ser Gly His Ile Phe Ser Asn Tyr
            20                  25                  30

Trp Ile Gln Trp Val Arg Gln Ala Pro Gly Gln Gly Leu Glu Trp Met
        35                  40                  45

Gly Glu Ile Leu Pro Gly Ser Gly His Thr Glu Tyr Thr Glu Asn Phe
    50                  55                  60

Lys Asp Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Tyr Phe Phe Gly Ser Ser Pro Asn Trp Tyr Phe Asp Val Trp
            100                 105                 110

Gly Gln Gly Thr Leu Val Thr Val Ser Ser
        115                 120

<210> SEQ ID NO 13
<211> LENGTH: 326
<212> TYPE: PRT
<213> ORGANISM: Artificial Sequence
<220> FEATURE:
<223> OTHER INFORMATION: Humanized and modified heavy chain constant
      region sequence

<400> SEQUENCE: 13

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Asn Phe Gly Thr Gln Thr
65                  70                  75                  80

Tyr Thr Cys Asn Val Asp His Lys Pro Ser Asn Thr Lys Val Asp Lys
                85                  90                  95

Thr Val Glu Arg Lys Cys Cys Val Glu Cys Pro Pro Cys Pro Ala Pro
            100                 105                 110

Pro Val Ala Gly Pro Ser Val Phe Leu Phe Pro Pro Lys Pro Lys Asp
        115                 120                 125

Thr Leu Met Ile Ser Arg Thr Pro Glu Val Thr Cys Val Val Val Asp
    130                 135                 140

Val Ser Gln Glu Asp Pro Glu Val Gln Phe Asn Trp Tyr Val Asp Gly
145                 150                 155                 160

Val Glu Val His Asn Ala Lys Thr Lys Pro Arg Glu Glu Gln Phe Asn
                165                 170                 175
```

```
Ser Thr Tyr Arg Val Val Ser Val Leu Thr Val Leu His Gln Asp Trp
                180                 185                 190

Leu Asn Gly Lys Glu Tyr Lys Cys Lys Val Ser Asn Lys Gly Leu Pro
            195                 200                 205

Ser Ser Ile Glu Lys Thr Ile Ser Lys Ala Lys Gly Gln Pro Arg Glu
        210                 215                 220

Pro Gln Val Tyr Thr Leu Pro Pro Ser Gln Glu Met Thr Lys Asn
225                 230                 235                 240

Gln Val Ser Leu Thr Cys Leu Val Lys Gly Phe Tyr Pro Ser Asp Ile
                245                 250                 255

Ala Val Glu Trp Glu Ser Asn Gly Gln Pro Glu Asn Asn Tyr Lys Thr
            260                 265                 270

Thr Pro Pro Val Leu Asp Ser Asp Gly Ser Phe Phe Leu Tyr Ser Arg
        275                 280                 285

Leu Thr Val Asp Lys Ser Arg Trp Gln Glu Gly Asn Val Phe Ser Cys
    290                 295                 300

Ser Val Leu His Glu Ala Leu His Ser His Tyr Thr Gln Lys Ser Leu
305                 310                 315                 320

Ser Leu Ser Leu Gly Lys
                325

<210> SEQ ID NO 14
<211> LENGTH: 448
<212> TYPE: PRT
<213> ORGANISM: Artificial Sequence
<220> FEATURE:
<223> OTHER INFORMATION: Entire humanized and modified antibody heavy
      chain sequence

<400> SEQUENCE: 14

Gln Val Gln Leu Val Gln Ser Gly Ala Glu Val Lys Lys Pro Gly Ala
1               5                   10                  15

Ser Val Lys Val Ser Cys Lys Ala Ser Gly His Ile Phe Ser Asn Tyr
            20                  25                  30

Trp Ile Gln Trp Val Arg Gln Ala Pro Gly Gln Gly Leu Glu Trp Met
        35                  40                  45

Gly Glu Ile Leu Pro Gly Ser Gly His Thr Glu Tyr Thr Glu Asn Phe
    50                  55                  60

Lys Asp Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Tyr Phe Phe Gly Ser Ser Pro Asn Trp Tyr Phe Asp Val Trp
            100                 105                 110

Gly Gln Gly Thr Leu Val Thr Val Ser Ser Ala Ser Thr Lys Gly Pro
        115                 120                 125

Ser Val Phe Pro Leu Ala Pro Cys Ser Arg Ser Thr Ser Glu Ser Thr
    130                 135                 140

Ala Ala Leu Gly Cys Leu Val Lys Asp Tyr Phe Pro Glu Pro Val Thr
145                 150                 155                 160

Val Ser Trp Asn Ser Gly Ala Leu Thr Ser Gly Val His Thr Phe Pro
                165                 170                 175

Ala Val Leu Gln Ser Ser Gly Leu Tyr Ser Leu Ser Ser Val Val Thr
            180                 185                 190

Val Pro Ser Ser Asn Phe Gly Thr Gln Thr Tyr Thr Cys Asn Val Asp
        195                 200                 205
```

```
His Lys Pro Ser Asn Thr Lys Val Asp Lys Thr Val Glu Arg Lys Cys
    210                 215                 220

Cys Val Glu Cys Pro Pro Cys Pro Ala Pro Pro Val Ala Gly Pro Ser
225                 230                 235                 240

Val Phe Leu Phe Pro Lys Pro Lys Asp Thr Leu Met Ile Ser Arg
                245                 250                 255

Thr Pro Glu Val Thr Cys Val Val Val Asp Val Ser Gln Glu Asp Pro
                260                 265                 270

Glu Val Gln Phe Asn Trp Tyr Val Asp Gly Val Glu Val His Asn Ala
            275                 280                 285

Lys Thr Lys Pro Arg Glu Glu Gln Phe Asn Ser Thr Tyr Arg Val Val
            290                 295                 300

Ser Val Leu Thr Val Leu His Gln Asp Trp Leu Asn Gly Lys Glu Tyr
305                 310                 315                 320

Lys Cys Lys Val Ser Asn Lys Gly Leu Pro Ser Ser Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Gln Glu Glu Met Thr Lys Asn Gln Val Ser Leu Thr Cys
            355                 360                 365

Leu Val Lys Gly Phe Tyr Pro Ser Asp Ile Ala Val Glu Trp Glu Ser
370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Arg Leu Thr Val Asp Lys Ser
                405                 410                 415

Arg Trp Gln Glu Gly Asn Val Phe Ser Cys Ser Val Leu His Glu Ala
            420                 425                 430

Leu His Ser His Tyr Thr Gln Lys Ser Leu Ser Leu Ser Leu Gly Lys
            435                 440                 445

<210> SEQ ID NO 15
<211> LENGTH: 326
<212> TYPE: PRT
<213> ORGANISM: Artificial Sequence
<220> FEATURE:
<223> OTHER INFORMATION: Heavy chain constant region modified IgG2/4

<400> SEQUENCE: 15

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Thr Ser Ser Asn Phe Gly Thr Gln Thr
65                  70                  75                  80

Tyr Thr Cys Asn Val Asp His Lys Pro Ser Asn Thr Lys Val Asp Lys
                85                  90                  95

Thr Val Glu Arg Lys Cys Cys Val Glu Cys Pro Pro Cys Pro Ala Pro
                100                 105                 110

Pro Val Ala Gly Pro Ser Val Phe Leu Phe Pro Pro Lys Pro Lys Asp
            115                 120                 125
```

```
Thr Leu Tyr Ile Thr Arg Glu Pro Glu Val Thr Cys Val Val Asp
        130                 135                 140

Val Ser His Glu Asp Pro Glu Val Gln Phe Asn Trp Tyr Val Asp Gly
145                 150                 155                 160

Met Glu Val His Asn Ala Lys Thr Lys Pro Arg Glu Glu Gln Phe Asn
                165                 170                 175

Ser Thr Phe Arg Val Val Ser Val Leu Thr Val Val His Gln Asp Trp
            180                 185                 190

Leu Asn Gly Lys Glu Tyr Lys Cys Lys Val Ser Asn Lys Gly Leu Pro
        195                 200                 205

Ala Pro Ile Glu Lys Thr Ile Ser Lys Thr Lys Gly Gln Pro Arg Glu
    210                 215                 220

Pro Gln Val Tyr Thr Leu Pro Pro Ser Arg Glu Glu Met Thr Lys Asn
225                 230                 235                 240

Gln Val Ser Leu Thr Cys Leu Val Lys Gly Phe Tyr Pro Ser Asp Ile
                245                 250                 255

Ala Val Glu Trp Glu Ser Asn Gly Gln Pro Glu Asn Asn Tyr Lys Thr
            260                 265                 270

Thr Pro Pro Met Leu Asp Ser Asp Gly Ser Phe Phe Leu Tyr Ser Lys
        275                 280                 285

Leu Thr Val Asp Lys Ser Arg Trp Gln Gln Gly Asn Val Phe Ser Cys
    290                 295                 300

Ser Val Met His Glu Ala Leu His Asn His Tyr Thr Gln Lys Ser Leu
305                 310                 315                 320

Ser Leu Ser Pro Gly Lys
                325

<210> SEQ ID NO 16
<211> LENGTH: 448
<212> TYPE: PRT
<213> ORGANISM: Artificial Sequence
<220> FEATURE:
<223> OTHER INFORMATION: Modified and humanized entire antibody heavy
      chain

<400> SEQUENCE: 16

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ile Phe Ser Asn Tyr
            20                  25                  30

Trp Ile Gln Trp Val Arg Gln Ala Pro Gly Gln Gly Leu Glu Trp Met
        35                  40                  45

Gly Glu Ile Leu Pro Gly Ser Gly Ser Thr Glu Tyr Thr Glu Asn Phe
    50                  55                  60

Lys Asp Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Tyr Phe Phe Gly Ser Ser Pro Asn Trp Tyr Phe Asp Val Trp
            100                 105                 110

Gly Gln Gly Thr Leu Val Thr Val Ser Ser Ala Ser Thr Lys Gly Pro
        115                 120                 125

Ser Val Phe Pro Leu Ala Pro Cys Ser Arg Ser Thr Ser Glu Ser Thr
    130                 135                 140

Ala Ala Leu Gly Cys Leu Val Lys Asp Tyr Phe Pro Glu Pro Val Thr
```

```
            145                 150                 155                 160
Val Ser Trp Asn Ser Gly Ala Leu Thr Ser Gly Val His Thr Phe Pro
                165                 170                 175

Ala Val Leu Gln Ser Ser Gly Leu Tyr Ser Leu Ser Ser Val Val Thr
                180                 185                 190

Val Thr Ser Ser Asn Phe Gly Thr Gln Thr Tyr Thr Cys Asn Val Asp
                195                 200                 205

His Lys Pro Ser Asn Thr Lys Val Asp Lys Thr Val Glu Arg Lys Cys
                210                 215                 220

Cys Val Glu Cys Pro Pro Cys Pro Ala Pro Pro Val Ala Gly Pro Ser
225                 230                 235                 240

Val Phe Leu Phe Pro Pro Lys Pro Lys Asp Thr Leu Tyr Ile Thr Arg
                245                 250                 255

Glu Pro Glu Val Thr Cys Val Val Val Asp Val Ser His Glu Asp Pro
                260                 265                 270

Glu Val Gln Phe Asn Trp Tyr Val Asp Gly Met Glu Val His Asn Ala
                275                 280                 285

Lys Thr Lys Pro Arg Glu Glu Gln Phe Asn Ser Thr Phe Arg Val Val
290                 295                 300

Ser Val Leu Thr Val Val His Gln Asp Trp Leu Asn Gly Lys Glu Tyr
305                 310                 315                 320

Lys Cys Lys Val Ser Asn Lys Gly Leu Pro Ala Pro Ile Glu Lys Thr
                325                 330                 335

Ile Ser Lys Thr Lys Gly Gln Pro Arg Glu Pro Gln Val Tyr Thr Leu
                340                 345                 350

Pro Pro Ser Arg Glu Glu Met Thr Lys Asn Gln Val Ser Leu Thr Cys
                355                 360                 365

Leu Val Lys Gly Phe Tyr Pro Ser Asp Ile Ala Val Glu Trp Glu Ser
                370                 375                 380

Asn Gly Gln Pro Glu Asn Asn Tyr Lys Thr Thr Pro Pro Met Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
                420                 425                 430

Leu His Asn His Tyr Thr Gln Lys Ser Leu Ser Leu Ser Pro Gly Lys
                435                 440                 445

<210> SEQ ID NO 17
<211> LENGTH: 11
<212> TYPE: PRT
<213> ORGANISM: Artificial Sequence
<220> FEATURE:
<223> OTHER INFORMATION: Modified CDR sequence

<400> SEQUENCE: 17

Gly Ala Ser Glu Asn Ile Tyr His Ala Leu Asn
1               5                   10

<210> SEQ ID NO 18
<211> LENGTH: 17
<212> TYPE: PRT
<213> ORGANISM: Artificial Sequence
<220> FEATURE:
<223> OTHER INFORMATION: Modified Heavy Chain CDR 2 sequence

<400> SEQUENCE: 18
```

Glu Ile Leu Pro Gly Ser Gly His Thr Glu Tyr Thr Glu Asn Phe Lys
1               5                   10                  15

Asp

<210> SEQ ID NO 19
<211> LENGTH: 10
<212> TYPE: PRT
<213> ORGANISM: Artificial Sequence
<220> FEATURE:
<223> OTHER INFORMATION: Modified heavy chain CDR1 sequence

<400> SEQUENCE: 19

Gly His Ile Phe Ser Asn Tyr Trp Ile Gln
1               5                   10

<210> SEQ ID NO 20
<211> LENGTH: 448
<212> TYPE: PRT
<213> ORGANISM: Artificial Sequence
<220> FEATURE:
<223> OTHER INFORMATION: Modified and humanized entire human heavy chain
      sequence

<400> SEQUENCE: 20

Gln Val Gln Leu Val Gln Ser Gly Ala Glu Val Lys Lys Pro Gly Ala
1               5                   10                  15

Ser Val Lys Val Ser Cys Lys Ala Ser Gly His Ile Phe Ser Asn Tyr
            20                  25                  30

Trp Ile Gln Trp Val Arg Gln Ala Pro Gly Gln Gly Leu Glu Trp Met
        35                  40                  45

Gly Glu Ile Leu Pro Gly Ser Gly His Thr Glu Tyr Thr Glu Asn Phe
    50                  55                  60

Lys Asp Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Tyr Phe Phe Gly Ser Ser Pro Asn Trp Tyr Phe Asp Val Trp
            100                 105                 110

Gly Gln Gly Thr Leu Val Thr Val Ser Ser Ala Ser Thr Lys Gly Pro
        115                 120                 125

Ser Val Phe Pro Leu Ala Pro Cys Ser Arg Ser Thr Ser Glu Ser Thr
    130                 135                 140

Ala Ala Leu Gly Cys Leu Val Lys Asp Tyr Phe Pro Glu Pro Val Thr
145                 150                 155                 160

Val Ser Trp Asn Ser Gly Ala Leu Thr Ser Gly Val His Thr Phe Pro
                165                 170                 175

Ala Val Leu Gln Ser Ser Gly Leu Tyr Ser Leu Ser Ser Val Val Thr
            180                 185                 190

Val Pro Ser Ser Asn Phe Gly Thr Gln Thr Tyr Thr Cys Asn Val Asp
        195                 200                 205

His Lys Pro Ser Asn Thr Lys Val Asp Lys Thr Val Glu Arg Lys Cys
    210                 215                 220

Cys Val Glu Cys Pro Pro Cys Pro Ala Pro Val Ala Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser Gln Glu Asp Pro
            260                 265                 270

Glu Val Gln Phe Asn Trp Tyr Val Asp Gly Val Glu Val His Asn Ala
            275                 280                 285

Lys Thr Lys Pro Arg Glu Glu Gln Phe Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Gly Leu Pro Ser Ser Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Gln Glu Glu Met Thr Lys Asn Gln Val Ser Leu Thr Cys
        355                 360                 365

Leu Val Lys Gly Phe Tyr Pro Ser Asp Ile Ala Val Glu Trp Glu Ser
    370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Arg Leu Thr Val Asp Lys Ser
                405                 410                 415

Arg Trp Gln Glu Gly Asn Val Phe Ser Cys Ser Val Met His Glu Ala
            420                 425                 430

Leu His Asn His Tyr Thr Gln Lys Ser Leu Ser Leu Ser Leu Gly Lys
        435                 440                 445

<210> SEQ ID NO 21
<211> LENGTH: 5
<212> TYPE: PRT
<213> ORGANISM: Artificial Sequence
<220> FEATURE:
<223> OTHER INFORMATION: Heavy chain CDR1 sequence

<400> SEQUENCE: 21

Ser Tyr Ala Ile Ser
1               5

<210> SEQ ID NO 22
<211> LENGTH: 17
<212> TYPE: PRT
<213> ORGANISM: Artificial Sequence
<220> FEATURE:
<223> OTHER INFORMATION: Heavy chain CDR2 sequence

<400> SEQUENCE: 22

Gly Ile Gly Pro Phe Phe Gly Thr Ala Asn Tyr Ala Gln Lys Phe Gln
1               5                   10                  15

Gly

<210> SEQ ID NO 23
<211> LENGTH: 7
<212> TYPE: PRT
<213> ORGANISM: Artificial Sequence
<220> FEATURE:
<223> OTHER INFORMATION: heavy chain CDR3 sequence

<400> SEQUENCE: 23

Asp Thr Pro Tyr Phe Asp Tyr
1               5

<210> SEQ ID NO 24
<211> LENGTH: 11
<212> TYPE: PRT

```
<213> ORGANISM: Artificial Sequence
<220> FEATURE:
<223> OTHER INFORMATION: Light Chain CDR1 sequence

<400> SEQUENCE: 24

Ser Gly Asp Ser Ile Pro Asn Tyr Tyr Val Tyr
1               5                   10

<210> SEQ ID NO 25
<211> LENGTH: 7
<212> TYPE: PRT
<213> ORGANISM: Artificial Sequence
<220> FEATURE:
<223> OTHER INFORMATION: Light chain CDR2 sequence

<400> SEQUENCE: 25

Asp Asp Ser Asn Arg Pro Ser
1               5

<210> SEQ ID NO 26
<211> LENGTH: 11
<212> TYPE: PRT
<213> ORGANISM: Artificial Sequence
<220> FEATURE:
<223> OTHER INFORMATION: Light chain CDR3 sequence

<400> SEQUENCE: 26

Gln Ser Phe Asp Ser Ser Leu Asn Ala Glu Val
1               5                   10

<210> SEQ ID NO 27
<211> LENGTH: 116
<212> TYPE: PRT
<213> ORGANISM: Artificial Sequence
<220> FEATURE:
<223> OTHER INFORMATION: Heavy chain variable region sequence

<400> SEQUENCE: 27

Gln Val Gln Leu Val Gln Ser Gly Ala Glu Val Lys Lys Pro Gly Ser
1               5                   10                  15

Ser Val Lys Val Ser Cys Lys Ala Ser Gly Gly Thr Phe Ser Ser Tyr
            20                  25                  30

Ala Ile Ser Val Trp Arg Gln Ala Pro Gly Gln Gly Leu Glu Trp Met
        35                  40                  45

Gly Gly Ile Gly Pro Phe Phe Gly Thr Ala Asn Tyr Ala Gln Lys Phe
    50                  55                  60

Gln Gly Arg Val Thr Ile Thr Ala Asp Glu Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Thr Pro Tyr Phe Asp Tyr Trp Gly Gln Gly Thr Leu Val
            100                 105                 110

Thr Val Ser Ser
            115

<210> SEQ ID NO 28
<211> LENGTH: 108
<212> TYPE: PRT
<213> ORGANISM: Artificial Sequence
<220> FEATURE:
<223> OTHER INFORMATION: Light chain variable region sequence

<400> SEQUENCE: 28
```

Asp Ile Glu Leu Thr Gln Pro Pro Ser Val Ser Val Ala Pro Gly Gln
1               5                   10                  15

Thr Ala Arg Ile Ser Cys Ser Gly Asp Ser Pro Asn Tyr Tyr Val
            20                  25                  30

Tyr Trp Tyr Gln Gln Lys Pro Gly Gln Ala Pro Val Leu Val Ile Tyr
                35                  40                  45

Asp Asp Ser Asn Arg Pro Ser Gly Ile Pro Glu Arg Phe Ser Gly Ser
    50                  55                  60

Asn Ser Gly Asn Thr Ala Thr Leu Thr Ile Ser Gly Thr Gln Ala Glu
65                  70                  75                  80

Asp Glu Ala Asp Tyr Tyr Cys Gln Ser Phe Asp Ser Ser Leu Asn Ala
                85                  90                  95

Glu Val Phe Gly Gly Gly Thr Lys Leu Thr Val Leu
                100                 105

<210> SEQ ID NO 29
<211> LENGTH: 4
<212> TYPE: PRT
<213> ORGANISM: Artificial Sequence
<220> FEATURE:
<223> OTHER INFORMATION: Heavy chain CDR1 sequence

<400> SEQUENCE: 29

Asn Tyr Ile Ser
1

<210> SEQ ID NO 30
<211> LENGTH: 17
<212> TYPE: PRT
<213> ORGANISM: Artificial Sequence
<220> FEATURE:
<223> OTHER INFORMATION: Heavy chain CDR2 sequence

<400> SEQUENCE: 30

Ile Ile Asp Pro Asp Asp Ser Tyr Thr Glu Tyr Ser Pro Ser Phe Gln
1               5                   10                  15

Gly

<210> SEQ ID NO 31
<211> LENGTH: 8
<212> TYPE: PRT
<213> ORGANISM: Artificial Sequence
<220> FEATURE:
<223> OTHER INFORMATION: Heavy chain CDR3 sequence

<400> SEQUENCE: 31

Tyr Glu Tyr Gly Gly Phe Asp Ile
1               5

<210> SEQ ID NO 32
<211> LENGTH: 11
<212> TYPE: PRT
<213> ORGANISM: Artificial Sequence
<220> FEATURE:
<223> OTHER INFORMATION: Light chain CDR1 sequence

<400> SEQUENCE: 32

Ser Gly Asp Asn Ile Gly Asn Ser Tyr Val His
1               5                   10

<210> SEQ ID NO 33
<211> LENGTH: 7
<212> TYPE: PRT

<213> ORGANISM: Artificial Sequence
<220> FEATURE:
<223> OTHER INFORMATION: Light chain CDR2 sequence

<400> SEQUENCE: 33

Lys Asp Asn Asp Arg Pro Ser
1               5

<210> SEQ ID NO 34
<211> LENGTH: 9
<212> TYPE: PRT
<213> ORGANISM: Artificial Sequence
<220> FEATURE:
<223> OTHER INFORMATION: Light chain CDR3 sequence

<400> SEQUENCE: 34

Gly Thr Tyr Asp Ile Glu Ser Tyr Val
1               5

<210> SEQ ID NO 35
<211> LENGTH: 116
<212> TYPE: PRT
<213> ORGANISM: Artificial Sequence
<220> FEATURE:
<223> OTHER INFORMATION: Heavy chain variable region sequence

<400> SEQUENCE: 35

Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Thr Asn Tyr
            20                  25                  30

Ile Ser Trp Val Arg Gln Met Pro Gly Lys Gly Leu Glu Trp Met Gly
        35                  40                  45

Ile Ile Asp Pro Asp Asp Ser Tyr Thr Glu Tyr Ser Pro Ser Phe Gln
    50                  55                  60

Gly Gln Val Thr Ile Ser Ala Asp Lys Ser Ile Ser Thr Ala Tyr Leu
65                  70                  75                  80

Gln Trp Ser Ser Leu Lys Ala Ser Asp Thr Ala Met Tyr Tyr Cys Ala
                85                  90                  95

Arg Tyr Glu Tyr Gly Gly Phe Asp Ile Trp Gly Gln Gly Thr Leu Val
            100                 105                 110

Thr Val Ser Ser
        115

<210> SEQ ID NO 36
<211> LENGTH: 106
<212> TYPE: PRT
<213> ORGANISM: Artificial Sequence
<220> FEATURE:
<223> OTHER INFORMATION: Light chain variable region sequence

<400> SEQUENCE: 36

Ser Tyr Glu Leu Thr Gln Pro Pro Ser Val Ser Val Ala Pro Gly Gln
1               5                   10                  15

Thr Ala Arg Ile Ser Cys Ser Gly Asp Asn Ile Gly Asn Ser Tyr Val
            20                  25                  30

His Trp Tyr Gln Gln Lys Pro Gly Gln Ala Pro Val Leu Val Ile Tyr
        35                  40                  45

Lys Asp Asn Asp Arg Pro Ser Gly Ile Pro Glu Arg Phe Ser Gly Ser
    50                  55                  60

Asn Ser Gly Asn Thr Ala Thr Leu Thr Ile Ser Gly Thr Gln Ala Glu

```
                65                  70                  75                  80
Asp Glu Ala Asp Tyr Tyr Cys Gly Thr Tyr Asp Ile Glu Ser Tyr Val
                    85                  90                  95
Phe Gly Gly Gly Thr Lys Leu Thr Val Leu
                100                 105
```

<210> SEQ ID NO 37
<211> LENGTH: 123
<212> TYPE: PRT
<213> ORGANISM: Artificial Sequence
<220> FEATURE:
<223> OTHER INFORMATION: Variable heavy chain

<400> SEQUENCE: 37

```
Gln Val Gln Leu Val Glu Ser Gly Gly Gly Leu Val Gln Pro Gly Arg
1               5                   10                  15
Ser Leu Arg Leu Ser Cys Ala Ala Ser Gly Phe Thr Val His Ser Ser
                20                  25                  30
Tyr Tyr Met Ala Trp Val Arg Gln Ala Pro Gly Lys Gly Leu Glu Trp
            35                  40                  45
Val Gly Ala Ile Phe Thr Gly Ser Gly Ala Glu Tyr Lys Ala Glu Trp
        50                  55                  60
Ala Lys Gly Arg Val Thr Ile Ser Lys Asp Thr Ser Lys Asn Gln Val
65                  70                  75                  80
Val Leu Thr Met Thr Asn Met Asp Pro Val Asp Thr Ala Thr Tyr Tyr
                85                  90                  95
Cys Ala Ser Asp Ala Gly Tyr Asp Tyr Pro Thr His Ala Met His Tyr
                100                 105                 110
Trp Gly Gln Gly Thr Leu Val Thr Val Ser Ser
            115                 120
```

<210> SEQ ID NO 38
<211> LENGTH: 110
<212> TYPE: PRT
<213> ORGANISM: Artificial Sequence
<220> FEATURE:
<223> OTHER INFORMATION: Variable light chain

<400> SEQUENCE: 38

```
Asp Ile Gln Met Thr Gln Ser Pro Ser Ser Leu Ser Ala Ser Val Gly
1               5                   10                  15
Asp Arg Val Thr Ile Thr Cys Arg Ala Ser Gln Gly Ile Ser Ser Ser
                20                  25                  30
Leu Ala Trp Tyr Gln Gln Lys Pro Gly Lys Ala Pro Lys Leu Leu Ile
            35                  40                  45
Tyr Gly Ala Ser Glu Thr Glu Ser Gly Val Pro Ser Arg Phe Ser Gly
        50                  55                  60
Ser Gly Ser Gly Thr Asp Phe Thr Leu Thr Ile Ser Ser Leu Gln Pro
65                  70                  75                  80
Glu Asp Phe Ala Thr Tyr Tyr Cys Gln Asn Thr Lys Val Gly Ser Ser
                85                  90                  95
Tyr Gly Asn Thr Phe Gly Gly Gly Thr Lys Val Glu Ile Lys
                100                 105                 110
```

<210> SEQ ID NO 39
<211> LENGTH: 451
<212> TYPE: PRT
<213> ORGANISM: Artificial Sequence
<220> FEATURE:

<223> OTHER INFORMATION: Heavy chain

<400> SEQUENCE: 39

```
Gln Val Gln Leu Val Glu Ser Gly Gly Gly Leu Val Gln Pro Gly Arg
1               5                   10                  15

Ser Leu Arg Leu Ser Cys Ala Ala Ser Gly Phe Thr Val His Ser Ser
            20                  25                  30

Tyr Tyr Met Ala Trp Val Arg Gln Ala Pro Gly Lys Gly Leu Glu Trp
        35                  40                  45

Val Gly Ala Ile Phe Thr Gly Ser Gly Ala Glu Tyr Lys Ala Glu Trp
    50                  55                  60

Ala Lys Gly Arg Val Thr Ile Ser Lys Asp Thr Ser Lys Asn Gln Val
65                  70                  75                  80

Val Leu Thr Met Thr Asn Met Asp Pro Val Asp Thr Ala Thr Tyr Tyr
                85                  90                  95

Cys Ala Ser Asp Ala Gly Tyr Asp Tyr Pro Thr His Ala Met His Tyr
            100                 105                 110

Trp Gly Gln Gly Thr Leu Val Thr Val Ser Ser Ala Ser Thr Lys Gly
        115                 120                 125

Pro Ser Val Phe Pro Leu Ala Pro Ser Ser Lys Ser Thr Ser Gly Gly
    130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
            180                 185                 190

Thr Val Pro Ser Ser Ser Leu Gly Thr Gln Thr Tyr Ile Cys Asn Val
        195                 200                 205

Asn His Lys Pro Ser Asn Thr Lys Val Asp Lys Lys Val Glu Pro Lys
    210                 215                 220

Ser Cys Asp Lys Thr His Thr Cys Pro Pro Cys Pro Ala Pro Glu Leu
225                 230                 235                 240

Arg Arg Gly Pro Lys Val Phe Leu Phe Pro Pro Lys Pro Lys Asp Thr
                245                 250                 255

Leu Met Ile Ser Arg Thr Pro Glu Val Thr Cys Val Val Val Asp Val
            260                 265                 270

Ser His Glu Asp Pro Glu Val Lys Phe Asn Trp Tyr Val Asp Gly Val
        275                 280                 285

Glu Val His Asn Ala Lys Thr Lys Pro Arg Glu Glu Gln Tyr Asn Ser
    290                 295                 300

Thr Tyr Arg Val Val Ser Val Leu Thr Val Leu His Gln Asp Trp Leu
305                 310                 315                 320

Asn Gly Lys Glu Tyr Lys Cys Lys Val Ser Asn Lys Gly Leu Pro Ser
                325                 330                 335

Ser Ile Glu Lys Thr Ile Ser Lys Ala Lys Gly Gln Pro Arg Glu Pro
            340                 345                 350

Gln Val Tyr Thr Leu Pro Pro Ser Arg Glu Glu Met Thr Lys Asn Gln
        355                 360                 365

Val Ser Leu Thr Cys Leu Val Lys Gly Phe Tyr Pro Ser Asp Ile Ala
    370                 375                 380

Val Glu Trp Glu Ser Asn Gly Gln Pro Glu Asn Asn Tyr Lys Thr Thr
385                 390                 395                 400
```

-continued

```
Pro Pro Val Leu Asp Ser Asp Gly Ser Phe Phe Leu Tyr Ser Lys Leu
            405                 410                 415

Thr Val Asp Lys Ser Arg Trp Gln Gln Gly Asn Val Phe Ser Cys Ser
            420                 425                 430

Val Leu His Glu Ala Leu His Ala His Tyr Thr Arg Lys Glu Leu Ser
        435                 440                 445

Leu Ser Pro
    450
```